(12) United States Patent
Kinoshita et al.

(10) Patent No.: US 7,537,349 B2
(45) Date of Patent: May 26, 2009

(54) OPTICAL DEVICE AND PROJECTOR

(75) Inventors: Satoshi Kinoshita, Matsumoto (JP); Makoto Zakoji, Shiojiri (JP); Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 383 days.

(21) Appl. No.: 11/262,782

(22) Filed: Nov. 1, 2005

(65) Prior Publication Data
US 2006/0092382 A1 May 4, 2006

(30) Foreign Application Priority Data
Nov. 4, 2004 (JP) ............... 2004-321175
Apr. 27, 2005 (JP) ............... 2005-129822

(51) Int. Cl.
G03B 21/16 (2006.01)
G03B 21/18 (2006.01)
H04N 5/74 (2006.01)
G02F 1/1333 (2006.01)

(52) U.S. Cl. ............... 353/54; 348/748; 349/161
(58) Field of Classification Search ............... 353/54, 353/52, 61; 348/748; 349/161; 361/687, 361/688, 689
See application file for complete search history.

(56) References Cited

U.S. PATENT DOCUMENTS

2002/0163625 A1* 11/2002 Tabuchi et al. ............... 353/31

FOREIGN PATENT DOCUMENTS

| EP | 1 315 028 A1 | 5/2003 |
|---|---|---|
| JP | A-60-6143 | 1/1985 |
| JP | A-5-216016 | 8/1993 |
| JP | A-6-126215 | 5/1994 |
| JP | A-7-77201 | 3/1995 |
| JP | A-7-181463 | 7/1995 |
| JP | A-2002-128508 | 5/2002 |
| JP | A 2003-195254 | 7/2003 |
| JP | A-2006-17786 | 1/2006 |
| WO | WO 02/019027 A1 | 7/2002 |

* cited by examiner

Primary Examiner—Rochelle-Ann J Blackman
(74) Attorney, Agent, or Firm—Oliff & Berridge, PLC

(57) ABSTRACT

An optical device, includes: an optical modulator that modulates a light beam irradiated by a light source in accordance with image information to form an optical image; an optical modulator holder that has a cooling chamber with cooling fluid sealed therein and holds the optical modulator so that heat can be transferred to the cooling fluid in the cooling chamber; a plurality of fluid circulators communicating with the cooling chamber to guide the cooling fluid to the outside of the cooling chamber and again introduces the cooling fluid into the cooling chamber; a cooling fluid accumulator arranged in a flow path of the cooling fluid in each of the plurality of fluid circulators and having a cooling fluid inflow section that flows the cooling fluid to the inside of the cooling accumulator and a cooling fluid outflow section that flows the cooling fluid to the outside of the cooling accumulator so as to accumulate the cooling fluid in the cooling fluid accumulator; and a fluid press-feeder disposed in the flow path of the cooling fluid in each of the plurality of fluid circulators so that the cooling fluid is forcedly circulated via the plurality of fluid circulators, in which the cooling fluid accumulator includes therein: a bubble trapping having a plurality of holes to circulate the cooling fluid toward the cooling fluid outflow section and trap air bubbles contained in the cooling fluid; and a bubble accumulator that accumulates the air bubbles trapped by the bubble trapping.

27 Claims, 24 Drawing Sheets

OPTICAL DEVICE AND PROJECTOR

The entire disclosures of Japanese Patent Application No. 2004-321175, filed Nov. 4, 2004 and Japanese Patent Application No. 2005-129822, filed Apr. 27, 2005, are expressly incorporated by reference herein.

BACKGROUND

1. Technical Field

The present invention relates to an optical device including an optical modulator that modulates a light beam irradiated by a light source in accordance with image information and forms an optical image, and to a projector.

2. Related Art

Generally, a projector has been used for presentations at conferences, academic societies, exhibitions and the like as well as for home theater purposes etc. Such projector includes therein a light source, an optical modulator that modulates a light beam irradiated by the light source in accordance with image information, a color-combining optical device that combining the light beam modulated by the optical modulator and irradiates it, and a projection optical device that projects the light beam combined by the color-combining optical device in an enlarged manner.

In optical components of the projector, as for the optical modulator, an active matrix driven optical modulator is generally used, which has electrooptic material such as liquid crystal sealed between a pair of substrates. Specifically, the pair of substrates included in the optical modulator have: a driving substrate disposed on a light irradiation side and provided with a data line, a scan line, a switching element, a pixel electrode, etc. for applying driving voltage to the liquid crystal; and an opposite substrate disposed on a light incident side and provided with a common electrode, a black mask, etc. On the light incident side and the light irradiation side of the optical modulator, an incident-side polarization plate and an irradiation side polarization plate transmitting a light beam with a predetermined polarization axis are respectively disposed.

When the light beam is irradiated by the light source onto the optical modulator, the optical modulator tends to be subjected to the temperature rise due to light absorption of the data line and the scan line formed on the driving substrate and the black mask formed on the opposite substrates as well as light absorption of a liquid crystal layer. Further, out of the light beams irradiated by the light source and transmitted through the optical modulator, the light beam not having the predetermined polarization axis is absorbed by the incident-side polarization plate and the irradiation-side polarization plate, which easily causes generation of heat on the polarization plates. These polarization plates easily generate heat, but are easily affected by heat. Therefore, in order to stably form the optical image, the optical components such as the optical modulator and the polarization plates are required to be cooled effectively.

Thus, the projector including such optical components therein needs to restrain rise in the temperature of the optical components such as the optical modulator and the polarization plates. Then, there has been provided a projector equipped with an optical device that includes an optical modulator holder having a cooling chamber with cooling fluid sealed therein in order to cool optical components, a light incident side or a light irradiation side of the cooling chamber being sealed with one of substrates of the optical modulator (for instance, see Document: JP-A-2003-195254, [0006] and [0018]).

The projector realizes that the cooling fluid in the cooling chamber contacts an image formation area of the optical modulator, so that heat generated at the optical modulator due to a light beam irradiated by a light source is radiated by heat transfer on account of convention of the cooling fluid.

Additionally, a recess for collecting air bubbles is formed inside the cooling chamber of the projector to prevent air bubbles or dusts from entering into an optical path by the convection of the cooling fluid, so that the air bubbles and the like contained in the cooling fluid are collected in the recess for collecting air bubbles, thus preventing the air bubbles from facing the image formation area of the optical modulator.

However, in this configuration disclosed in the above-mentioned Document, in which the heat generated at the optical modulator is radiated by the heat transfer utilizing the convection of the cooling fluid, since the cooling fluid is sealed inside the cooling chamber, the cooling fluid becomes warm because of the optical modulator generating heat, and the warm cooling fluid stays inside the cooling chamber. Thus the cooling performance is not enough, and it is difficult to cool the optical components effectively as compared with the case that the cooling fluid is forcedly circulated.

Further, since the recess for collecting air bubbles employed in the configuration disclosed in the Document is close to the image formation area, the air bubbles etc. may enter to the image formation area. As a result, the air bubbles affect on image quality and accordingly, a clear projection image will not be formed.

SUMMARY

An advantage of some exemplary aspects of the invention is to provide an optical device and a projector that can effectively cool optical components such as an optical modulator and a polarization plate, prevent an optical path from air bubbles etc. being entered, and form a clear and high-quality projection image.

An optical device according to an aspect of the invention includes: an optical modulator that modulates a light beam irradiated by a light source in accordance with image information to form an optical image; an optical modulator holder that has a cooling chamber with cooling fluid sealed therein and holds the optical modulator so that heat can be transferred to the cooling fluid in the cooling chamber; a plurality of fluid circulators communicating with the cooling chamber to guide the cooling fluid to the outside of the cooling chamber and again introduces the cooling fluid into the cooling chamber; a cooling fluid accumulator arranged in a flow path of the cooling fluid in each of the plurality of fluid circulators and having a cooling fluid inflow section that flows the cooling fluid to the inside of the cooling accumulator and a cooling fluid outflow section that flows the cooling fluid to the outside of the cooling accumulator so as to accumulate the cooling fluid in the cooling fluid accumulator; and a fluid press-feeder disposed in the flow path of the cooling fluid in each of the plurality of fluid circulators so that the cooling fluid is forcedly circulated via the plurality of fluid circulators. The cooling fluid accumulator includes therein: a bubble trapping having a plurality of holes to circulate the cooling fluid toward the cooling fluid outflow section and trap air bubbles contained in the cooling fluid; and a bubble accumulator that accumulates the air bubbles trapped by the bubble trapping.

Note that, the bubble accumulator may not be located in place inside the cooling fluid accumulator, and may be varied according to the posture of the cooling fluid accumulator, volume ratio of the air bubbles and the cooling fluid, variation of densities of the air bubbles and the cooling fluid, and the like.

The bubble trapping may be a flat filter with a plurality of holes or a resin foam sponge with a plurality of pores. And, the diameter of each hole of the bubble trapping may be within a range of 5 to 20 μm for instance. If the diameter of the hole is smaller than 5 μm, the cooling fluid may not pass through the bubble trapping smoothly, and on the other hand, if the diameter of the hole is larger than 20 μm, the air bubbles with large diameter may pass through it.

With the optical device according to the aspect of the invention, there is provided the fluid circulator communicated with the cooling chamber of the optical modulator holder to guide the cooling fluid accumulated in the cooling fluid accumulator to the cooling chamber from the cooling fluid discharging section and to guide the cooling fluid discharged from the cooling chamber to the cooling fluid inflow section of the cooling fluid accumulator, and the cooling fluid in the cooling chamber of the optical modulator holder is circulated, so that the cooling fluid is hardly be heated and the optical modulator can be cooled sufficiently as compared to the case where the cooling fluid is sealed in the cooling chamber.

And, since the cooling fluid accumulator with the cooling fluid accumulated is provided with the bubble trapping that prevents the air bubbles in the cooling fluid from passing through it, almost air bubble is not remained in the cooling fluid when being discharged from the cooling fluid accumulator and the air bubbles can be prevented from entering into the cooling chamber of the optical modulator holder, so that the clear projection image can be formed when the optical image formed by the optical device is projected.

Further, since the hole of the bubble trapping has extremely small diameter, even when the dusts are mixed into the cooling fluid, the dusts can be prevented from passing due to the bubble trapping, thus preventing the dusts from being discharged from the cooling fluid accumulator to the cooling chamber of the optical modulator holder.

Note that, the air bubbles and dusts unable to pass though the bubble trapping are stayed in the vicinity of the bubble trapping, gathered as large air bubbles and elevated in the cooling fluid due to buoyancy. Finally, the air bubbles are accumulated in the bubble accumulator.

Preferably, in the above-described optical device, the bubble accumulator may be disposed such that the air bubbles are collected on the upward direction side in the cooling fluid accumulator, when the optical device is installed in a predetermined posture, and in a case where a direction with a self-weight of the optical device acted is defined as a downward direction side whereas an inverse direction relative to the direction with the self-weight acted is defined as an upward direction side.

With this configuration, when the optical device is installed in the predetermined posture, since the bubble accumulator is provided such that the air bubbles are constantly collected on the upward direction side which is the direction opposite to the action of the self-weight, the air bubbles etc. trapped by the bubble trapping are surely collected in the bubble accumulator, so that almost no air bubble is remained in the cooling fluid when being discharged from the cooling fluid accumulator, thereby preventing the air bubbles from entering into the cooling chamber.

Preferably, in the above-described optical device, a plurality of the cooling fluid accumulators may be disposed.

With this configuration, since there are provided the plurality of cooling fluid accumulators with the bubble trappings in the fluid circulator, the air bubbles in the cooling fluid circulating in the fluid circulator are eliminated by the bubble trappings at the respective points in the flow paths. Accordingly, for instance, even when a device such as the fluid press-feeder is disposed between the two cooling fluid accumulators, the amount of the air bubbles flowing into the device can be reduced.

Preferably, in the above-described optical device, an open valve may be provided at the vicinity of the bubble accumulator of at least one of the cooling fluid accumulators, the open valve allowing the bubble accumulator to communicate with the outside of the cooling fluid accumulator.

In the optical device, when the flow of the cooling fluid in the cooling accumulator is suddenly speeded up, negative pressure may occur in the bubble accumulator. Once the negative pressure occurs, the gas inside the bubble accumulator might mix into the cooling fluid.

To overcome this, since this configuration includes the open valve that allows the bubble accumulator to communicate with the outside of the cooling fluid accumulator, the pressure of the bubble accumulator can be adjusted by opening the open valve and allowing the bubble accumulator to communicate with the outside of the cooling fluid accumulator, thereby preventing the gas in the bubble accumulator from mixing into the cooling fluid.

Preferably, in the above-described optical device, the open valve may shift between an open state that opens a communicating path for allowing the bubble accumulator to communicate with the outside of the cooling fluid accumulator and a close state that closes the communicating path. And, the open valve may shift to the open state when the inside of the bubble accumulator is in a negative pressure state relative to the outside of the cooling fluid accumulator and to the close state when the inside of the bubble accumulator is not in the negative pressure relative to the outside of the cooling fluid accumulator.

With this configuration of the invention, since the open valve shifts the state between the open state (which is the state for opening the communicating path for allowing the bubble accumulator to communicate with the outside of the cooling fluid accumulator) when the inside of the bubble accumulator is in the negative pressure state relative to the outside of the cooling fluid accumulator, and the close state when the inside of the bubble accumulator is not in the negative pressure relative to the outside of the cooling fluid accumulator, the pressure of the bubble accumulator can substantially be equalized with the pressure of the outside of the cooling fluid accumulator further reliably, thus attaining the above-mentioned advantages further preferably.

Preferably, in the above-described optical device, the open valve may be arranged to be able to shift between an open state that opens a communicating path for allowing the bubble accumulator to communicate with the outside of the cooling fluid accumulator and a close state that closes the communicating path. The open valve may be shifted to the open state when the bubble accumulator is positioned on a side contacting the open valve, and the open valve may be shifted to the close state when the bubble accumulator is positioned on a side away from the open valve.

With this configuration, the provision of the open valve enables the bubble accumulator to communicate with the outside of the cooling fluid accumulator, thus both communicating with each other. Further, since the open valve shifts the state between the open state (which is the state for opening the communicating path for allowing the bubble accumulator to communicate with the outside of the cooling fluid accumulator) when the bubble accumulator is positioned on the side contacting the open valve, and the close state (which is the state for closing the communicating path) when the bubble accumulator is positioned on the side away from the open valve, the pressure of the bubble accumulator can substantially be equal to the pressure of the outside of the cooling fluid accumulator.

Additionally, when the bubble accumulator is positioned on the side away from the open valve, i.e., when the open valve contacts the cooling fluid, the open valve becomes the close state, thus preventing the cooling fluid in the cooling fluid accumulator from leaking to the outside.

Preferably, in the above-described optical device, when the optical device is installed in a predetermined posture, and in a case where a direction with a self-weight of the optical device acted is defined as a downward direction side whereas an inverse direction relative to the direction with the self-weight acted is defined as an upward direction side, the open valve may have a cylindrical open valve body with a hollow section narrowing to a tip end, and a substantially spherical adjusting member sealed in the hollow section. The open valve is arranged such that the tip end confronts the inside of the fluid accumulator. When the tip end confronts the downward direction side, the adjusting member may push a wall of the hollow section contacting to the adjusting member due to the self-weight of the adjusting member and slightly open the tip end to be the open state. And, when the tip end confronts the upward direction side, the tip end may be closed to be the close state.

With this configuration, the open valve having the cylindrical open valve body with the hollow section narrowing toward the tip end and the substantially spherical adjusting member sealed in the hollow section is employed, so that the adjusting member opens/closes the tip end of the open valve body to adjust the state between the close state and the open state of the open valve. Owing to this, the pressure of the bubble accumulator can further surely be equalized with the pressure of the outside of the cooling fluid accumulator, thus preventing the cooling fluid in the cooling fluid accumulator from leaking to the outside. Accordingly the above-described advantages can further preferably be attained.

Incidentally, it is preferable that the open valve will not be the open state even when the inside of the bubble accumulator becomes the negative pressure in some measure relative to the outside of the cooling fluid accumulator in order to prevent the cooling fluid from leaking when the posture of the optical device is changed.

Preferably, in the above-described optical device, a gas-liquid separating film may be arranged on a boundary defined by the bubble accumulator and the cooling fluid accumulated in the cooling fluid accumulator. The gas-liquid separating film allows gas to pass but inhibiting liquid to pass.

With this configuration, since the gas-liquid separating film is disposed along the boundary defined by the bubble accumulator and the cooling fluid accumulated in the cooling fluid accumulator, the air bubbles unable to pass due to the bubble trapping can effectively be discharged to the bubble accumulator via the gas-liquid separating film, thus further reliably preventing the air bubbles from being discharged from the cooling fluid accumulator to the cooling chamber.

Preferably, in the above-described optical device, the gas-liquid separating film may be arranged in a sagging manner.

With this configuration, since the gas-liquid separating film is disposed in the sagging manner, the amount fluctuation of the cooling fluid in the cooling fluid accumulator can be managed.

More specifically, the gas-liquid separating film is sagged downward when the amount of the cooling fluid in the cooling fluid accumulator is small, whereas the gas-liquid separating film is sagged upward when the amount of the cooling fluid is large, so that the amount fluctuation of the cooling fluid in the cooling fluid accumulator can be managed. Further, because of the sagging of the gas-liquid separating film, the gas-liquid separating film is deformable corresponding to the pressure fluctuation of the bubble accumulator, thus managing the pressure fluctuation of the bubble accumulator.

Preferably, in the above-described optical device, a moving mechanism may be arranged in the cooling fluid accumulator. The moving mechanism moves the gas-liquid separating film to the upward direction side and the downward direction side.

With this configuration, since the moving mechanism that moves the gas-liquid separating film to the upward and downward direction sides is provided in the cooling fluid accumulator, the amount fluctuation of the cooling fluid in the cooling fluid accumulator can be managed. Additionally, since the gas-liquid separating film is moved by the moving mechanism to the upward and downward direction sides, the pressure of the bubble accumulator can easily be adjusted.

Preferably, in the above-described optical device, a communicating path may be formed in the cooling fluid accumulator at the vicinity of the bubble accumulator. The communicating path allows the bubble accumulator to communicate with the outside of the cooling fluid accumulator.

With this configuration, since the communicating path that allows the bubble accumulator to communicate with the outside of the cooling fluid accumulator is formed in the cooling fluid accumulator at the vicinity of the bubble accumulator, the pressure of the bubble accumulator can substantially be equalized with the pressure of the outside of the cooling fluid accumulator. Consequently, the negative pressure is prevented from occurring in the bubble accumulator, thus preventing the air bubbles in the bubble accumulator from mixing into the cooling fluid.

Preferably, in the above-described optical device, the communicating path may extend in a meandering manner.

With this configuration, since the communicating path extends in a meandering manner, the length of the communicating path becomes long. Therefore, even if the cooling fluid enters the communicating path, the cooling fluid will not be discharged to the outside of the fluid accumulator from the communicating path.

Preferably, in the above-described optical device, a communicating hole may be formed in the cooling fluid accumulator. The communicating hole allows the bubble accumulator to communicate with the outside of the cooling fluid accumulator. A bubble discharging section may be connected to the communicating hole. The bubble discharging section forcedly discharges the air bubbles accumulated in the bubble accumulator via the communicating hole to the outside of the cooling fluid accumulator.

With this configuration, the communicating hole that allows the bubble accumulator to communicate with the outside of the cooling fluid accumulator and the bubble discharging section connected to the communicating hole so as to forcedly discharge the air bubbles accumulated in the bubble accumulator via the communicating hole to the outside of the cooling fluid accumulator are formed in the cooling fluid accumulator of the optical device. Therefore, since the accumulated air bubbles are completely flowed to the outside of the cooling fluid accumulator via the bubble discharging section, it can be prevented that the air bubbles are discharged from the cooling fluid accumulator to the cooling chamber.

Preferably, in the above-described optical device, a plurality of the optical modulators may be provided. A plurality of the optical modulator holders may be provided corresponding to the plurality of optical modulators The plurality of optical modulators may have a plurality of light incident surfaces on which the plurality of optical modulator holders are attached. The optical device may have a color-combining optical device that combines color lights respectively modulated by the plurality of optical modulators to irradiate the combined color lights. And, the cooling fluid accumulator may be attached on each of surfaces of the color-combining optical device respectively intersecting with the plurality of light incident surfaces.

With this configuration, the cooling fluid accumulator is attached on the surface intersecting with the plurality of light incident surfaces of the color-combining optical device. In other words, the cooling fluid accumulator is disposed on the surface other than the light incident surface and the light irradiation surface of the color-combining optical device, so that the optical device can surely form a clear projection image.

Additionally, since there is not disposed the optical modulator etc. on the surface intersecting with the light incident surface out of the surfaces of the color-combining optical device, the surface is an unused area. That is, with this configuration, since the cooling fluid accumulator is arranged in the unused area, the unused area owned by the optical device can effectively be utilized. Thus, increase in size of the optical device can be avoided.

Preferably, in the above-described optical device, when the optical device is installed in a predetermined posture, and in a case where a direction with a self-weight of the optical device acted is defined as a downward direction side whereas an inverse direction relative to the direction with the self-weight acted is defined as an upward direction side, the cooling fluid accumulator may includes: an outflow cooling fluid accumulator that divides and flows the accumulated cooling fluid to the cooling chambers respectively formed in the plurality of optical modulator holders via the plurality of fluid circulators; and an inflow cooling fluid accumulator that collectively flows the cooling fluid from the cooling chambers formed in the plurality of optical modulator holders via the plurality of fluid circulators. The outflow cooling fluid accumulator may be attached on the surface of the color-combining optical device on the downward direction side out of the surfaces respectively intersecting with the plurality of light incident surfaces. And, the inflow cooling fluid accumulator may be attached on the surface of the color-combining optical device on the upward direction side out of the surfaces respectively intersecting with the plurality of light incident surfaces.

With this configuration, since the outflow cooling fluid accumulator is arranged on the downward direction side of the cooling chamber whereas the inflow cooling fluid accumulator is arranged on the upward direction side of the cooling chamber, the cooling fluid circulating in the cooling chamber is circulated from the downward direction side to the upward direction side. In the cooling chamber, the cooling liquid heated by the heat of the optical modulator moves upward. Then, since the moving direction of the heat is the same as the circulating direction of the cooling liquid, the heated cooling liquid will not stay in the cooling chamber. Accordingly, the cooling liquid inside the cooling chambers can effectively reduce the heat generated by the optical modulator.

When the heating value of the respective optical modulators are different, with this configuration, the cooling fluid varied in the temperature discharged from the cooling chambers of the respective optical modulators can be equalized in the temperature by flowing the cooling fluid to the inflow cooling fluid accumulator collectively. Further, since the cooling fluid accumulated in the outflow cooling fluid accumulator is divided and flowed to the cooling chambers of the respective optical modulators, the cooling fluid equalized in the temperature can be flowed to the cooling chambers of the respective optical modulators.

Preferably, in the above-described optical device, the cooling fluid accumulator may includes: an outflow cooling fluid accumulator that flows the accumulated cooling fluid to the plurality of cooling chambers; and an inflow cooling fluid accumulator that flows the cooling fluid from the plurality of cooling chambers via the plurality of fluid circulators. And, the fluid press-feeder may press-feed the cooling fluid discharged from the inflow cooling fluid accumulator to the outflow cooling fluid accumulator.

With this configuration, the air bubbles and dusts are eliminated from the cooling fluid discharged from the inflow cooling fluid accumulator to the fluid press-feeder, by the bubble trapping provided in the inflow cooling fluid accumulator. Accordingly, troubles occurring in the fluid press-feeder due to the air bubbles and dusts can be prevented when the cooling fluid is circulated in the fluid press-feeder.

Preferably, in the above-described optical device, when the optical device is installed in a predetermined posture, and in a case where a direction with a self-weight of the optical device acted is defined as a downward direction side whereas an inverse direction relative to the direction with the self-weight acted is defined as an upward direction side, the cooling fluid may be circulated from the upward direction side to the downward direction side via the bubble accumulator. And, the bubble trapping may be arranged such that a bubble trapping surface is substantially orthogonal to the upward direction, the bubble trapping surface trapping the air bubbles contained in the cooling fluid.

With this configuration, the bubble trapping is disposed such that the bubble trapping surface faces the upward direction side, thus circulating the cooling fluid from the upward direction side to the downward direction side. In other words, the air bubbles contained in the cooling fluid are trapped by an upper surface of the bubble trapping. The trapped air bubbles will elevate due to buoyancy soon. At this time, since the air bubbles are trapped by the upper surface of the bubble trapping, the air bubbles are easily departed from the bubble trapping. Accordingly the above-described advantages can further preferably be attained.

Preferably, in the above-described optical device, the bubble trapping may be attached on at least one of the cooling fluid inflow section and the cooling fluid outflow section via a fixing member. And, a bubble discharging hole may be formed in the fixing member, the bubble discharging hole discharging the air bubbles trapped by the bubble trapping to the bubble accumulator.

With this configuration, the bubble trapping is fixed on at least one of the cooling fluid inflow section and the cooling fluid outflow section via the fixing member. For instance, when the bubble trapping is fixed in the cooling fluid inflow section, all of the cooling fluid flowed to the cooling fluid accumulator from the cooling fluid inflow section can pass through the bubble trapping. Namely, the air bubbles can be eliminated for all of the cooling fluid flowed to the cooling fluid accumulator. Even when the bubble trapping is fixed in the cooling fluid outflow section, the same advantages can be attained.

Additionally, with this configuration, the bubble discharging hole is formed in the fixing member, the bubble discharging hole discharging the air bubbles trapped by the bubble trapping to the bubble accumulator. Accordingly, even when the bubble trapping is provided in the cooling fluid inflow section or the cooling fluid outflow section via the fixing member, the air bubbles trapped by the bubble trapping can smoothly be discharged though the bubble discharging hole and accumulated in the bubble accumulator.

Preferably, in the above-described optical device, when the optical device is installed in a predetermined posture, and in a case where a direction with a self-weight of the optical device acted is defined as a downward direction side whereas an inverse direction relative to the direction with the self-weight acted is defined as an upward direction side, the fixing member may includes: a first cylindrical section extending on a cooling fluid inflow side of the bubble trapping to guide the cooling fluid to the bubble trapping; and a second cylindrical section extending on a cooling fluid outflow side of the bubble trapping. The bubble trapping may be held between the first cylindrical section and the second cylindrical section at an outer edge of the bubble trapping such that a bubble trapping surface that traps the air bubbles contained in the cooling fluid is substantially parallel to the upward direction or the downward direction. And, at least one bubble discharging hole may be formed on the upward direction side of the first cylindrical section.

With this configuration, the bubble trapping is fixed such that the bubble trapping surface is parallel to vertical direction. In other words, since the cooling fluid passes through the bubble trapping in a direction substantially orthogonal to the vertical direction, the bubble trapping surface is formed on the cooling fluid inflow side of the bubble trapping.

Here, with this configuration, since the bubble discharging hole is formed on the upward direction side of the first cylindrical section, i.e., on the upward direction side of the cooling fluid inflow side relative to the bubble trapping, the air bubbles trapped by the bubble trapping surface and elevated due to buoyancy are smoothly discharged through the bubble discharging hole. Accordingly the above-described advantages can further preferably be attained.

Further, since the bubble discharging hole is formed in the fixing member only at the location where the air bubbles are departed and elevated from the bubble trapping, the number of the bubble discharging holes to be formed may be minimized.

Preferably, in the above-described optical device, at least one bubble discharging hole may be formed on the downward direction side of the first cylindrical section.

It is assumed that the optical device according to the aspect of the invention is installed in an upside-down posture (i.e., in a posture where the upward direction side and the downward direction side are reversed) relative to a predetermined posture.

With this configuration, since the bubble discharging hole is formed on the downward direction side of the first cylindrical section when the optical device is in the predetermined posture, in the upside-down posture, the bubble discharging hole is then located on the upward direction side of the first cylindrical section. In other words, when the optical device of the aspect of the invention is installed in the upside-down posture, the bubble discharging hole is then located on the upward direction side on the cooling fluid inflow side of the fixing member relative to the bubble trapping. Owing to this, the air bubbles trapped by the bubble trapping surface can smoothly be discharged like the state before the posture change of the optical device.

Accordingly, the optical device of the aspect of the invention can reliably prevent the air bubbles trapped by the bubble trapping from being discharged to the cooling chamber in either case where the optical device is installed in the predetermined posture or in the upside-down posture. And besides, when the optical image formed by the optical device is projected, the optical device can provide a clear projection image.

Preferably, in the above-described optical device, at least one bubble discharging hole may be formed on the downward direction side of the second cylindrical section.

Incidentally, it is assumed that, when the optical device is installed in the predetermined posture, a direction through which the cooling fluid is circulated in the fluid circulator is defined as a predetermined direction, whereas a direction opposite to the predetermined direction is defined as an inverse direction.

Also, the optical device of the aspect of the invention is conceived to be installed in the upside-down posture and the cooling fluid is circulated in the inverse direction.

With this configuration, since the bubble discharging hole is formed on the downward direction side of the second cylindrical section when the optical device is in the predetermined posture, in the upside-down posture, the bubble discharging hole is then located on the upward direction side of the second cylindrical section. Concretely, when the optical device is installed in the upside-down posture and the cooling fluid is circulated in the inverse direction, the bubble discharging hole is then located on the upward direction side on the inflow side of the cooling fluid about to pass though the bubble trapping in the fixing member. Owing to this, the air bubbles trapped by the bubble trapping will smoothly be discharged via the bubble discharging hole.

Accordingly, the optical device of the aspect of the invention can surely prevent the air bubbles trapped by the bubble trapping from being discharged to the cooling chamber in either cases where the optical device is installed in the predetermined posture or in the upside-down posture, and besides in the case where the cooling fluid circulating in the fluid circulator is circulated in the direction opposite to the predetermined direction. Further, in a case that the optical image formed by the optical device is projected, the optical device can provide a clear projection image.

Preferably, in the above-described optical device, when the optical device is installed in a predetermined posture, and in a case where a direction with a self-weight of the optical device acted is defined as a downward direction side whereas an inverse direction relative to the direction with the self-weight acted is defined as an upward direction side, the fixing member may includes: a first cylindrical section extending on a cooling fluid inflow side of the bubble trapping to guide the cooling fluid to the bubble trapping; and a second cylindrical section extending on a cooling fluid outflow side of the bubble trapping. The bubble trapping may be held between the first cylindrical section and the second cylindrical section at an outer edge of the bubble trapping such that a bubble trapping surface that traps the air bubbles contained in the cooling fluid is substantially orthogonal to the upward direction or the downward direction. And, the bubble discharging hole may be formed on an outer side of an outer edge of the bubble trapping surface in a direction orthogonal to the upward and downward directions.

In the optical device with the bubble trapping being fixed such that the bubble trapping surface is substantially orthogonal to the upward direction, since the bubble trapping surface faces the upward direction, the air bubbles are easily departed from the bubble trapping, which is stated already. Herein, when the optical device is installed in the upside-down state, the cooling fluid is circulated from the downward direction to the upward direction with the bubble trapping surface facing the downward direction. At this instant, with this configuration, since the bubble discharging hole is formed in the fixing member outside in the direction substantially orthogonal to the upward/downward direction of the outer periphery of the bubble trapping surface, the air bubbles trapped by a lower surface of the bubble trapping will smoothly be discharged from the bubble discharging hole.

Preferably, in the above-described optical device, the bubble trapping may be formed by a porous filter.

With this configuration, since the bubble trapping is formed of the porous filter, the air bubbles can further completely be trapped, thus further effectively attaining the above-described advantages.

Preferably, in the above-described optical device, in a case where a direction with a self-weight of the optical device acted is defined as a downward direction side whereas an inverse direction relative to the direction with the self-weight acted is defined as an upward direction side, the cooling fluid may be circulated from the downward direction side to the upward direction side in the cooling chamber.

With this configuration, the cooling fluid circulating in the cooling chamber is circulated from the downward direction side to the upward direction side. In the cooling chamber, the cooling liquid heated by the heat of the optical modulator moves upward. Then, since the moving direction of the heat is the same as the circulating direction of the cooling liquid, the heated cooling liquid will not stay in the cooling chamber. Accordingly, the cooling liquid inside the cooling chambers can effectively reduce the heat generated by the optical modulator.

A projector according to another aspect of the invention that forms an optical image by modulating a light beam irradiated by a light source in accordance with image information and projects the optical image in an enlarged manner, includes: the above-described optical device.

With the projector of the aspect of the invention, since the projector is equipped with the optical device having one of the above-described configurations, the same advantages as the optical device can be attained.

Preferably, in the above-described projector, when the projector is installed in a predetermined posture, and in a case where a direction with a self-weight of the projector acted is defined as a downward direction side whereas an inverse direction relative to the direction with the self-weight acted is defined as an upward direction side, the fluid circulator may be connected so that the cooling fluid is circulated in the upward and downward directions in the cooling chamber. The projector may includes: a posture detector that detects a posture of the projector; and a press-feeder driving controller that controls driving of the fluid press-feeder. And, the press-feeder driving controller may shift a circulating direction of the cooling fluid by controlling the driving of the fluid press-feeder corresponding to the posture of the projector detected by the posture detector, so that the cooling fluid in the cooling chamber is circulated from the downward direction side through which the self-weight of the projector acts to the upward direction side.

With this configuration, when the posture detector detects the posture of the projector, the press-feeder driving controller drives the fluid press-feeder such that the cooling fluid is circulated from the downward direction side to the upward direction side inside the cooling chamber corresponding to the posture of the projector detected by the posture detector. Namely, no matter how the projector is installed in the predetermined posture or in the upside-down posture, the cooling fluid is circulated from the downward direction side to the upward direction side in the vertical direction inside the cooling chamber. In the cooling chamber, the cooling liquid heated by the heat of the optical modulator moves upward. Then, since the moving direction of the heat is the same as the circulating direction of the cooling liquid, the heated cooling liquid will not stay in the cooling chamber. Accordingly, the cooling liquid inside the cooling chambers can effectively reduce the heat generated by the optical modulator.

A projector according to still another aspect of the invention that forms an optical image by modulating a light beam irradiated by a light source in accordance with image information and projects the optical image in an enlarged manner, includes: the above-described optical device. The bubble trapping disposed in the outflow cooling fluid accumulator may be attached on the cooling fluid outflow section of the outflow cooling fluid accumulator. The bubble trapping disposed in the inflow cooling fluid accumulator may be attached on the cooling fluid inflow section of the inflow cooling fluid accumulator. The projector may further includes: a posture detector that detects a posture of the projector; and a press-feeder driving controller that controls driving of the fluid press-feeder. The press-feeder driving controller may shift a circulating direction of the cooling fluid by controlling the fluid press-feeder corresponding to a detection result of the posture detector. And, the cooling fluid accumulated in the cooling accumulator located on a direction through which the self-weight of the projector acts out of the outflow cooling fluid accumulator and the inflow cooling fluid accumulator may be divided and flowed to the cooling chambers respectively formed in the plurality of optical modulator holders via the plurality of fluid circulators.

With this configuration, as described above, the circulating direction of the cooling fluid circulating in the fluid circulator is controlled to the upward direction side from the downward direction side in the cooling chamber by the activation of the posture detector and the press-feeder driving controller. Then, the cooling fluid accumulator located on the downward direction side relative to the cooling chamber flows the cooling fluid to the cooling chamber, and the cooling fluid accumulator on the upward direction side relative to the cooling chamber flows the cooling fluid discharged from the cooling chamber. This can be applied to the case where the projector is installed in the predetermined posture, in which there are the same posture relationship among the cooling fluid accumulator, the open valve and the circulating direction of the cooling fluid. In other words, even when the posture of the projector is changed, the posture relationship among the cooling fluid accumulator, the open valve and the circulating direction of the cooling fluid can be maintained according to the control of the circulating direction of the cooling fluid. Accordingly the above-described advantages can further preferably be attained.

Preferably, in the above-described projector, an open valve may be formed in the cooling fluid accumulator. The open valve allows the bubble accumulator to communicate with the outside of the cooling fluid accumulator. The open valve may have a cylindrical open valve body with a hollow section narrowing to a tip end, and a substantially spherical adjusting member sealed in the hollow section. The open valve may be arranged such that the tip end confronts the inside of each of the fluid accumulator. And, the posture detector may detect the posture of the projector by detecting the position of the adjusting member.

With this configuration, the posture detector detects the posture of the projector by detecting the position of the adjusting member sealed in the open valve that allows the bubble accumulator to communicate with the outside of the cooling fluid accumulator, so that the variation in the posture of the projector can easily and surely be detected. Additionally, there is no need of an additional component for detection, thus simplifying the configuration of the projector and saving the cost.

BRIEF DESCRIPTION OF THE DRAWINGS

The invention will be described with reference to the accompanying drawings, wherein like numbers reference like elements.

FIGS. 4A and 4B are illustrations each showing the structure of a main tank of the aforesaid exemplary embodiment, in which FIG. 4A is a plan view showing the upper side of the main tank while FIG. 4B is a cross section taken along a line A-A of FIG. 4A;

DESCRIPTION OF EXEMPLARY EMBODIMENT(S)

First Exemplary Embodiment

A first exemplary embodiment of the invention will be described below with reference to the attached drawings.

I. Configuration of Projector

Figure 1:
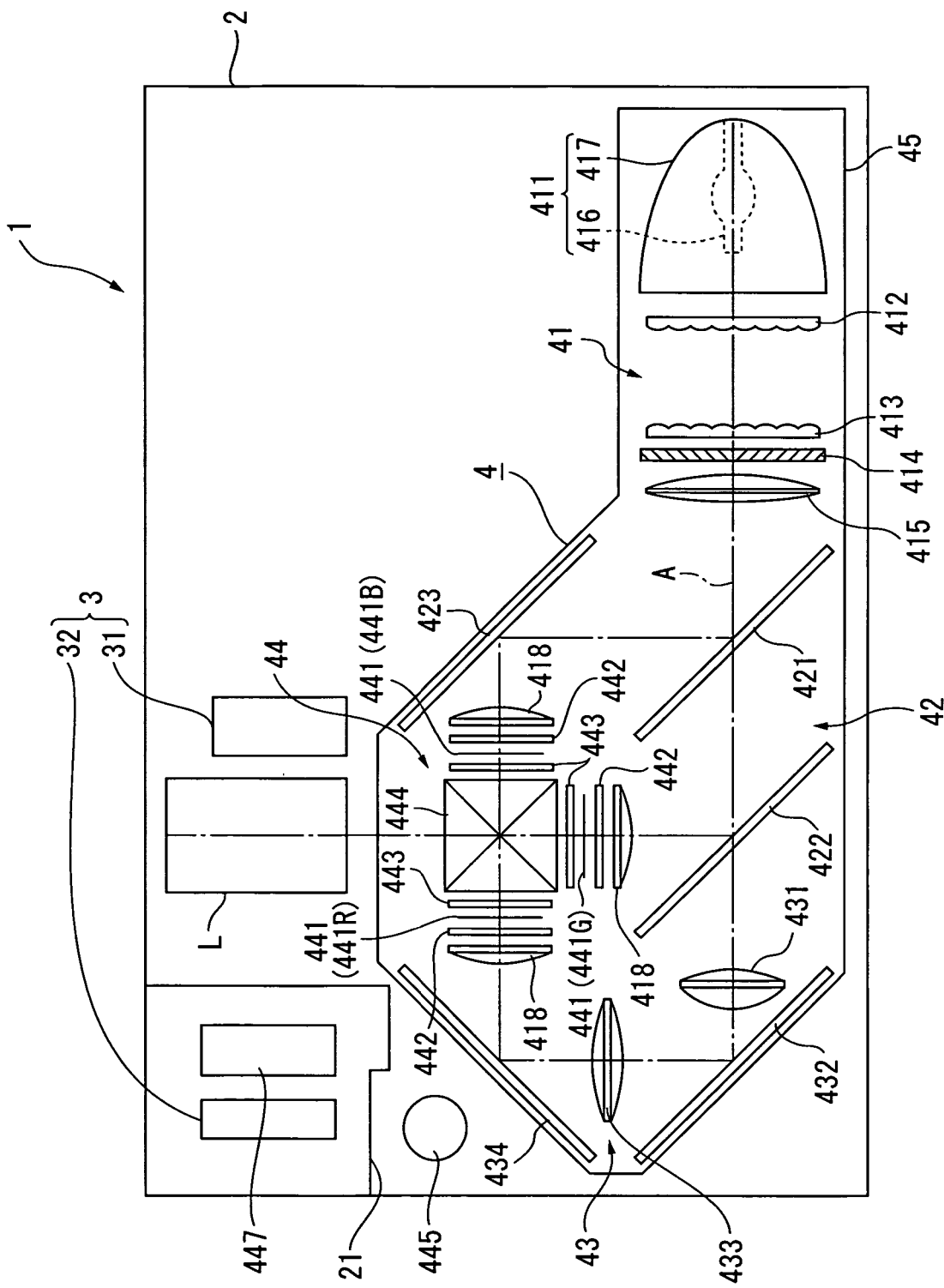
FIG. 1 is a schematic illustration showing the brief structure of a projector according to a first exemplary embodiment of the invention.

FIG. 1 is a schematic illustration showing the brief structure of a projector 1.

The projector 1 modulates a light beam irradiated by a light source in accordance with image information to form an optical image, and projects the formed image on a screen in an enlarged manner. The projector 1 includes an exterior case 2, a cooling unit 3, an optical unit 4 and a projection lens L as a projection optical device.

In FIG. 1, although not shown, a power source block, a lamp driving circuit and the like are disposed in a space not occupied by the cooling unit 3, the optical unit 4 and the projection lens L in the exterior case 2.

The exterior case 2 is made of synthetic resin or the like, and formed in a substantially rectangular parallelepiped with the cooling unit 3, the optical unit 4 and the projection lens L housed and arranged therein. The exterior case 2, although not shown, is formed with an upper case constituting a top side, a front side, a rear side and lateral sides of the projector 1 and a lower case constituting a bottom side, a front side, lateral sides and a rear side of the projector 1. The upper case and the lower case are fixed to each other with screws or the like.

The exterior case 2 may not necessarily be made of synthetic resin, and other material such as metals may be used.

Although not shown, the exterior case 2 is provided with an intake port for introducing the cooling air from the outside of the projector 1 to the inside by the cooling unit 3 and an exhaust port for exhausting the air heated in the projector 1.

As shown in FIG. 1, in the exterior case 2, a partition 21 located on a side of the projection lens L and at a corner of the exterior case 2 is formed to separate a radiator of a later-described optical device of the optical unit 4 from other components.

The cooling unit 3 flows the cooling air into a cooling path formed in the projector 1 for reducing the heat generated in the projector 1. The cooling unit 3 includes: a sirocco fan 31 located on a side of the projection lens L for introducing the cooling air from the outside of the projector 1 to the inside thereof through the not-shown intake port formed in the exterior case 2 to blow the cooling air onto a liquid crystal panel of the later-described optical device of the optical unit 4; and an axial flow fan 32 located inside the partition 21 formed in the exterior case 2 to introduce the cooling air from the outside of the projector 1 to the inside thereof through the intake port (not shown) formed in the exterior case 2 to blow the cooling air onto the later-described radiator of the optical unit 4.

Although not shown, the cooling unit 3 includes a cooling fan for cooling a later-described light source device of the optical unit 4, the not-shown power source block, the lamp driving circuit and the like, in addition to the sirocco fan 31 and the axial flow fan 32.

The optical unit 4 is a unit for optically processing the light beam irradiated by the light source to form an optical image (color image) in accordance with the image information. As shown in FIG. 1, the optical unit 4 has a substantially L-shape in plan view, extending along the rear side and along the lateral side of the exterior case 2. Incidentally, the detailed configuration of the optical unit 4 will be described later.

The projection lens L is a lens set of combined plural lens. The projection lens L projects the optical image (color image) formed by the optical unit 4 on a not-shown screen in an enlarged manner.

II. Configuration of Optical Unit

As shown in FIG. 1, the optical unit 4 includes an integrator illuminating optical system 41, a color-separating optical system 42, a relay optical system 43, an optical device 44 and an optical component casing 45 in which the optical components 41 to 44 are housed and arranged.

The integrator illuminating optical system 41 is an optical system for substantially uniformly illuminating an image formation area of the later-described liquid crystal panel of the optical device 44. As shown in FIG. 1, the integrator illuminating optical system 41 has a light source device 411, a first lens array 412, a second lens array 413, a polarization converter 414 and a superposing lens 415.

The light source device 411 has a light source lamp 416 irradiating a radial light beam and a reflector 417 for reflecting the radial light beam irradiated by the light source lamp 416. As the light source lamp 416, halogen lamp, metal halide lamp and high-pressure mercury lamp are often used. As the reflector 417, although a parabolic mirror is employed in FIG. 1, an ellipsoidal mirror provided with a parallelizing concave lens on the light irradiation side thereof for parallelizing the light beam reflected by the ellipsoidal mirror may alternatively be employed.

The first lens array 412 has small lenses arranged in a matrix, the lenses having substantially rectangular profile as seen in an optical axis direction. Each of the small lenses separates the light beam irradiated by the light source device 411 into a plurality of sub-beams.

The second lens array 413 is arranged approximately in the same manner as the first lens array 412, which includes small lenses arranged in a matrix. The second lens array 413 focuses images of the small lenses of the first lens array 412 onto the later-described liquid crystal panel of the optical device 44 together with the superposing lens 415.

The polarization converter 414 is disposed between the second lens array 413 and the superposing lens 415 to convert the light from the second lens array 413 into a substantially uniform polarized light.

Specifically, the respective sub-beams converted into the substantially uniform polarized light by the polarization converter 414 are substantially superposed on the later-described liquid crystal panel of the optical device 44 by the superposing lens 415 finally. Since only one-type of polarized light can be used in the projector using the liquid crystal panel that modulates the polarized light, approximately half of the light beam from the light source device 411 cannot be used because the light source device 411 emits random polarized light. Accordingly, with the use of the polarization converter 414, the light irradiated by the light source device 411 is converted into the substantially uniform polarized light to enhance the light utilization efficiency of the optical device 44.

As shown in FIG. 1, the color-separating optical system 42 has two dichroic mirrors 421 and 422, and a reflection mirror 423, and separates the plurality of sub-beams irradiated from the integrator illuminating optical system 41 into three color lights of red (R), green (G) and blue (B) by the dichroic mirrors 421 and 422.

As shown in FIG. 1, the relay optical system 43 has an incident-side lens 431, a relay lens 433 and reflection mirrors 432 and 434, and guides red light separated by the color-separating optical system 42 to the liquid crystal panel for red light (described later) of the optical device 44.

At this time, the dichroic mirror 421 of the color-separating optical system 42 reflects the blue light component of the light beam irradiated from the integrator illuminating optical system 41 and transmits the red light component and green light component. The blue light reflected by the dichroic mirror 421 is reflected by the reflection mirror 423, which reaches to the liquid crystal panel for blue light (described later) of the optical device 44 through a field lens 418. The field lens 418 converts the respective sub-beams irradiated from the second lens array 413 into a light beam parallel to the center axis (main beam) thereof. Field lenses 418 provided on the light incident side of other liquid crystal panels for green light and red light function in the same manner.

In the red and green lights transmitted through the dichroic mirror 421, the green light is reflected by the dichroic mirror 422, which reaches to the liquid crystal panel for green light (described later) of the optical device 44 through the field lens 418. On the other hand, the red light passes through the dichroic mirror 422, and further passes through the relay optical system 43 to reach the liquid crystal panel for red light (described later) of the optical device 44 through the field lens 418. Incidentally, the relay optical system 43 is used for the red light in order to avoid deterioration in the light utilization efficiency on account of light dispersion and the like caused by the longer length of the optical path of the red light than the optical paths of other color lights. In other words, the relay optical system 43 is used for directly transmitting the sub-beams incident on the incident-side lens 431 to the field lens 418. Though such configuration is used in the present exemplary embodiment because of the longer optical path of the red light, the optical path of the blue light may alternatively be lengthened.

As shown in FIG. 1, in the optical device 44, three liquid crystal panels 441 (441R for red light, 441G for green light and 441B for blue light) as optical modulators, incident-side polarization plates 442 and irradiation-side polarization plates 443 respectively disposed on the light incident side and the light irradiation side of the liquid crystal panels 441, and a cross dichroic prism 444 as a color-combining optical device are integrated.

Although described later in detail, the optical device 44 includes a main tank 445, a fluid press-feeder, the radiator, a fluid circulator 448 (see FIG. 2), a relay tank (see FIG. 2), and an optical modulator holder 4402 (see FIG. 2) in addition to the liquid crystal panels 441, the incident-side polarization plates 442, the irradiation-side polarization plates 443 and the cross dichroic prism 444.

The liquid crystal panel 441 includes a pair of substrates 441C and 441D (see FIG. 6) made of glass or the like with liquid crystal (electrooptic material) sealed therebetween. The substrate 441C (see FIG. 6) defines a driving substrate for driving liquid crystal, having a plurality of data lines arranged parallel to each other, a plurality of scanning lines arranged in direction orthogonal to the plurality of data lines, picture electrodes arranged in a matrix corresponding to intersection of the scanning lines and the data lines, and TFTs (Thin Film Transistors) as switching elements. The substrate 441D (see FIG. 6) is an opposite substrate disposed to face the substrate 441 C with a predetermined space therebetween, which includes common electrodes to which a predetermined voltage is applied. The substrates 441C and 441D are electrically connected with a not-shown controller, to which a flexible printed substrate 441E (see FIG. 6) for outputting a predetermined driving signal to the scan lines, the data lines, the switching elements, the common electrodes and the like is connected. By inputting the driving signal from the controller through the flexible printed substrate 441E (see FIG. 6), a predetermined voltage is applied between the selected picture electrodes and the common electrodes, so that orientation of the liquid crystal located between the picture electrodes and the common electrodes is controlled, and thereby the polarization direction of the polarized light beam irradiated from the irradiation-side polarization plate 442 is modulated.

On the incident-side polarization plate 442, the color lights of which the polarization direction is substantially aligned to one direction by the polarization converter 414 are incident, so that only the polarized lights in the same direction as the polarization direction of the light beams aligned by the polarization converter 414 are transmitted through the incident-side polarization plate 442, and the light beams in other directions are absorbed thereby. The incident-side polarization plate 442 has a light-transmissive substrate (not shown) made of sapphire glass, crystal or the like with a polarization film (not shown) attached on the substrate.

The irradiation-side polarization plates 443 each have a light-transmissive substrate 443A and a polarization film 443B (see FIG. 7) as an optical conversion film in the same manner as the incident-side polarization plates 442, which only transmit the light beam having polarization axis orthogonal to a transmissive axis of the light beam in the incident-side polarization plates 442 and absorb other light beams irradiated from the liquid crystal panels 441

The cross dichroic prism 444 is an optical element that combines the optical image irradiated by the irradiation-side polarization plates 443 and modulated for each color light to form a color image. The cross dichroic prism 444 is substantially square in plan view formed by attaching four right-angle prisms, with two dielectric multi-layer films formed on the boundaries where the right-angle prisms are attached to each other. These dielectric multi-layer films reflect the color lights irradiated by the liquid crystal panels 441R and 441B and passed through the irradiation-side polarization plates 443, and absorb the color light irradiated by the liquid crystal panel 441G and passed through the irradiation-side polarization plate 443. In this way, the color lights respectively modulated by the liquid crystal panels 441R, 441G and 441B are combined to form a color image.

III. Configuration of Optical Device

Figure 2:
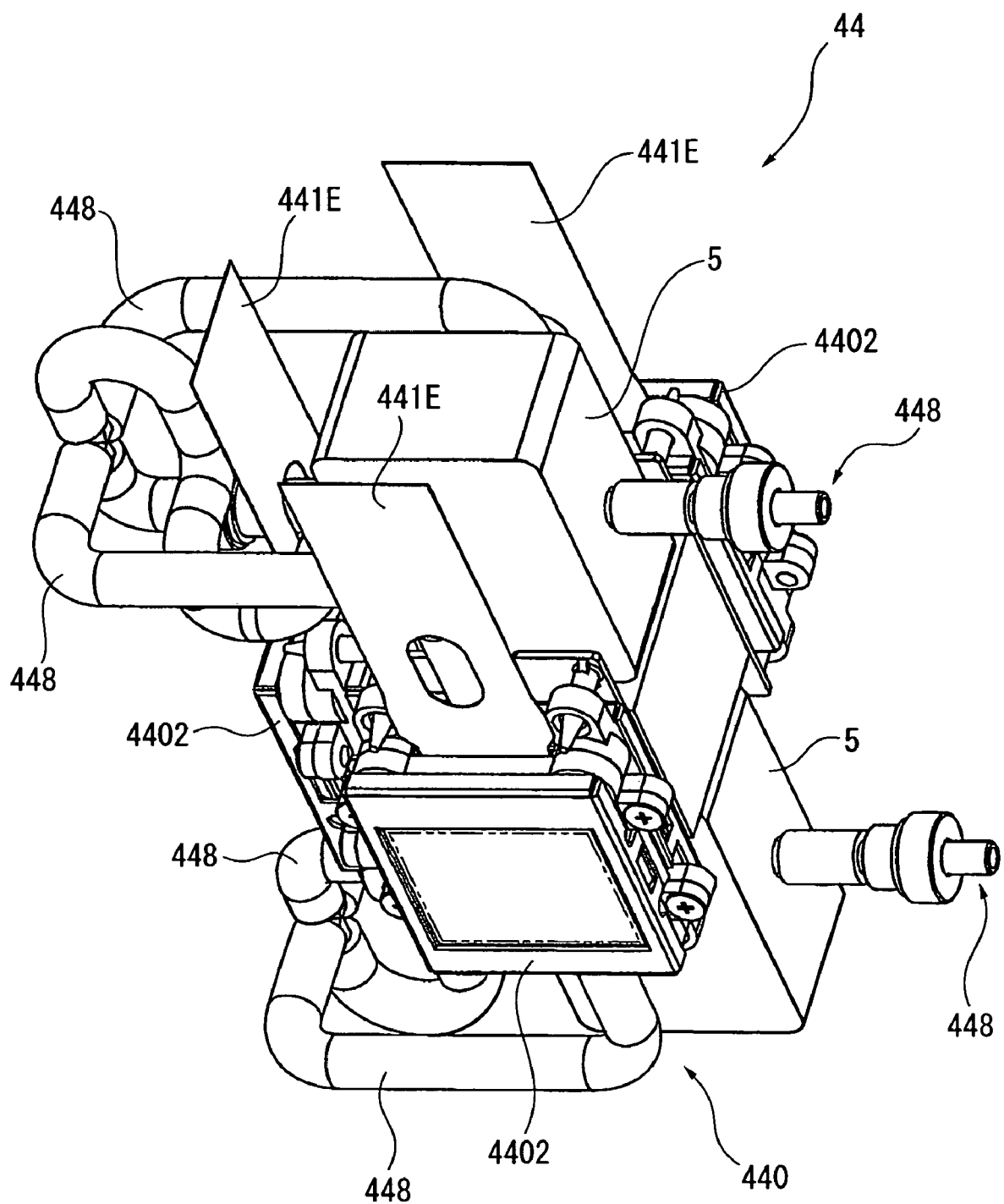
FIG. 2 is a perspective view showing an optical device body of the projector of the aforesaid exemplary embodiment.
Figure 3:
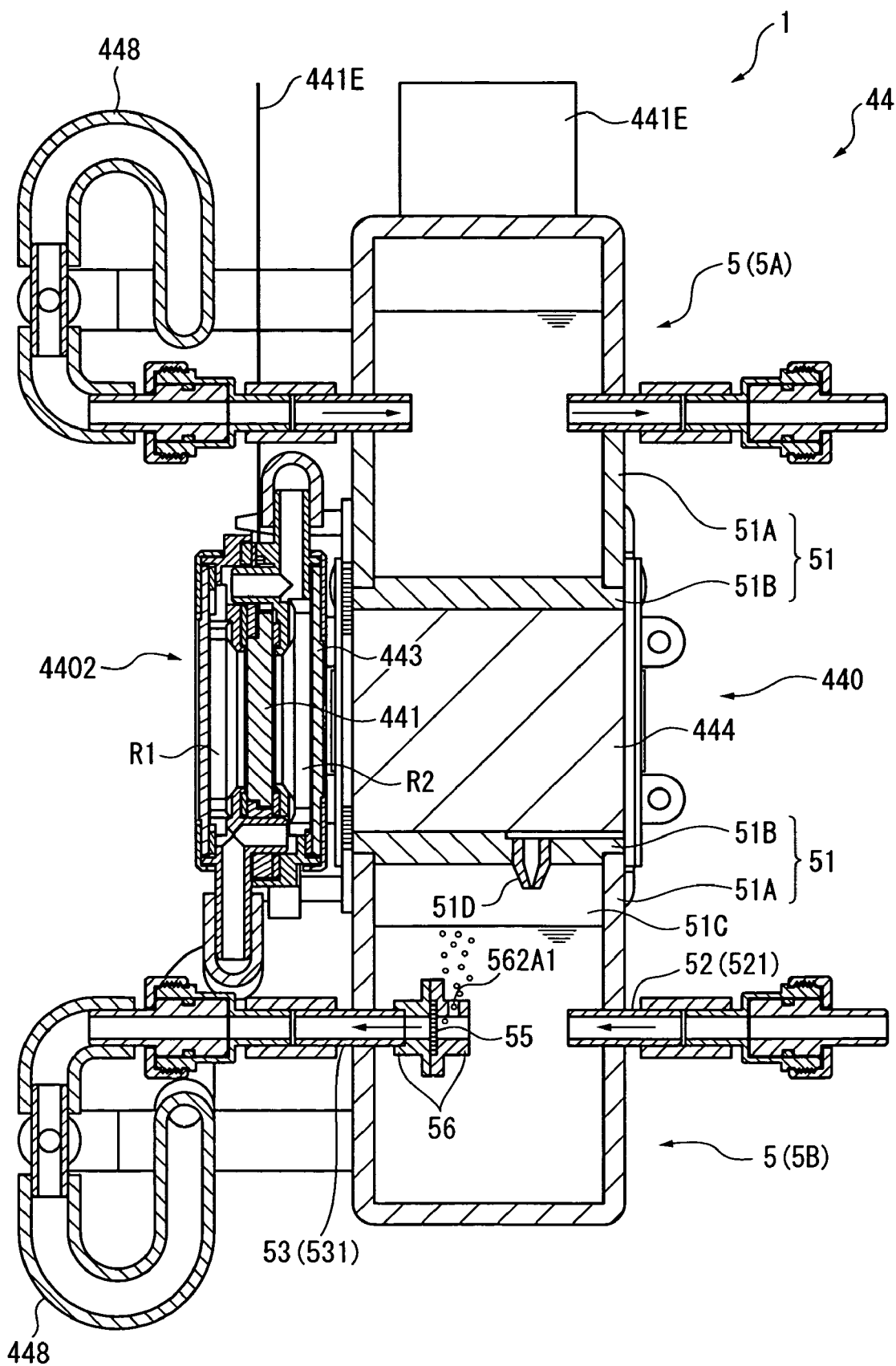
FIG. 3 is a cross section showing the inner structure of the optical device body shown in FIG. 2.

The configuration of the optical device 44 will be described below with reference to FIGS. 1 to 4B. FIGS. 2 and 3 are illustrations each showing the brief structure of an optical device body 440. FIG. 2 is a perspective view showing the upper side of the optical device body 440, and FIG. 3 is a cross section showing the inner structure of the optical device body 440.

As shown in FIGS. 1 to 4B, the optical device 44 includes the optical device body 440 in which the liquid crystal panel 441, the incident-side polarization plate 442, the irradiation-side polarization plate 443 and the cross dichroic prism 444 are integrated, the main tank 445, the fluid press-feeder (not shown), a pair of the relay tanks 5, the radiator 447 and a plurality of the fluid circulators 448. The optical device body 440 includes the three liquid crystal panels 441, the three incident-side polarization plates 442, the three irradiation-side polarization plates 443, the cross dichroic prism 444, the three optical modulator holders 4402, the fluid press-feeder (not shown), the plurality of fluid circulators 448 and the two relay tanks 5 as its basic configuration.

Here, the optical device 44 of the present exemplary embodiment flows the fluid in the main tank 445 by the fluid press-feeder (not shown) and then to the liquid crystal panels 441 via the plurality of liquid circulators 448 and the relay tanks 5 for cooling the liquid crystal panels 441 and the like.

Figure 4A:
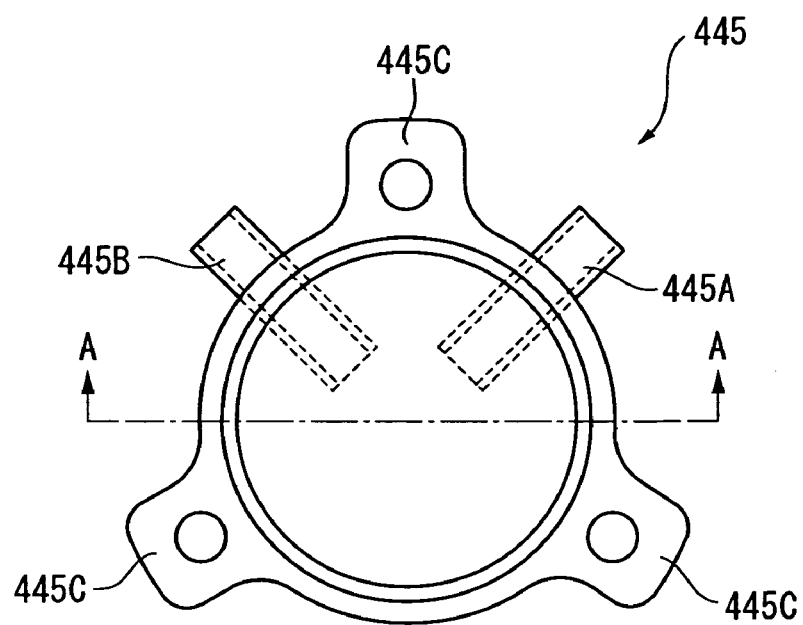
Figure 4B:
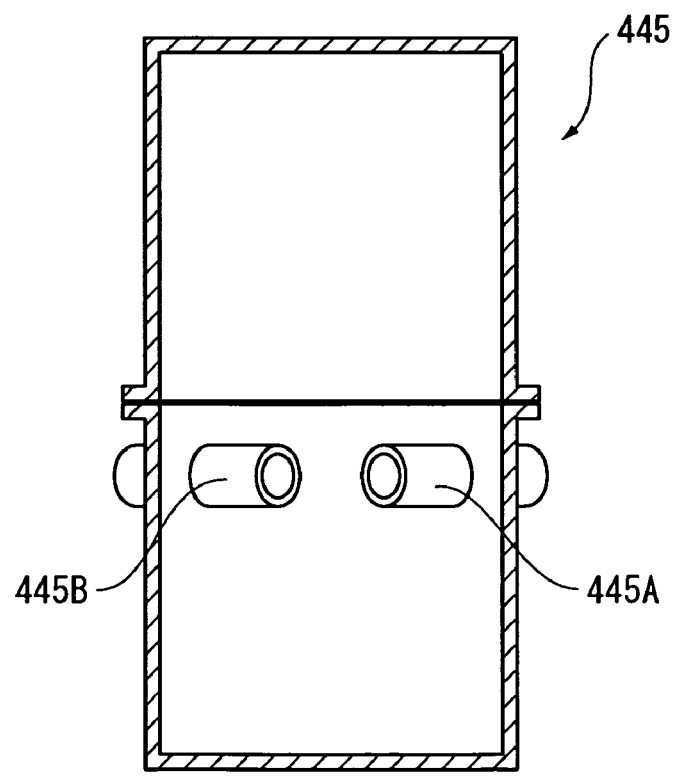

FIGS. 4A and 4B are illustrations each showing the configuration of the main tank 445. Specifically, FIG. 4A is a plan view showing the upper side of the main tank 445. And, FIG. 4B is a cross section taken along line A-A of FIG. 4A.

The main tank 445 has a substantially cylindrical shape, and is formed with two aluminum container-like members. Openings of the two container-like members are connected to each other, so that the cooling fluid can temporarily be housed therein. The container-like members, for instance, are connected to each other by seal welding or with an elastic member such as rubber to be interposed therebetween.

As shown in FIG. 4B, in the main tank 445, a cooling fluid inflow section 445A for flowing the cooling fluid to the inside thereof and a cooling fluid outflow section 445B for flowing the cooling fluid to the outside are formed substantially at the center in a cylindrical axis direction thereof.

The cooling fluid inflow section 445A and the cooling fluid outflow section 445B are substantially cylindrical members having tube diameter smaller than the tube diameter of the fluid circulator 448, which project toward the inside and the outside of the main tank 445. One outwardly-projecting end of the cooling fluid inflow section. 445A is connected to an end of the fluid circulator 448, so that the cooling fluid is introduced into the main tank 445 from the outside through the fluid circulator 448. One outwardly-projecting end of the cooling fluid outflow section 445B is also connected to an end of the fluid circulator 448, so that the cooling fluid in the main tank 445 is discharged to the outside through the fluid circulator 448.

As shown in FIG. 4A, other inwardly-projecting ends of the cooling fluid inflow section 445A and the cooling fluid outflow section 445B extend toward the cylindrical axis of the main tank 445, the inflow and outflow sections being disposed to be substantially orthogonal to each other in plan view. As described above, since the cooling fluid inflow section 445A and the cooling fluid outflow section 445B are arranged to be substantially orthogonal to each other in plan view, the cooling fluid flowed into the main tank 445 via the cooling fluid inflow section 445A will not flow directly to the outside via the cooling fluid outflow section 445B, but will be mixed with the cooling fluid in the main tank 445, so that the temperature of the cooling fluid can be equalized.

As shown in FIG. 4A, on an outer circumferential surface of the main tank 445, three fixing section 445C are respectively provided to the two container-like members substantially at the center of the cylindrical axis direction. By inserting screws (not shown) into the fixing section 445C and by screwing them with the bottom side of the exterior case 2, the two container-like members are tightly connected with each other, and further, the main tank 445 is fixed to the exterior case 2.

As shown in FIG. 1, the main tank 445 is disposed in an area having a substantially triangle shape in plan view defined by the optical component casing 45 and the inner side of the exterior case 2.

By disposing the main tank 445 in the area, housing efficiency of the exterior case 2 can be improved, so that increase in size of the projector 1 can be avoided.

The fluid press-feeder (not shown) flows the cooling fluid accumulated in the main tank 445 and forcibly flows the cooling fluid to the outside. Thus, though not shown in detail, the fluid press-feeder communicates with the other end of the fluid circulator 448 being connected to the cooling fluid outflow section 445B of the main tank 445, and also communicates with one end of another fluid circulator 448 for flowing the cooling fluid to the outside.

Although not shown in detail, the fluid press-feeder is, for instance, an aluminum hollow member having substantially rectangular parallelepiped with an impeller disposed therein. By rotating the impeller under control of a not-shown controller, the cooling fluid accumulated in the main tank 445 is forcibly flowed through the fluid circulator 448 and the flowed cooling fluid is forcibly flowed to the outside through the fluid circulator 448. With such configuration, the thickness of the fluid press-feeder can be reduced in rotation axis direction of the impeller, thereby allowing installation at an unused space in the projector 1, improving housing efficiency of the projector 1, and avoiding increase in size of the projector 1. Incidentally, the fluid press-feeder is only required to be arranged below the projection lens L, etc.

IV. Configuration of Optical Modulator Holder

Figure 5:
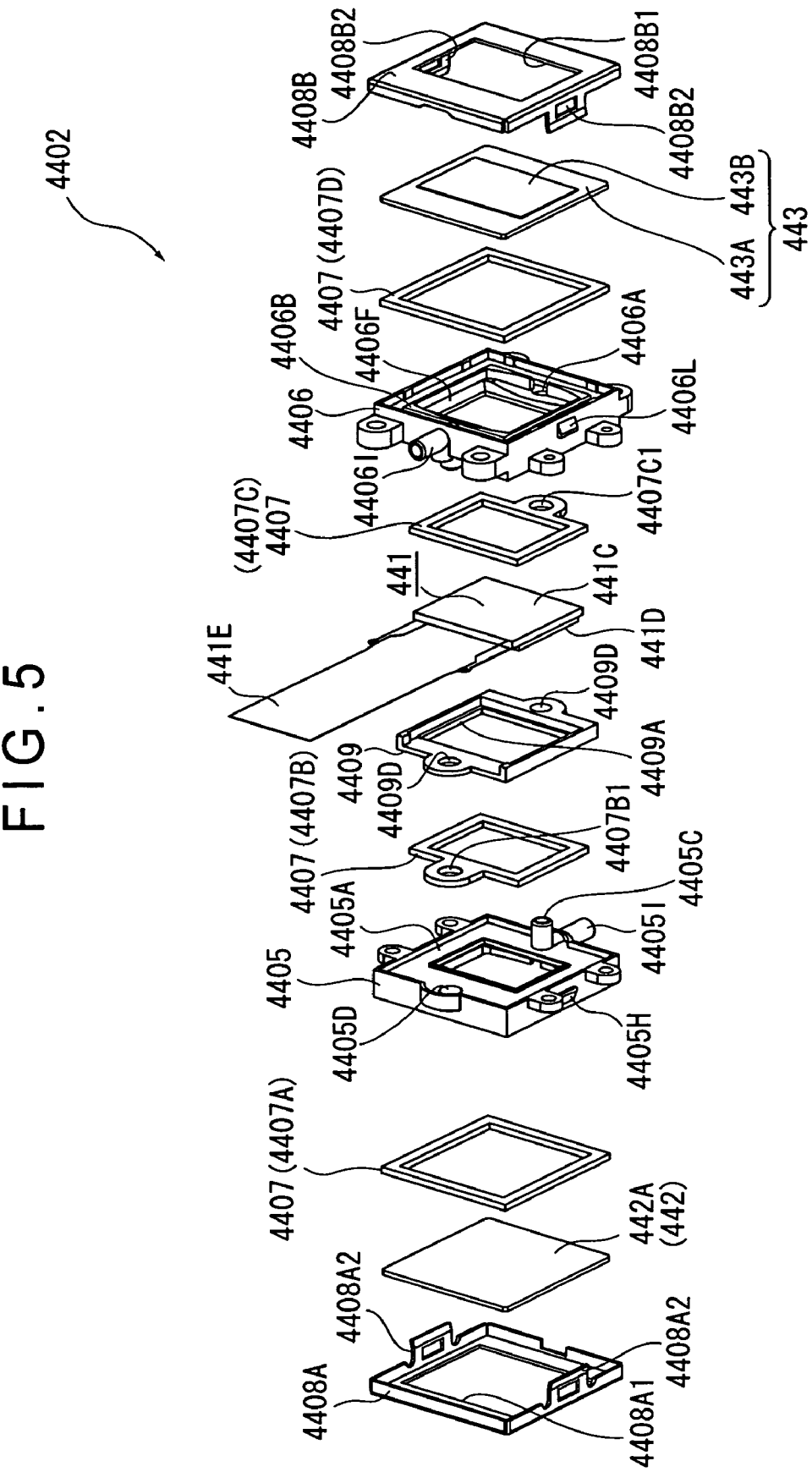
FIG. 5 is an exploded perspective view showing an optical modulator holder of the aforesaid exemplary embodiment.
Figure 6:
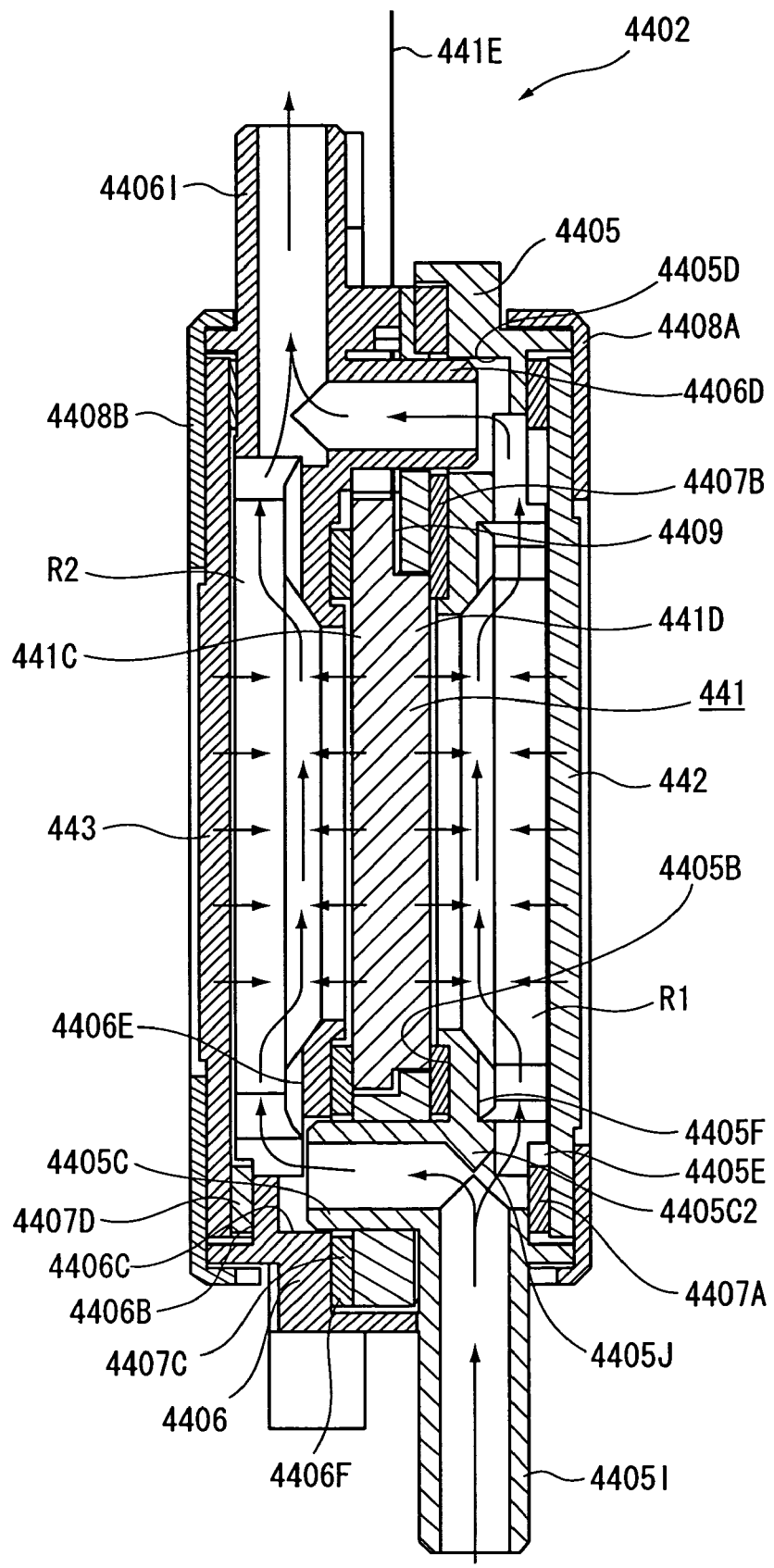
FIG. 6 is a cross section of the optical modulator holder of FIG. 5.

FIG. 5 is an exploded perspective view showing the brief structure of the optical modulator holder 4402, and FIG. 6 is a cross section of the optical modulator holder 4402.

The three optical modulator holders 4402 respectively hold the three liquid crystal panels 441, the three incident-side polarization plates 442 and the three irradiation-side polarization plates 443. The cooling fluid flows into the optical modulator holders 4402 to respectively cool the three liquid crystal panels 441, the three incident-side polarization plates 442 and the three irradiation-side polarization plates 443.

The optical modulator holders 4402 each have a pair of frame members 4405, 4406, four elastic members 4407 (4407A to 4407D), a pair of polarization plate fixtures 4408A, 4408B and a middle frame 4409.

The polarization plate fixtures 4408A, 4408B that press and fix the incident-side polarization plate 442 and the irradiation-side polarization plate 443 respectively to the frame members 4405, 4406 via a first elastic member 4407A and a fourth elastic member 4407D. The polarization plate fixtures 4408A and 4408B each have a rectangular frame shape in plan view with openings 4408A1 and 4408B1 formed substantially at the center thereof. The peripheries of the openings 4408A1 and 4408B1 respectively press and fix the incident-side polarization plate 442 and the irradiation-side polarization plate 443 to the frame members 4405 and 4406. The polarization plate fixtures 4408A and 4408B are respectively provided with hook engaging sections 4408A2 and 4408B2 at the right and left edges. By engaging the hook engaging sections 4408A2 and 4408B2 with respective hooks 4405H and 4406L of the frame members 4405 and 4406, the polarization plate fixtures 4408A and 4408B are fixed to the frame members 4405 and 4406 with the incident-side polarization plate 442 and the irradiation-side polarization plate 443 being pressed.

The elastic members 4407 consist of the first elastic member 4407A interposed between the incident-side polarization plate 442 and the frame member 4405, a second elastic member 4407B interposed between the frame member 4405 and the middle frame 4409, a third elastic member 4407C interposed between the liquid crystal panel 441 and the frame member 4406 and the fourth elastic member 4407D interposed between the frame member 4406 and the irradiation-side polarization plate 443.

The first elastic member 4407A and the fourth elastic member 4407D are formed in rectangular frames, and respectively arranged on cavities 4405E, 4406B of the frame members 4405, 4406 (described later).

The second elastic member 4407B is formed in a rectangular frame with an insertion hole 4407B1 formed substantially at the center in horizontal direction of its upper side. The second elastic member 4407B is disposed on a cavity 4405B of the frame member 4405 (described later).

The third elastic member 4407C is formed in a rectangular frame with an insertion hole 4407C1 formed substantially at the center in horizontal direction of its downward direction side. The third elastic member 4407C is disposed on a cavity 4406F of the frame member 4406 (described later).

The elastic members 4407 are preferably made of elastic silicone rubber, in which surface treatment for enhancing crosslinking density of surface layers is conducted on both sides or one side. Due to the surface treatment provided on the surface, the elastic members 4407 can be easily set in the respective cavities 4405B, 4405E, 4406B and 4406F.

As the elastic members 4407, butyl rubber, fluorocarbon rubber or the like having low moisture permeability may also be employed without limiting to the silicone rubber.

The frame member 4405 is disposed between the light incident side of the liquid crystal panel 441 and the light irradiation side of the incident-side polarization plate 442 in order to support the light incident side of the liquid crystal panel 441 as well as the light irradiation side of the incident-side polarization plate 442.

The frame member 4405 is an aluminum frame which is substantially rectangular in plan view, having substantially at the center a rectangular opening 4405A with a profile corresponding to the image formation area of the liquid crystal panel 441.

As shown in FIGS. 5 and 6, the cavity 4405B, to which the second elastic member 4407B is fitted, is formed in a light irradiation surface of the frame member 4405.

The second elastic member 4407B is fitted to the cavity 4405B and the liquid crystal panel 441 held by the middle frame 4409 is confronted to the opening 4405A, so that the light irradiation side of the opening 4405A is closed.

As shown in FIG. 6, a hole 4405J is formed substantially at the center in horizontal direction of the downward direction side of the frame member 4405 to penetrate from the light irradiation surface to the light incident surface. And, a cylindrical section 4405C is formed in the frame member 4405, the cylindrical section 4405C communicating with the hole 4405J and projecting toward the light irradiation side.

Further, a cylindrical section 4405I is formed on the lower side of the frame member 4405, which projects downward. The cylindrical section 4405I connects to the fluid circulator 448.

The cylindrical section 4405C is arranged to be orthogonal to the cylindrical section 4405I to communicate therewith. A part of an inner side of the cylindrical section 4405C extends to intersect with the center axis of the cylindrical section 4405I, that part being provided with a projection 4405C2 for dividing the cooling fluid flowed via the cylindrical section 4405I into the light incident side and the light irradiation side of the frame member 4405.

Formed substantially at the center in horizontal direction of the upper side of the cavity 4405B is an insertion hole 4405D that penetrates from the light irradiation surface to the light incident surface and enables a cylindrical section 4406D (described later) of the frame member 4406 to be inserted.

Formed in the light incident surface of the frame member 4405 is the cavity 4405E corresponding to the first elastic member 4407A. The first elastic member 4407A is fitted to the cavity 4405E and the incident-side polarization plate 442 is abutted on the first elastic member 4407A, so that the incident-side polarization plate 442 is held between the frame member 4405 and the polarization plate fixture 4408A.

The cavity 4405F deeper than the cavity 4405E is formed in the light incident surface of the frame member 4405.

In the frame member 4405 having the above-described configuration, the light irradiation side of the opening 4405A is closed by supporting the light incident surface of the liquid crystal panel 441 with the cavity 4405B via the second elastic member 4407B and the middle frame 4409. By fixing the polarization plate fixture 4408A to the frame member 4405, the incident-side polarization plate 442 is pressed to the frame member 4405 with the first elastic member 4407A interposed therebetween, so that the light incident side of the opening 4405A of the frame member 4405 is closed. Because the light incident side and the light irradiation side of the opening 4405A of the fame member 4405 are closed, a first cooling chamber RI (see FIG. 6) is formed, which enables the cooling fluid to be sealed inside the frame member 4405.

The first cooling chamber R1 confronting the image formation area of the liquid crystal panel 441 is defined by the incident-side polarization plate 442 and the liquid crystal panel 441, so that the heat can be transferred to the cooling fluid inside the first cooling chamber R1.

The frame member 4406 holds the liquid crystal panel 441 with its light incident surface via the third elastic member 4407C, and the irradiation-side polarization plate 443 with its light irradiation surface via the fourth elastic member 4407D.

The frame member 4406, like the above-described frame member 4405, is an aluminum frame which is substantially rectangular in plan view, having at the center a rectangular opening 4406A with a profile corresponding to the image formation area of the liquid crystal panel 441.

The cavity 4406B having a rectangular frame shape corresponding to the shape of the fourth elastic member 4407D is formed in the light irradiation surface of the frame member 4406, so that the irradiation-side polarization plate 443 is supported by the cavity 4406B with the fourth elastic member 4407D interposed therebetween. Since the frame member 4406 supports the light incident surface of the irradiation-side polarization plate 443, the light irradiation side of the opening 4406A is closed with the light incident surface of the irradiation-side polarization plate 443.

A cavity 4406E deeper than the cavity 4406B is formed in the inner side of the cavity 4406B of the frame member 4406. A cylindrical section 44061 projecting upward is formed in the frame member 4406 to communicate with the cavity 4406E.

The cylindrical section 4406D projecting toward the frame member 4405 is formed on the light incident surface of the frame member 4406 to communicate with the cylindrical section 44061.

A cavity 4406F is formed in the light incident surface, the cavity 4406F corresponding to the shape of the third elastic member 4407C. The third elastic member 4407C is fitted to the cavity 4406F and the liquid crystal panel 441 is pressed by the frame member 4405, so that the opening 4406A of the frame member 4406 is closed.

In other words, in the frame member 4406, by pressing the liquid crystal panel 441 to the light incident surface and by pressing the irradiation-side polarization plate 443 to the light irradiation surface, the opening 4406A is closed to form a second chamber R2, by which the cooling fluid is injected inside the frame member 4406.

The second cooling chamber R2 confronting the image formation area of the liquid crystal panel 441 is defined by the irradiation-side polarization plate 443 and the liquid crystal panel 441, so that the heat can be transferred to the cooling fluid inside the second cooling chamber R2.

A hole 4406C is formed in the frame member 4406 so that the cylindrical section 4405C of the frame member 4405 is inserted thereto. The hole 4406C is formed to communicate with the second cooling chamber R2.

Screw holes are respectively formed in the frame members 4405, 4406, and the frame members 4405, 4406 are combined by screwing screws into the screw holes.

When the frame member 4406 and the frame member 4405 are combined, the cylindrical section 4406D of the frame member 4406 is inserted to the insertion hole 4405D of the frame member 4405 via an insertion hole 4409D (described later) of the middle frame 4409 and the insertion hole 4407B1 of the second elastic member 4407B.

Additionally, when the frame member 4406 and the frame member 4405 are combined, the cylindrical section 4405C of the frame member 4405 is inserted to the hole 4406C of the frame member 4406 via the insertion hole 4409D of the middle frame 4409 and the insertion hole 4407C 1 of the third elastic member 4407C.

The middle frame 4409 is formed by an aluminum plate having a substantially rectangular shape in plan view, which holds the liquid crystal panel 441 while positioning the liquid crystal panel 441 in place of the frame members 4405 and 4406.

In the middle frame 4409, a rectangular opening 4409A enabling the opposite substrate 441D of the liquid crystal panel 441 to be fitted is formed substantially at the center thereof. By fitting the opposite substrate 441D of the liquid crystal panel 441 in the opening 4409A, the liquid crystal panel 441 can be positioned relative to the middle frame 4409.

In the middle frame 4409, the two insertion holes 4409D enabling the cylindrical sections 4406C, 4406D of the frame member 4406 to be inserted are respectively formed substantially at the center in horizontal direction on the lower edge and at the left corner of the upper edge when seen from the light irradiation side. The two insertion holes 4409D function as positioning holes for the middle frame 4409 relative to the frame member 4406. By inserting the cylindrical sections 4406C, 4406D of the frame member 4406 into the two insertion holes 4409D of the middle frame 4409 with the liquid crystal panel 441 having been positioned relative to the middle frame 4409 in advance, the middle frame 4409 is positioned relative to the frame member 4406, in other words, the liquid crystal panel 441 is positioned in place of the frame member 4406.

V. Configuration of Liquid Accumulator (Relay Tank)

Configuration of the relay tanks 5 (fluid accumulator) will be described referring to FIGS. 3, 4A, 4B, 7 and 8. As shown in FIG. 3, the relay tanks 5 are vertically confronted to each other with the cross dichroic prism 444 interposed therebetween. Herein, the relay tank 5 arranged on the upper side of the cross dichroic prism 444 is defined as a relay tank 5A whereas the relay tank 5 arranged on the lower side of the cross dichroic prism 444 is defined as a relay tank 5B.

Note that the arrow in drawings indicates flow direction of the cooling fluid.

The relay tank 5B corresponds to the outflow cooling fluid accumulator of the invention, which includes a tank body 51 with the cooling fluid accumulated, a cooling fluid inflow section 52 that allows the cooling fluid to flow inside the tank body 51, and a cooling fluid outflow section 53 that allows the cooling fluid to flow outside the tank body 51.

The tank body 51 is a hollow and substantially rectangular parallelepiped with the cooling fluid accumulated therein. The tank body 51 includes a body section 51A having a substantially U-shape in cross section which is opened toward the upper side in FIG. 7, and a lid member 51B closing the opening of the body section 51A.

The body section 51A has a bottom side 51A1 having a substantially rectangular shape in plan view and lateral sides 51A2 upstanding on a peripheral edge of the bottom side 51A1.

Holes 51A21 are formed in a pair of the lateral sides 51A2 confronting to each other out of the lateral sides 51A2, and pipes 521, 531 defining the cooling fluid inflow section 52 and a cooling fluid outflow section 53 are connected to the inside of the holes 51A21.

The cooling fluid is accumulated in the tank body 51. The liquid level of the cooling fluid is located above the holes 51A21 formed in the lateral sides of the tank body 51 (see FIG. 7) and connected to the pipes 521, 531 of the cooling fluid inflow section 52 and the cooling fluid outflow section 53. Namely, a space defined by the liquid level of the cooling fluid and the lid member 51B is a bubble accumulator 51C.

Figure 7:
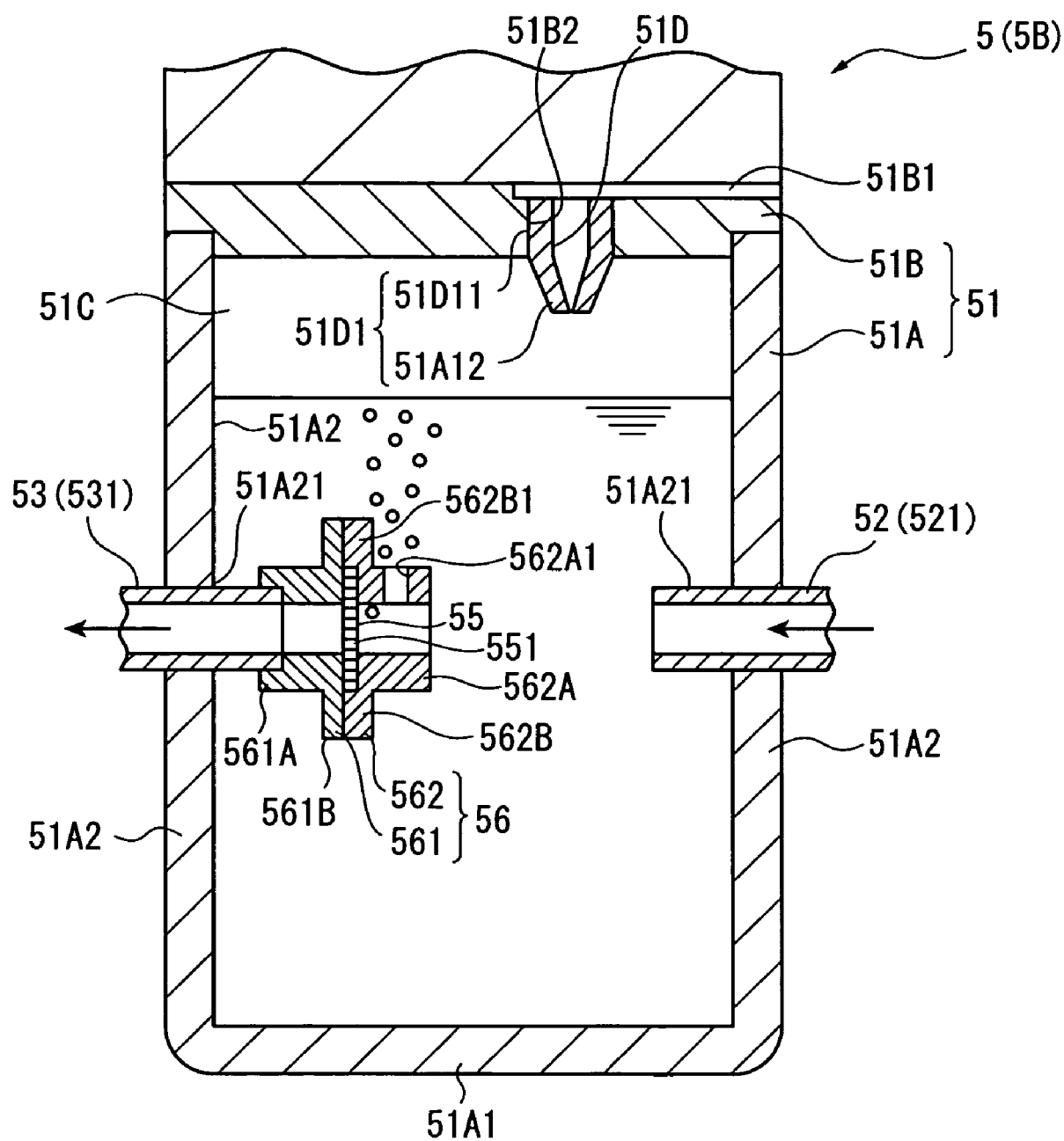
FIG. 7 is a cross section showing a relay tank of the aforesaid exemplary embodiment.
Figure 8:
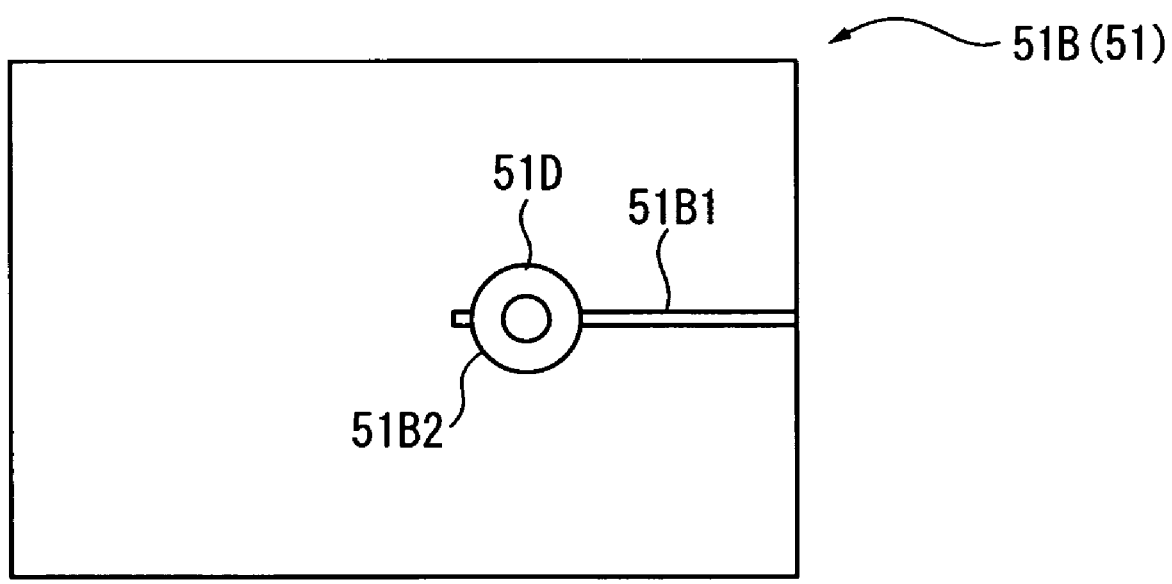
FIG. 8 is a plan view showing a lid member of the relay tank of FIG. 7.

Incidentally, FIG. 8 is an illustration of the lid member 51B as seen from the upper side in FIG. 7 (on the cross dichroic prism 444 side). The lid member 51B is a flat plate with a groove 51B1 formed in the upper side and a penetrating hole 51B2 penetrating through the lid member 51B. The groove 51B1 and the penetrating hole 51B2 form a communicating path. As shown in FIG. 8, the groove 51B1 extends along an axial line connecting the cooling fluid inflow section 52 and the cooling fluid outflow section 53. The penetrating hole 51B2 connects to a part of the groove 51B1 while the penetrating hole 51B2 allows a bubble accumulator 51C to communicate with the outside of the tank body 51. An open valve 51D is arranged inside the penetrating hole 51B2.

Referring back to FIG. 7, the open valve 51D allowing the outside of the tank body 51 to communicate with the bubble accumulator 51C is formed by integrating a hollow column 51D11 with a spindle 51D12 substantially having a V-shape in cross section integrated at a tip end of the column 51D11.

The open valve 51D shifts the state between the open state for opening the communicating path (groove 51B1 and the penetrating hole 51B2) allowing the bubble accumulator 51C to communicate with the outside of the relay tank 5B and the close state for closing the communicating path, i.e. the open valve 51D functioning as a check valve that shifts to the open state when the inside of the bubble accumulator 51C is in negative pressure relative to the outside of the relay tank 5B, and shifts to the close state when the inside of the bubble accumulator 51C is not in negative pressure relative to the outside of the relay tank 5B. As such check valve, a Duckbill Check Valve (trademark of Vernay Laboratories, Inc) is exemplified.

A filter 55 (bubble trapping) is attached in an end of the pipe 531 arranged inside the body section 51A of the tank body 51 of the cooling fluid outflow section 53 via a fixing member 56. The fixing member 56 that attaches the filter on the end of the pipe 531 includes a first fixing section 561 to be fixed to the pipe 531 and a second fixing section 562 that fixes and holds the filter 55 by interposing the filter 55 between the first and second fixing sections 561, 562.

The first fixing section 561 of the fixing member 56 has a hollow cylindrical section 561A covering the periphery of the end of the pipe 531 and communicating with the pipe 531, and a flange 561B extending from an end of the cylindrical section 561A, the cylindrical section 561A and the flange 561B being integrated to each other.

The second fixing section 562, like the first fixing section 561, has a hollow cylindrical section 562A with its both ends opened, and a flange 562B extending from an end of the cylindrical section 562A, both being integrated to each other.

A dent 562B1 to which the outer peripheral edge of the filter 55 is fitted is formed in the flange 562B. By fitting peripheral edge of the filter 55 to the dent 562B1, holding the peripheral edge of the filter 55 by the flange 561B of the first fixing section 561 and the flange 562B, the filter 55 is fixed in place.

FIG. 7 shows a state in which the fixing member 56 is arranged as surrounding the periphery of the filter 55 for holding it.

The cylindrical section 562A of the second fixing section 562 is arranged on the upstream side in cooling fluid passing direction (in cooling fluid inflow direction of the filter 55) relative to the flange 562B. A hole 562A1 (bubble discharging hole) is formed in the upper side of the cylindrical section 562A to vertically penetrate through the lateral side of the cylindrical section. Namely, the hole 562A1 is formed in the upper side of the fixing member 56 on the inflow side of the cooling fluid about to pass though the pipe 531 relative to the filter 55. Through the hole 562A1, air bubbles which can not pass through the filter 55 are discharged to the outside of the fixing member 56.

The filter 55 shown in FIG. 7 is a plate member with a plurality of small pores, so that the filter 55 enables the cooling fluid to pass but inhibits the air bubbles to pass. The filter 55 is formed such that holes 551 are substantially parallel to the passing direction of the cooling fluid.

The size of the hole 551 of the filter 55 are preferably be smaller than the size of one picture element of the liquid crystal panel 441, for instance, the diameter of the hole 551 may be within a range of 5 to 20 μm. Note that, the diameter of the hole 551 may be determined according to the type, viscosity, surface tension of cooling fluid, as well as the flow pressure of the cooling fluid when circulating.

And the filter 55 is preferably a porous filter. For instance, a reticulate filter made of resin or metal material having high corrosion resistance such as stainless steel, or a porous ceramic filter with countless holes of certain diameter (μm) may be employed. By using the porous filter as the filter 55, air bubbles can further be trapped.

In FIG. 3, although the relay tank 5A arranged on the upper side of the cross dichroic prism 444 has the same configuration as the above-described relay tank 5B arranged on the lower side of the cross dichroic prism 444, the relay tank 5A does not have the filter 55 (bubble trapping). The relay tank 5A corresponds to an inflow cooling fluid accumulator of the invention.

The flat plate lid member 51B of the relay tank 5A does not include the groove 51B1 and the penetrating hole 51B2 unlike the relay tank 5B, and besides, the open valve 51D is not provided thereto neither.

VI. Circulation of Cooling Fluid

Next, circulation of the cooling fluid in the optical device shown in FIG. 3 will be described.

The cooling fluid accumulated in the main tank 445 is discharged via the fluid press-feeder (not shown), passes through the fluid circulator 448 and then introduced to the cooling fluid inflow section 52 of the relay tank 5B. The cooling fluid introduced to the cooling fluid inflow section 52 is guided inside the tank body 51. The cooling fluid guided inside the tank body 51 is accumulated in the tank body 51 and then gradually discharged to the inside of the cylindrical section 562A of the second fixing section 562 of the fixing member 56. Then the cooling fluid is discharged to the cooling fluid outflow section 53 via the filter 55 fitted in the dent 562B1 of the second fixing section 562.

Since the air bubbles inside the cooling fluid cannot pass through the filter 55, the air bubbles are stayed at the vicinity of the filter 55 and discharged from the hole 562A1 of the cylindrical section 562A of the second fixing section 562. The air bubbles are then accumulated in the bubble accumulator 51C.

Next, the cooling fluid discharged from the relay tank 5 is divided by the fluid circulator 448 and then injected to the respective optical modulator holders 4402. The cylindrical section 44051 of the frame member 4405 of the optical modulator holder 4402 connects to the fluid circulator 448, so that the cooling fluid injected to the cylindrical section 44051 of the frame member 4405 of the optical modulator holder 4402 is divided into the light incident side and the light irradiation side of the frame member 4405 by the projection 4405C2. The cooling fluid heading to the light incident side of the frame member 4405 is introduced into the first cooling chamber R1, cools the incident-side polarization plate 442 and the liquid crystal panel 441, and then introduced into the cylindrical section 4406D of the frame member 4406. The cooling fluid is discharged from the cylindrical section 44061 of the frame member 4406.

On the other hand, the cooling fluid heading to the light irradiation side of the frame member 4405 is introduced into the cylindrical section 4405C and then discharged into the second cooling chamber R2. The cooling fluid inside the second cooling chamber R2 cools the liquid crystal panel 441 and the irradiation-side polarization plate 443, and then discharged into the cylindrical section 44061 of the frame member 4406.

The cooling fluid respectively discharged from the cylindrical sections 44061 of the optical modulator holders 4402 are combined with each other by the fluid circulator 448, and then accumulated in the relay tank 5A.

VII. Advantage of Present Exemplary Embodiment

In the present exemplary embodiment, the cooling fluid from the main tank 445 is flowed to the cooling chambers R1, R2 of the optical modulator holder 4402 via the relay tank 5B, and then the cooling fluid discharged from the cooling chambers R1, R2 is returned to the main tank 445 via the relay tank 5A, thus the cooling fluid being circulated. Accordingly, as compared to a case in which the cooling fluid is sealed respectively within the cooling chambers R1, R2 of the optical modulator holder 4402, the cooling fluid is hardly heated, thereby effectively cooling the liquid crystal panel 441, the incident-side polarization plate 442, and the irradiation-side polarization plate 443.

In the present exemplary embodiment, as for the relay tank 5B, when the filter 55 is fixed in the pipe 531 of the cooling fluid outflow section 53, all of the cooling fluid flowed into the relay tank 5B from the cooling fluid inflow section 52 can pass through the filter 55. Namely, the air bubbles can be eliminated for all of the cooling fluid flowed into the relay tank 5B.

Further, in the present exemplary embodiment, since the filter 55 arranged inside the tank body 51 enables the liquid to pass but inhibits the air bubbles to pass, the air bubbles in the cooling fluid cannot pass through the filter 55. The air bubbles are stayed at the vicinity of the filter 55, then combined with other air bubbles to be larger air bubbles, and gradually elevated due to buoyancy. The air bubbles are discharged from the hole 562A1 of the cylindrical section 562A of the second fixing section 562, and then accumulated in the bubble accumulator 51C defined in the space above the liquid level of the cooling fluid. Accordingly, the air bubbles are hardly remained in the cooling fluid discharged from the relay tank 5B, and thus hardly mixed inside the cooling chambers R1, R2 of the optical modulator holder 4402 to which the cooling fluid discharged from the relay tank 5B is guided. Thereby, the light beam passing though the optical device 44 will not be dispersed, so that the projector 1 can form a clear projection image.

Further, since the holes 551 of the filter 55 have extremely small diameter, even when dusts are mixed into the cooling fluid, the filter 55 can inhibits the dusts to pass.

Accordingly, it can be prevented that the dusts are discharged into the cooling chambers R1, R2 of the optical modulator holder 4402.

Further, since the hole 562A1 is provided in the cylindrical section 562A of the second fixing section 562 arranged on the cooling fluid inflow side of the filter 55, the air bubbles trapped by the filter 55 can smoothly be accumulated in the bubble accumulator 51C.

With this configuration, the air bubbles will not be stayed within the cooling fluid for long time, and thus reliably preventing the air bubbles from being discharged to the cooling chambers R1, R2 from the relay tank 5. Accordingly, the image projected by the projector 1 according to the invention will be a high quality and clear projection image.

The relay tank 5 is arranged on the surface of the cross dichroic prism 444 where the light beam is not incident or irradiated. That is, the arrangement of the relay tank 5 will not disturb traveling of the light beam. Accordingly, the optical device 44 can cool the liquid crystal panel 441 and steadily form a clear projection image.

Note that, the surface of the cross dichroic prism 444 where the light beam is incident or irradiated is a surface confronting the liquid crystal panel 441 that emits the modulated light beam to the cross dichroic prism 444 as well as a surface confronting the projection lens L that concentrates the optical image formed by the cross dichroic prism 444 and then projects the optical image to the outside in an enlarged manner. In other words, since there is not arranged the liquid crystal panel 441 and the projection lens L at the vicinity of the surface of the cross dichroic prism 444 where the light beam is not incident or irradiated, there is an unused area. That is, in the present exemplary embodiment, since the relay tank 5 is arranged in the unused area, the unused area owned by the optical device 44 can effectively be utilized.

The relay tank 5 allows the plurality of fluid circulators 448 communicating with the plurality of cooling chambers R1, R2 to be combined into one at the vicinity of the relay tanks 5A, 5B.

Owing to this, increase in size of the optical device 44 can be avoided.

Since the hole 562A1 is formed at the location where the air bubbles trapped by the filter 55 are elevated away from the filter 55, the number of the bubble discharging holes formed in the fixing member 56 can be minimized.

In the present exemplary embodiment, the cooling fluid circulating inside the cooling chambers R1, R2 is circulated from the lower side to the upper side. In the cooling chambers R1, R2, the cooling liquid heated due to the heat of the liquid crystal panel 441 moves upward. Since this moving direction is the same as the circulating direction of the cooling liquid, the heated cooling liquid will not stay inside the cooling chambers R1, R2. Accordingly, the cooling liquid inside the cooling chambers can effectively reduce the heat generated by the liquid crystal panel 441.

Second Exemplary Embodiment

A second exemplary embodiment of the invention will be described below with reference to FIGS. 9 and 10.

Incidentally, in the following description, the same reference numeral will be attached to the same components as the above to omit the description thereof.

In the first exemplary embodiment, the penetrating hole 51B2 is formed in the lid member 51B of the tank body 51 of the relay tank 5, and the open valve 51D is provided for the penetrating hole 51B2, so that the pressure of the bubble accumulator 51C in the tank body 51 is adjusted. However, in the present exemplary embodiment, the adjusting mechanism of the pressure is different from that of the above-stated exemplary embodiment. A relay tank 6 of the present exemplary embodiment is different from the relay tank 5 of the above-stated exemplary embodiment only in the configuration of a lid member 61B, and other configuration is similar thereto.

Figure 9:
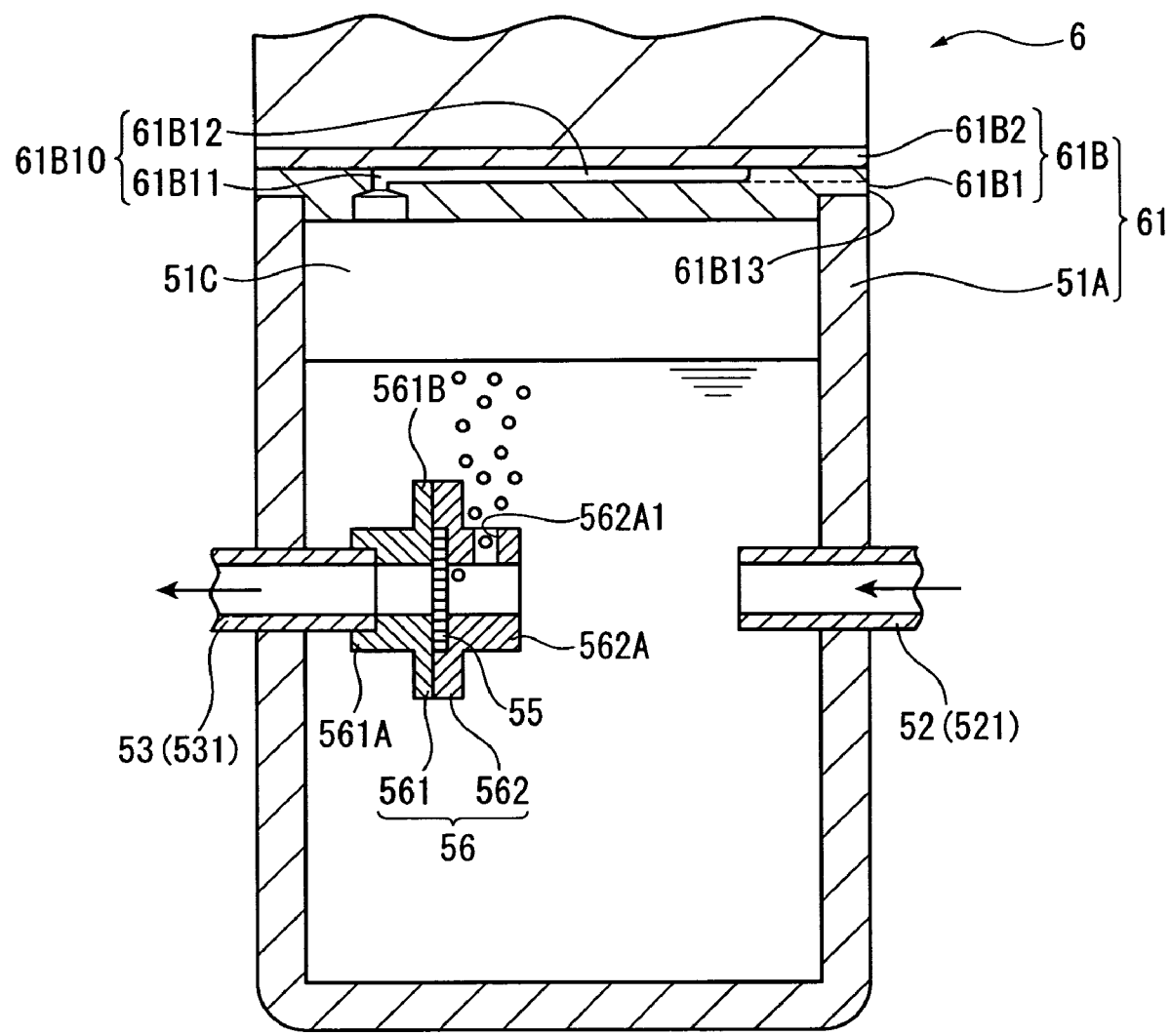
FIG. 9 is a cross section showing a relay tank according to a second exemplary embodiment of the invention.
Figure 10:
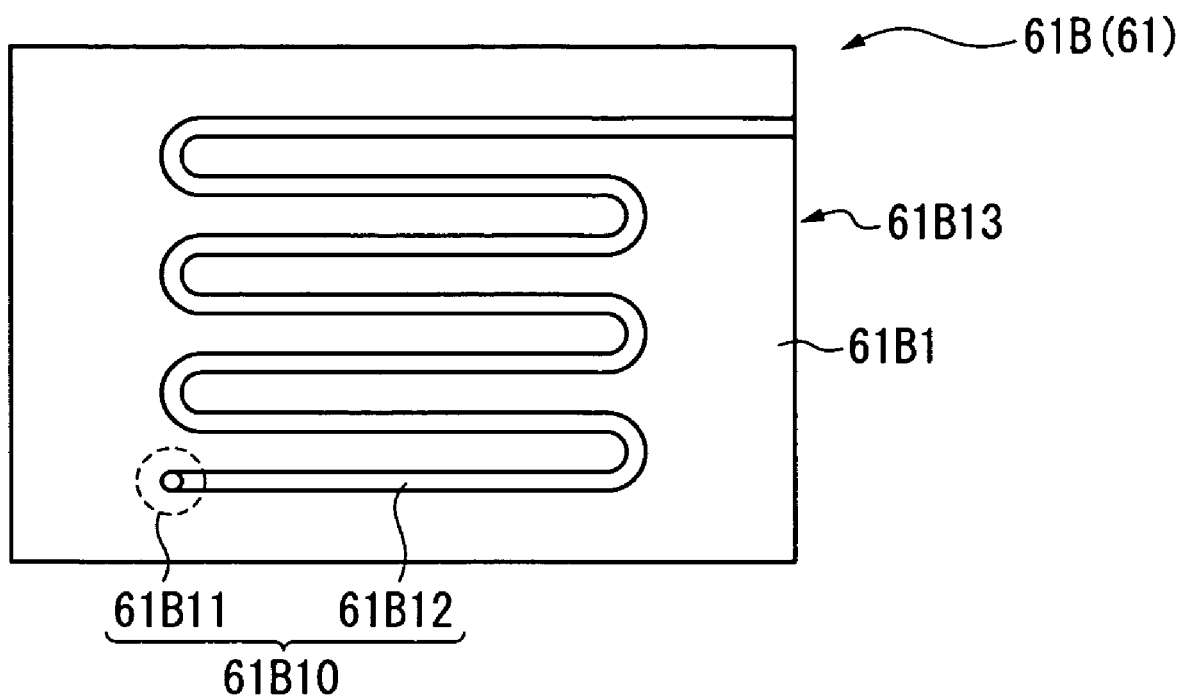
FIG. 10 is a plan view showing a lid member of the relay tank of FIG. 9.

To be more specific, the relay tank 6 of the present exemplary embodiment shown in FIGS. 9 and 10 includes a tank body 61 having the lid member 61B and the tank body 51, the cooling fluid inflow section 52, the cooling fluid outflow section 53, the filter 55 and the fixing member 56.

The lid member 61B has a flat first member 61B1 disposed on the body section 51A and a flat second member 61B2 disposed on the first member 61B1.

A communicating path 61B10 is formed in the first member 61B1, which allows the bubble accumulator 51C to communicate with the outside of the tank body 61.

The communicating path 61B10 includes a penetrating hole 61B11 penetrating through the first member 61B1 and communicating with the bubble accumulator 51C, and a communicating path body 61B12 connected to one of openings of the penetrating hole 61B11.

As shown in FIG. 10, the communicating path body 61B12 is so formed that the surface of the first member 61B1 is carved in a meandering manner. A tip end (an end on a side opposite to the penetrating hole 61B11) of the communicating path body 61B12 extends to a lateral side 61B13 of the first member 61B1 and carves the lateral side 61B13 of the first member 61B1.

Though not shown, the cross section of the communicating path body 61B12 is substantially arcuate of which diameter is determined according to the viscosity and the flow pressure of the cooling fluid.

The second member 61B2 covers the penetrating hole 61B11 and the upper side of the communicating path body 61B12 of the first member 61B1.

The present exemplary embodiment with such configuration can attain not only the same advantages as that of the above-stated exemplary embodiment, but also the following advantages.

The communicating path 61B10 is formed in the lid member 61B of the relay tank 6, which allows the bubble accumulator 51C to communicate with the outside of the tank body 61. The communicating path 61B10 includes the penetrating hole 61B11 penetrating through the first member 61B1 and communicating with the bubble accumulator 51C, and the communicating path body 61B12 connected to the one of openings of the penetrating hole 61B11.

Accordingly, the air pressure inside the bubble accumulator 51C and the atmosphere pressure outside the relay tank 6 can be equalized via the penetrating hole 61B11 and the communicating path body 61B12, and the generation of the negative pressure inside the bubble accumulator 51C can be restrained, thus preventing gas inside the bubble accumulator 51C from mixing into the cooling fluid inside the relay tank 6.

And, since the communicating path body 61B12 formed in the lid member 61B of the relay tank 6 extends in a meandering manner, the distance of the communicating path body 61B12 becomes remarkably long. Thus, even if the cooling fluid enters into the communicating path body 61B12, the cooling fluid will not be discharged from the communicating path body 61B12.

In the relay tank 6 of the present exemplary embodiment, an open valve is not required unlike the above-described exemplary embodiment (see FIG. 7), the manufacturing cost of the optical device 44 can be saved. Note that, though the cross section of the communicating path body 61B12 is substantially arcuate in the present exemplary embodiment, the cross section may be rectangular or triangular.

Third Exemplary Embodiment

Figure 11:
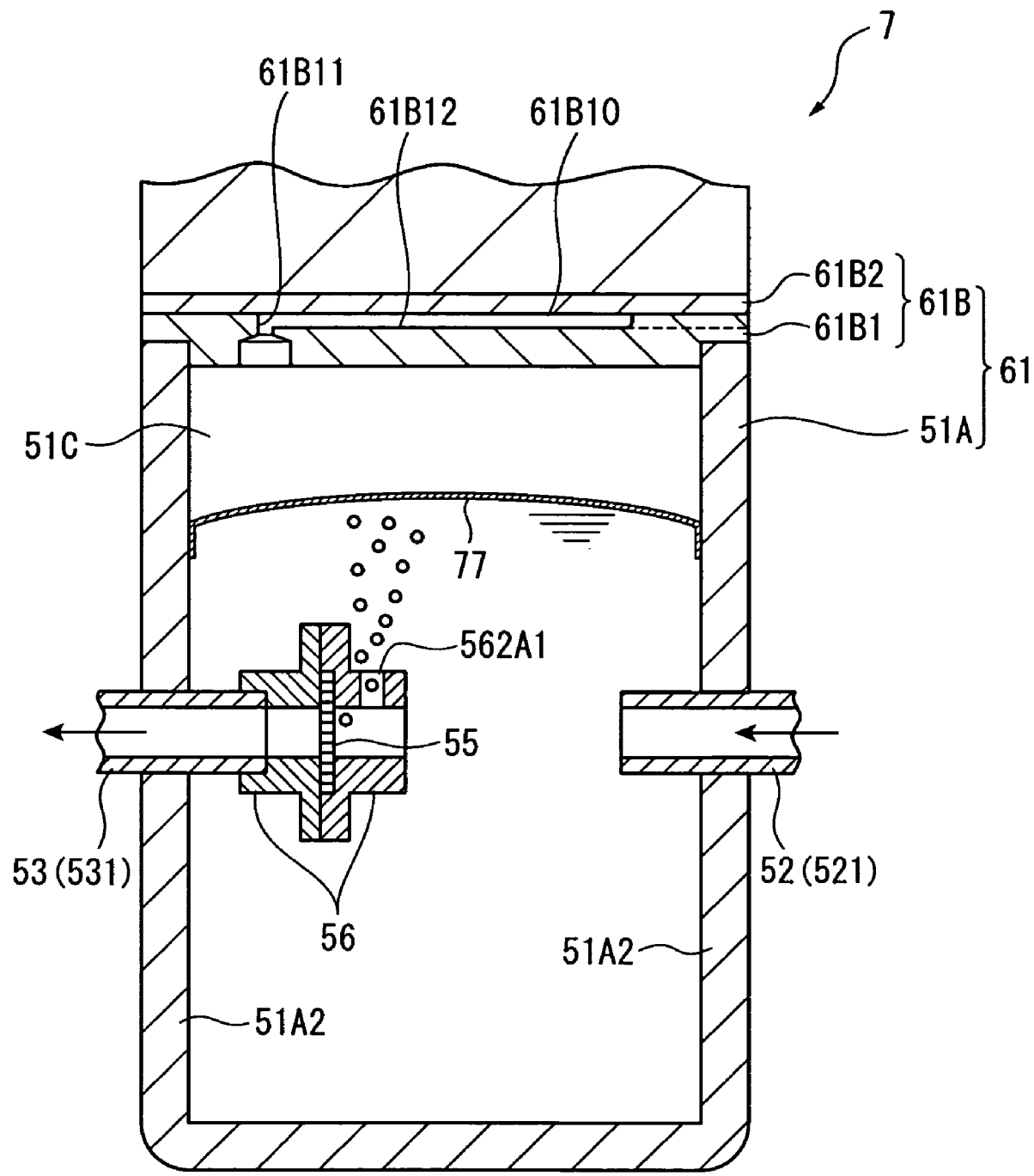
FIG. 11 is a cross section showing a relay tank according to a third exemplary embodiment of the invention.

Referring to FIG. 11, a third exemplary embodiment of the invention will be described. Incidentally, in the following description, the same reference numeral will be attached to the same components as the above to omit the description thereof.

A relay tank 7 of the third exemplary embodiment is different from the respective aforesaid exemplary embodiments in that a gas-liquid separating film 77 is interposed between the cooling fluid of the body section 51A and the bubble accumulator 51C. Other configuration is the same as that of the respective aforesaid exemplary embodiments.

Specifically, the relay tank 7 of the present exemplary embodiment shown in FIG. 11 includes the tank body 61 of the relay tank 6 of the second exemplary embodiment, the cooling fluid inflow section 52, the cooling fluid outflow section 53, the filter 55, the fixing member 56 and the gas-liquid separating film 77.

Note that, the gas-liquid separating film 77 is arranged to reach the four lateral sides 51A2 of the body section 51A of the tank body 51. The gas-liquid separating film 77 covers the liquid level of the cooling fluid, to prevent the cooling fluid from passing through it but to allow the gas to pass. The gas-liquid separating film 77 is a porous film, which may be made of known PTFE (PolyTetra-FluoroEthylene) or silicone resin.

The surface area of the gas-liquid separating film 77 is larger than the planar area surrounded by the lateral sides 51A2, and the gas-liquid separating film 77 is fixed to the lateral sides 51A2 in a sagging manner. This gas-liquid separating film 77 is deformed according to the pressure inside the bubble accumulator 51C and the amount of the cooling fluid inside the tank body 51. The gas-liquid separating film 77 may be sagged entirely or partially.

The present exemplary embodiment with such configuration can attain not only the same advantages as that of the above-stated exemplary embodiment, but also the following advantages.

Since the gas-liquid separating film 77 which inhibits the cooling fluid to pass but allows the gas to pass is disposed at the boundary of the cooling fluid in the relay tank 7 and the bubble accumulator 51C, the air bubbles trapped by the filter 55 can be discharged to the bubble accumulator 51C via the gas-liquid separating film 77.

Since the gas-liquid separating film 77 is arranged in a sagging manner, the fluctuation of the amount of the cooling fluid inside the relay tank 7 can be managed. More specifically, when the amount of the cooling fluid inside the relay tank 7 is small, the gas-liquid separating film 77 is sagged downward, and when the amount of the cooling fluid is large, the gas-liquid separating film 77 is sagged upward.

Since the gas-liquid separating film 77 is arranged in a sagging manner, the gas-liquid separating film 77 can be deformed corresponding to pressure fluctuation of the bubble accumulator 51C, so that the pressure fluctuation of the bubble accumulator 51C can be managed.

Fourth Exemplary Embodiment

Figure 12:
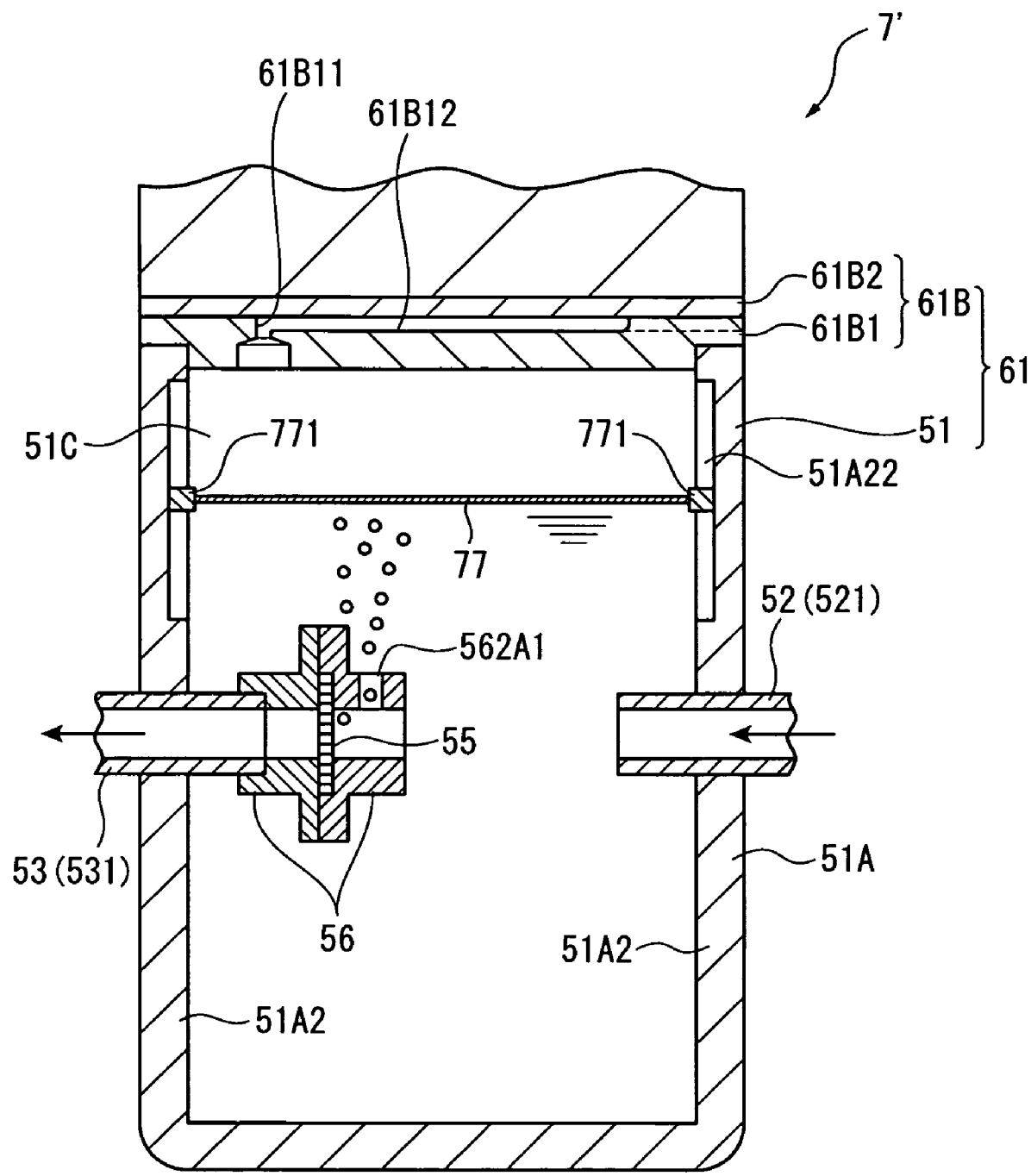
FIG. 12 is a cross section showing a relay tank according to a fourth exemplary embodiment of the invention.

Referring to FIG. 12, a fourth exemplary embodiment of the invention will be described. Incidentally, in the following description, the same reference numeral will be attached to the same components as the above to omit the description thereof.

In the above-stated third exemplary embodiment, the gas-liquid separating film 77 is disposed to reach the four lateral sides 51A2 of the body section 51A of the tank body 51 of the relay tank 7, and is attached to the lateral sides 51A2 in a sagging manner, the attaching is not limited thereto.

In other words, as shown in FIG. 12, a relay tank 7' of the optical device of the present exemplary embodiment employs a configuration in which a moving section 771 is attached as a moving mechanism for moving the gas-liquid separating film 77 in upward or downward direction, so that the gas-liquid separating film 77 can easily be moved upward/downward to adjust the pressure of the bubble accumulator 51C.

In the relay tank 7', vertically extending grooves 51A22 are formed in the four lateral sides 51A2 of the body section 51A of the tank body 51, and the moving section 771 is attached to the peripheral edge of the gas-liquid separating film 77, so that the height of the gas-liquid separating film 77 can be adjusted by sliding the moving section 771 within the grooves 51A22. Note that, FIG. 12 shows the state in which the gas-liquid separating film 77 is not sagged, but substantially parallel to the liquid level of the cooling fluid.

Fifth Exemplary Embodiment

Figure 13:
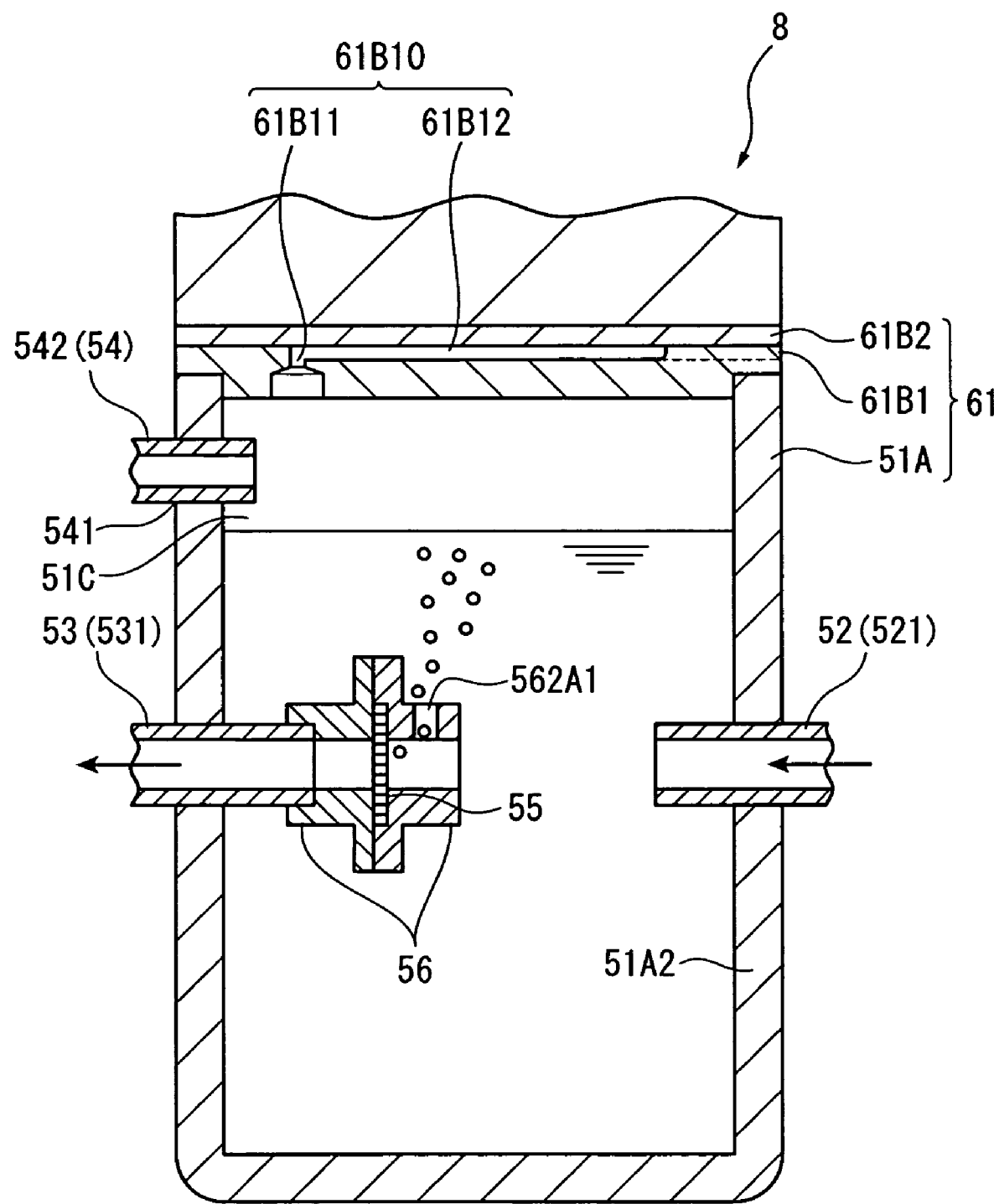
FIG. 13 is a cross section showing a relay tank according to a fifth exemplary embodiment of the invention.

Referring to FIG. 13, a fifth exemplary embodiment of the invention will be described. Incidentally, in the following description, the same reference numeral will be attached to the same components as the above to omit the description thereof.

In the lateral side 51A2 of the body section 51A of a relay tank 8 of the fifth exemplary embodiment, a communicating hole 541 is formed to allow the bubble accumulator 51C formed inside the tank body 51 to communicate with the outside of the tank body 51. To the communicating hole 541, a communicating tube 542 which is linked to a suction pump (not shown) is attached such that an end thereof is located inside the bubble accumulator.

Thus, a bubble discharging section 54 having the communicating tube 542 can effectively discharge the air bubbles and the like accumulated inside the bubble accumulator to the outside. If the suction pump (not shown) is activated along with the flow operation of the fluid, the air bubbles and the like can further effectively be eliminated from the bubble accumulator.

Modification of First to Fifth Exemplary Embodiments

In the above-stated first to fifth exemplary embodiments, although the filter 55 and the fixing member 56 are not particularly attached to the relay tank 5A arranged on the upper side of the cross dichroic prism 444, in the invention, the filter 55 and the fixing member 56 may be attached to the relay tank 5A.

Figure 14:
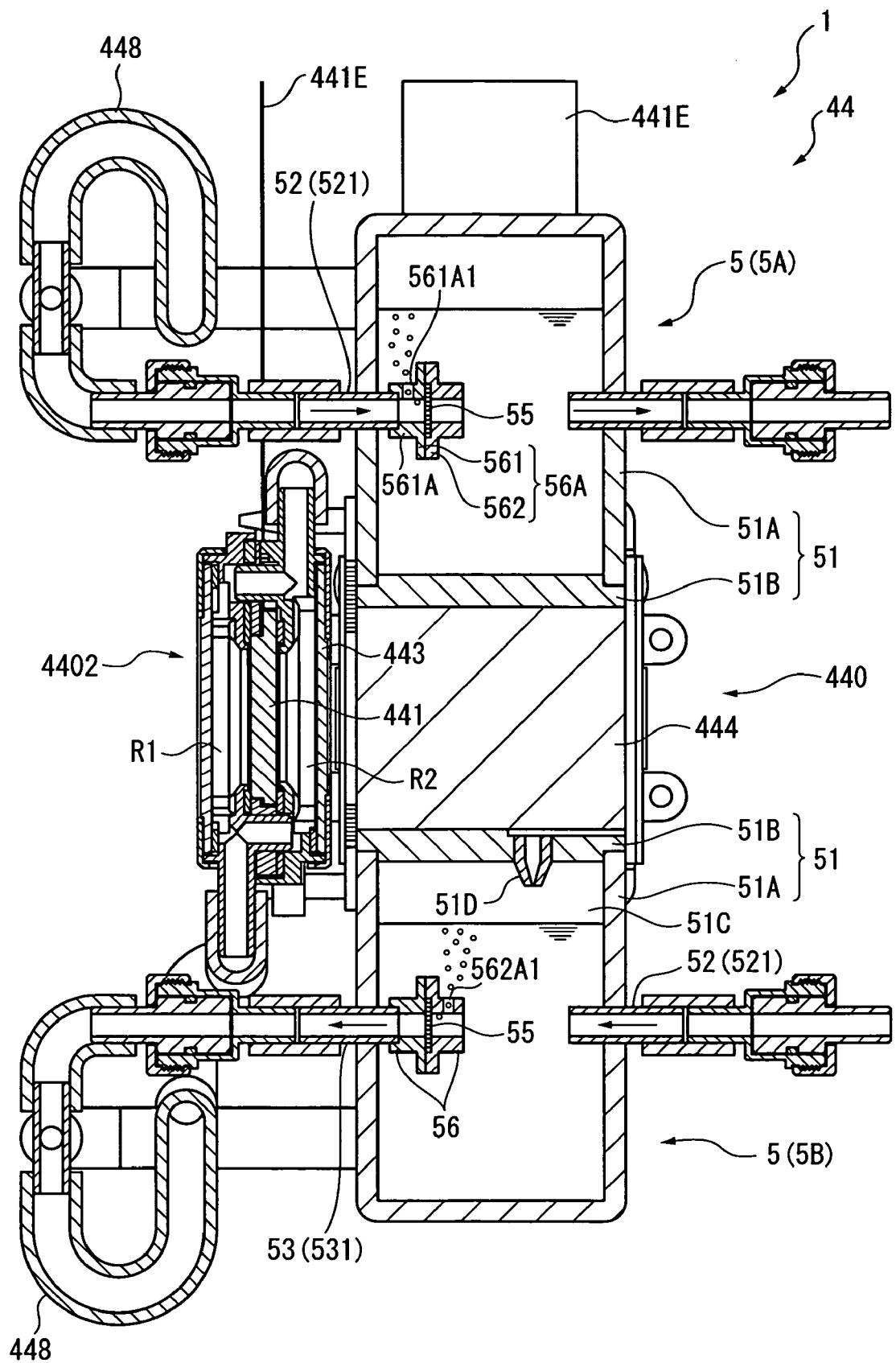
FIG. 14 is a cross section showing the inner structure of an optical device body according to a modification of the first exemplary embodiment.

In this modification as shown in FIG. 14, the filter 55 is attached to the end of the pipe 521 of the cooling fluid inflow section 52 brought into the body section 51A of the relay tank 5A, via a fixing member 56A.

The configuration of the fixing member 56A is similar to the above-mentioned fixing member 56 except the location of the bubble discharging hole.

As shown in FIG. 14, a hole 561A1 of this modification as the bubble discharging hole penetrates through an upper side of the cylindrical section 561A of the first fixing section 561. In other words, the hole 561A1 is formed in the upper side of the fixing member 56 on the inflow side of the cooling fluid about to pass through the filter 55.

With this configuration, since the filter 55 provided in the relay tank 5A allows the liquid to pass but inhibits the air bubbles to pass, the air bubbles within the cooling fluid about to flow into the relay tank 5A cannot pass the filter 55. The air bubbles are stayed at the vicinity of the filter 55, then combined with other air bubbles to be larger air bubbles, and gradually elevated due to buoyancy. The air bubbles are discharged from the hole 561A1 formed in the cylindrical section 561A of the first fixing section 561, and then accumulated in the bubble accumulator 51C defined in the space above the liquid level of the cooling fluid.

Accordingly, since there is almost no air bubbles within the cooling fluid to be flowed into the relay tank 5A, the air bubbles can be prevented from entering into the main tank 445 and the fluid press-feeder to which the cooling fluid discharged from the relay tank 5A is guided.

Further, since the holes 551 of the filter 55 have extremely small diameter, even when dusts are mixed into the cooling fluid, the filter 55 can inhibits the dusts to pass.

Accordingly, the air bubbles and dusts and the like contained in the cooling fluid to be flowed into the fluid press-feeder can be reduced, thus preventing troubles occurring in the fluid press-feeder.

Incidentally, the relay tank 5A may be provided with the open valve 51D, the gas-liquid separating film 77, the communicating path 61B10, the bubble discharging section 54 and the like.

Sixth Exemplary Embodiment

Figure 15:
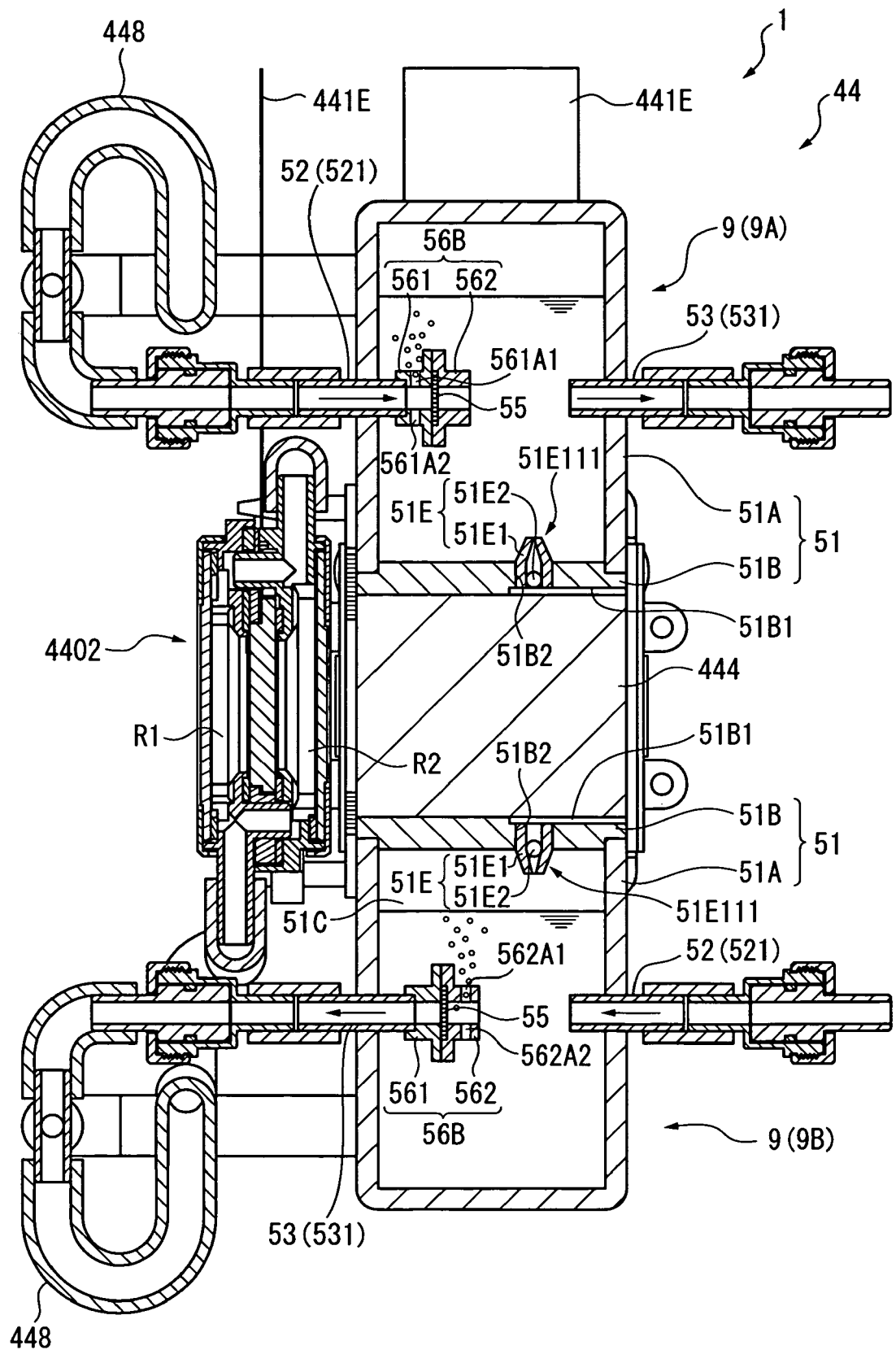
FIG. 15 is a cross section showing the inner structure of an optical device body according to a sixth exemplary embodiment of the invention.
Figure 16A:
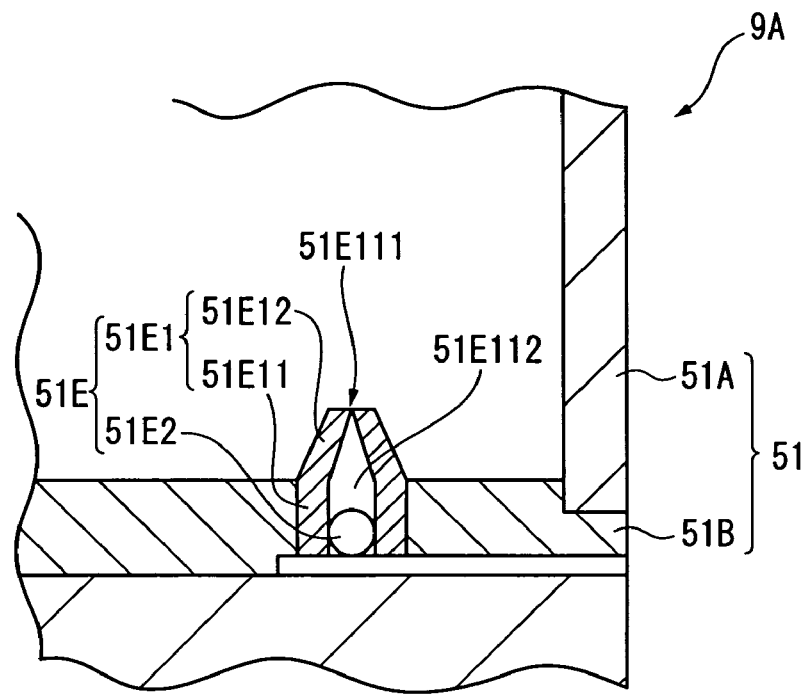
FIGS. 16A and 16B are schematic illustrations each showing a mechanism of an open valve of the aforesaid exemplary embodiment.
Figure 16B:
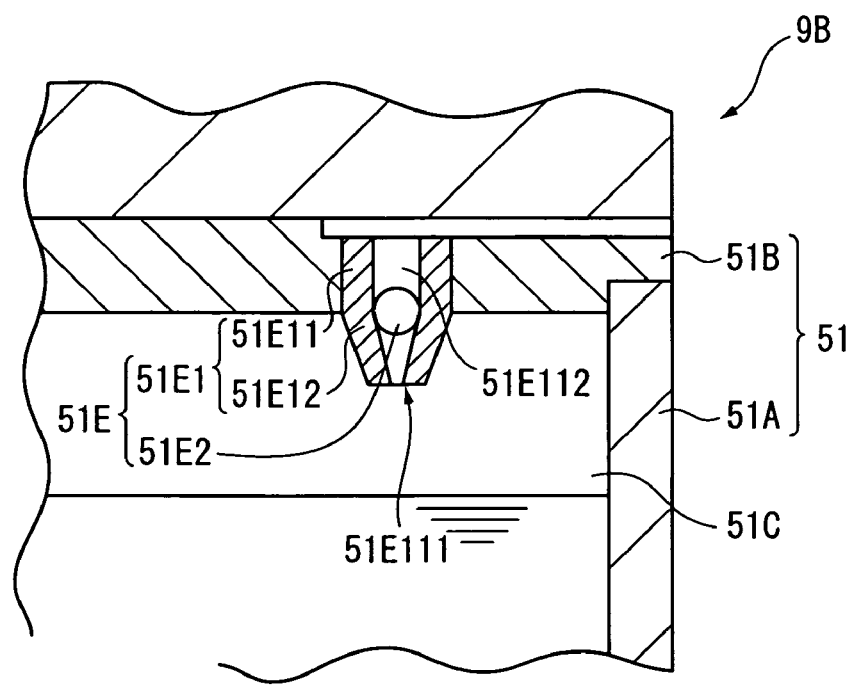
Figure 17:
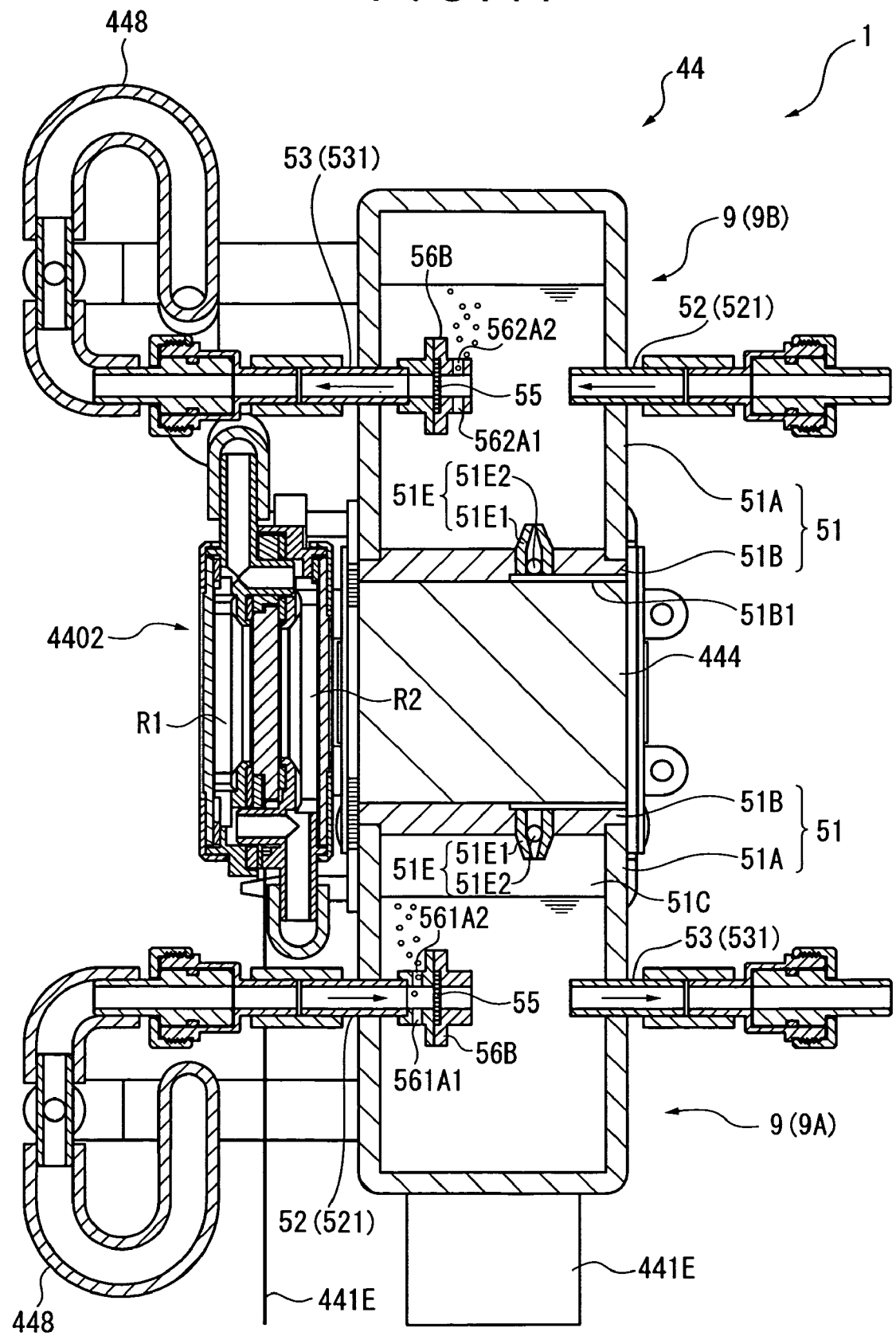
FIG. 17 is a cross section showing the inner structure of an optical device body of the aforesaid exemplary embodiment when a projector is installed in an upside-down posture.

Referring to FIGS. 15 to 17, a sixth exemplary embodiment of the invention will be described. Incidentally, in the following description, the same reference numeral will be attached to the same components as the above to omit the description thereof.

In the above-described first exemplary embodiment, the relay tanks 5 are vertically confronted to each other with the cross dichroic prism 444 interposed therebetween. The relay tank 5B arranged on the lower side of the cross dichroic prism 444 includes the filter 55 (bubble trapping), and the groove 51B1 as well as the penetrating hole 51B2 which are formed in the flat lid member 51B of the relay tank 5B. And besides, the open valve 51D is disposed inside the penetrating hole 51B2. On the other hand, although the relay tank 5A arranged on the upper side of the cross dichroic prism 444 has the same configuration as the relay tank 5B arranged on the lower side of the cross dichroic prism 444, filter etc. is not formed or disposed in the relay tank 5A.

On the other hand, as for the optical device 44 shown in FIG. 15, although it is the same as the first exemplary embodiment in that a relay tank 9 of the optical device 44 is vertically confronted with the cross dichroic prism 444 interposed therebetween, in the present exemplary embodiment, both of relay tanks 9A, 9B are respectively provided with the filters 55, the grooves 51B1 as well as the penetrating holes 51B2 which are formed in the flat lid members 51B of the relay tank 9A and the relay tank 9B, and an open valves 51E disposed inside the penetrating holes 51B2.

The basic structure of the open valve 51E is substantially the same as that of the open valve 51D, however, in order to prevent the cooling fluid from leaking due to pressure fluctuation when the posture of the projector 1 is changed, since the open valve 51E has greater closing ability than the open valve 51D, the open valve 51E does not open even when the inside of the bubble accumulator 51C becomes negative pressure in some measure relative to the outside of the relay tanks 9A, 9B.

Incidentally, in the present exemplary embodiment, the positional relationship as shown in FIG. 15, in which the relay tank 9B is located on the lower side while the relay tank 9A is located on the upper side with the cross dichroic prism 444 interposed therebetween is defined as a normal installation state (a predetermined posture) of the projector 1, and the positional relationship as shown in FIG. 17, in which the relay tank 9B is located on the upper side while the relay tank 9A is located on the lower side with the cross dichroic prism 444 interposed therebetween is defined as an inverse installation state (an upside-down posture) of the projector 1 in contrast to the normal installation state.

The relay tanks of the optical device 44 shown in FIG. 15 are vertically confronted to each other with the cross dichroic prism 444 interposed therebetween. In the relay tank 9B on the lower side of the cross dichroic prism 444, the filter 55 (bubble trapping) is disposed in the pipe 531 connected to the cooling fluid outflow section 53, which is the same as the first exemplary embodiment. On the other hand, in the relay tank 9A on the upper side of the cross dichroic prism 444, the filter 55 is disposed in the pipe 521 connected to the cooling fluid inflow section 52.

Further, the configuration of the filter 55 and a fixing member 56B are similar to that of the filter 55 and the fixing member 56 of the first exemplary embodiment except the location of the bubble discharging hole. Therefore, the bubble discharging hole and the open valve 51E formed in the fixing member 56B will be described here.

As shown in FIG. 15, in the relay tank 9B, the hole 562A1 and a hole 562A2 are respectively formed in the upper side and the lower side of the second fixing section 562 of the fixing member 56B provided at the end of the pipe 531. In other words, the holes 562A1, 562A2 are respectively formed in the upper and lower sides on the inflow side of the cooling fluid about to pass through the filter 55 fixed in the fixing member 56B.

On the other hand, in the relay tank 9A, the hole 561A1 and a hole 561A2 are respectively formed in the upper side and the lower side of the first fixing section 561 of the fixing member 56B provided at the end of the pipe 521. In other words, the holes 561A1, 561A2 are respectively formed in the upper and lower sides on the cooling fluid inflow side relative to the filter 55 like the holes 562A1, 562A2 of the relay tank 9B.

The grooves 51B1 are respectively formed in the flat lid 51B in the surfaces each confronting the cross dichroic prism 444, and besides, the penetrating holes 51B2 respectively penetrating through the lid members 51B are respectively formed in the same manner as the first exemplary embodiment, in which the state of the lid members when seen from the cross dichroic prism 444 side are the same as that shown in FIG. 8.

The penetrating hole 51B2 allows the bubble accumulator 51C to communicate with the outside of the tank body 51. The open valve 51E is arranged inside the penetrating hole 51B2.

As similar to the above-stated exemplary embodiment, the open valve 51E of the present exemplary embodiment allows the outside of the tank body 51 to communicate with the bubble accumulator 51C in a case of the relay tank 9B.

As shown in FIGS. 16A and 16B (described later), the open valve 51E includes an open valve body 51E1 formed by integrating a hollow column 51E11 and a spindle 51E12 substantially having a V-shape in cross section located at a tip end of the column, and an adjusting sphere S1E2 (a substantially spherical adjusting member) sealed in a hollow section 51E112 narrowing toward a tip end 51E111 of the open valve body 51E1, the tip end heading to the inside of the fluid accumulator according to each of the relay tanks 9A, 9B. Incidentally, at least one of the adjusting sphere 51E2, the hollow column 51E11 and the spindle 51E12 does not have a mirror surface, and a certain gap is constantly formed between the adjusting sphere 51E2 and the hollow column 51E11 or the spindle 51E12.

FIGS. 16A and 16B are schematic illustrations each showing the mechanism of the open valve 51E, in which FIG. 16A shows the state of the open valve 51E located on the upper side of the cross dichroic prism 444 (the state disposed in the relay tank 9A in FIG. 15) and FIG. 16B shows the state of that located on the lower side of the cross dichroic prism 444 (the state disposed in the relay tank 9B in FIG. 15). In the open valve 51E, the adjusting sphere 51E2 (the adjusting member) moves between the column 51E11 and the spindle 51E12 at the tip end, so that the open valve 51E is adjusted between the open state and the close state by opening/closing the tip end 51E111 of the open valve body 51E1.

In FIG. 16A, since the adjusting sphere 51E2 is stayed on the lid member 51B side in the hollow column due to the self-weight, it does not affect on the profile of the spindle 51E12 having a substantially V-shape in cross section at the tip end 5E111 of the open valve 51E. Accordingly, the tip end 51E111 of the open valve 51E is closed, so that the cooling fluid existing above the tip end 51E111 will not enter the inside of the open valve 51E from its tip end 51E111, thus maintaining the sealing state of the relay tank 9A and preventing the cooling fluid from being flowed outside.

On the other hand, in FIG. 16B, the adjusting sphere 51E2 is moved downward due to the self-weight, so that the adjusting sphere 51E2 moves downward toward the spindle 51E12 at the tip end from the column 51E11, thus slightly pushing and widening a wall of the spindle 51E12 due to the self-weight. Accordingly, the tip end 51E111 of the open valve 51E is slightly opened as shown in FIG. 16B, to be the open state.

In this case, since a certain gap is formed between the adjusting sphere 51E2 and the hollow column 51E11 or the spindle 51E12 as described above, there is secured a necessary flow path.

In the present exemplary embodiment, although the cross section of the open valve body 51E1 is substantially circular, the cross section may be substantially ellipsoidal without limiting to be circular.

In the present exemplary embodiment, although the lid member 51B is employed for a flat lid of the relay tank 5B, the communicating path body 61B12 shown in FIG. 10 may alternatively be used instead of the groove 51B1 shown in FIG. 8.

According to the present exemplary embodiment, substantially the same advantages can be attained as that of the above-stated exemplary embodiment, and additionally, by disposing the filters 55 in the upper and lower relay tanks 9A, 9B, the air bubbles and dusts contained within the cooling fluid to be discharged to the fluid press-feeder can be reduced. Accordingly, troubles occurring in the fluid press-feeder due to the air bubbles can be prevented.

In the fixing members 56B disposed in the relay tanks 9A, 9B, since the bubble discharging holes (the holes 562A1, 562A2, 561A1, 561A2) are respectively formed in the upper and lower sides on the inflow side of the cooling fluid about to pass through the filter 55, the bubble discharging holes are secured on the upper side of the cooling fluid inflow side relative to the filter 55 regardless of whether the installation posture of the projector 1 is the predetermined posture (FIG. 15) or the upside-down posture (FIG. 17). Accordingly, without regarding to the posture of the projector 1 which is either the predetermined posture or the upside-down posture, the air bubbles trapped by the filter 55 can smoothly be discharged via the bubble discharging holes to accumulate the air bubbles in the bubble accumulator 51C.

By disposing the open valves 51E respectively in the relay tanks 9, the close state of the relay tank 9 is maintained even when the projector 1 is in the upside-down state. In other words, even when the projector 1 is in the upside-down state, the cooling fluid will not be flowed outside, thus constantly maintaining the pressure inside the bubble accumulator 51C to be the atmosphere pressure, so that the air bubbles in the bubble accumulator 51C can be prevented from mixing into the tank body 51.

Seventh Exemplary Embodiment

Figure 18:
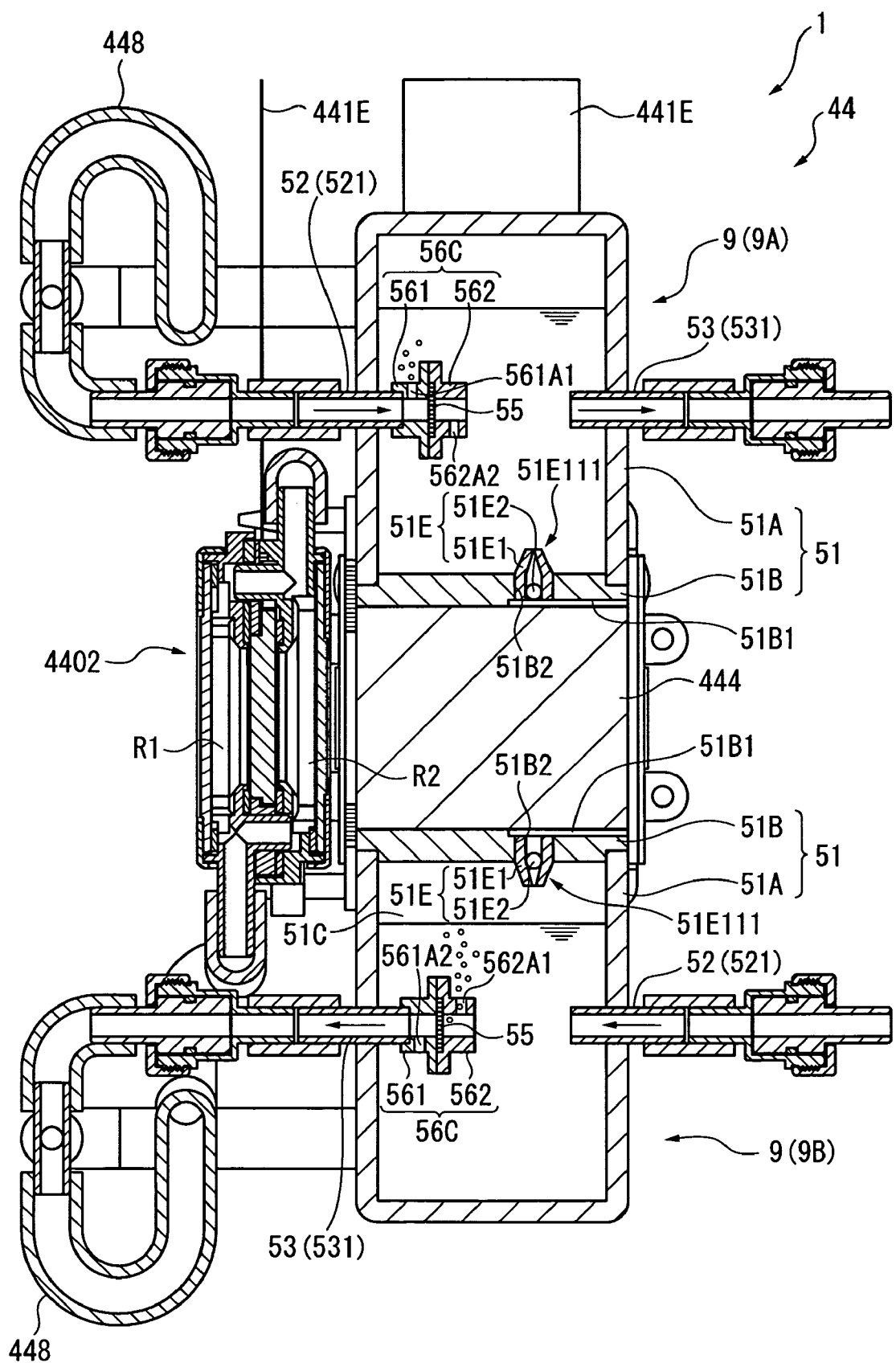
FIG. 18 is a cross section showing the inner structure of an optical device body according to a seventh exemplary embodiment of the invention.
Figure 19:
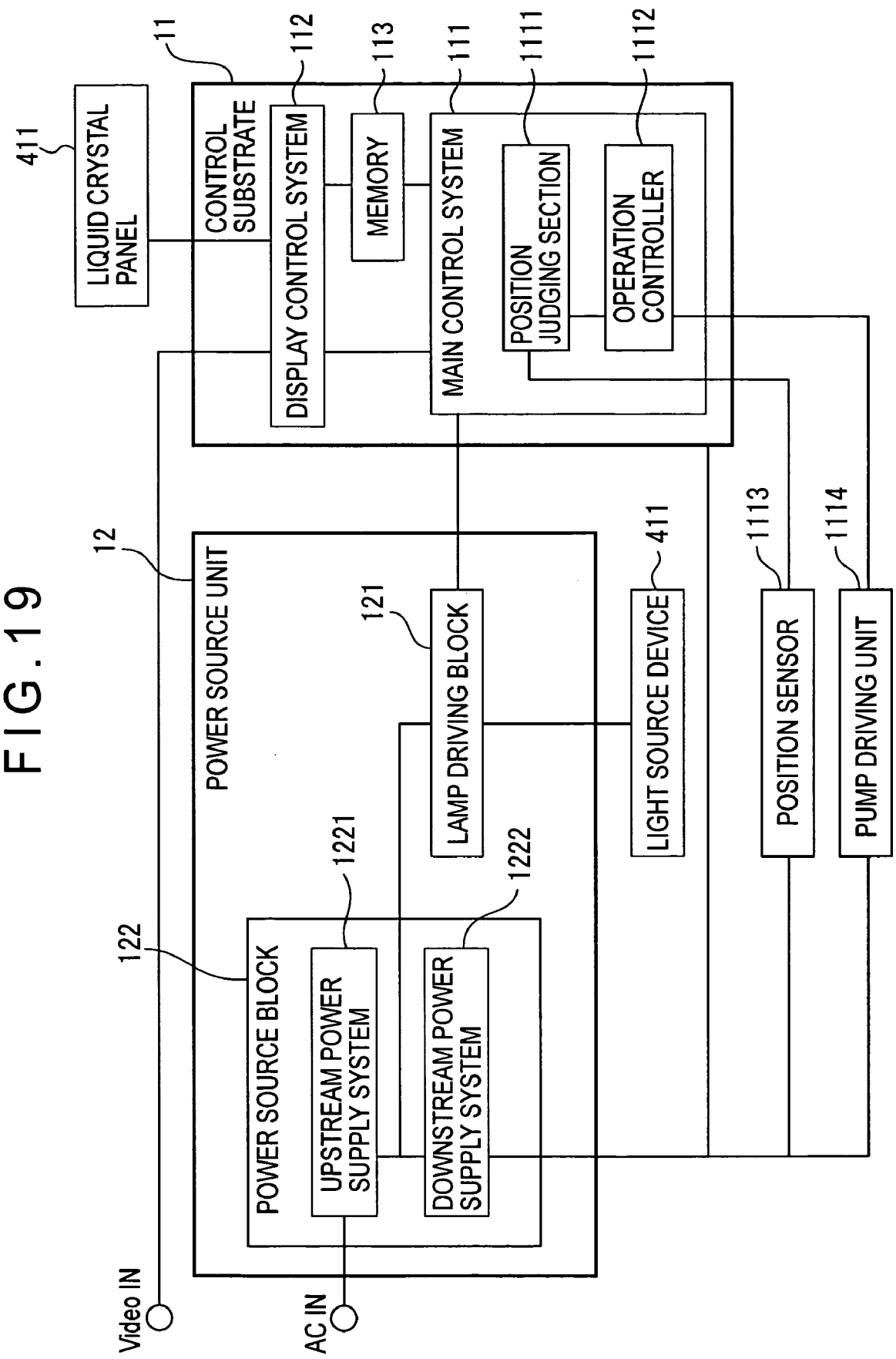
FIG. 19 is a block diagram showing the configuration of a control substrate and a power source unit of the aforesaid exemplary embodiment.
Figure 20:
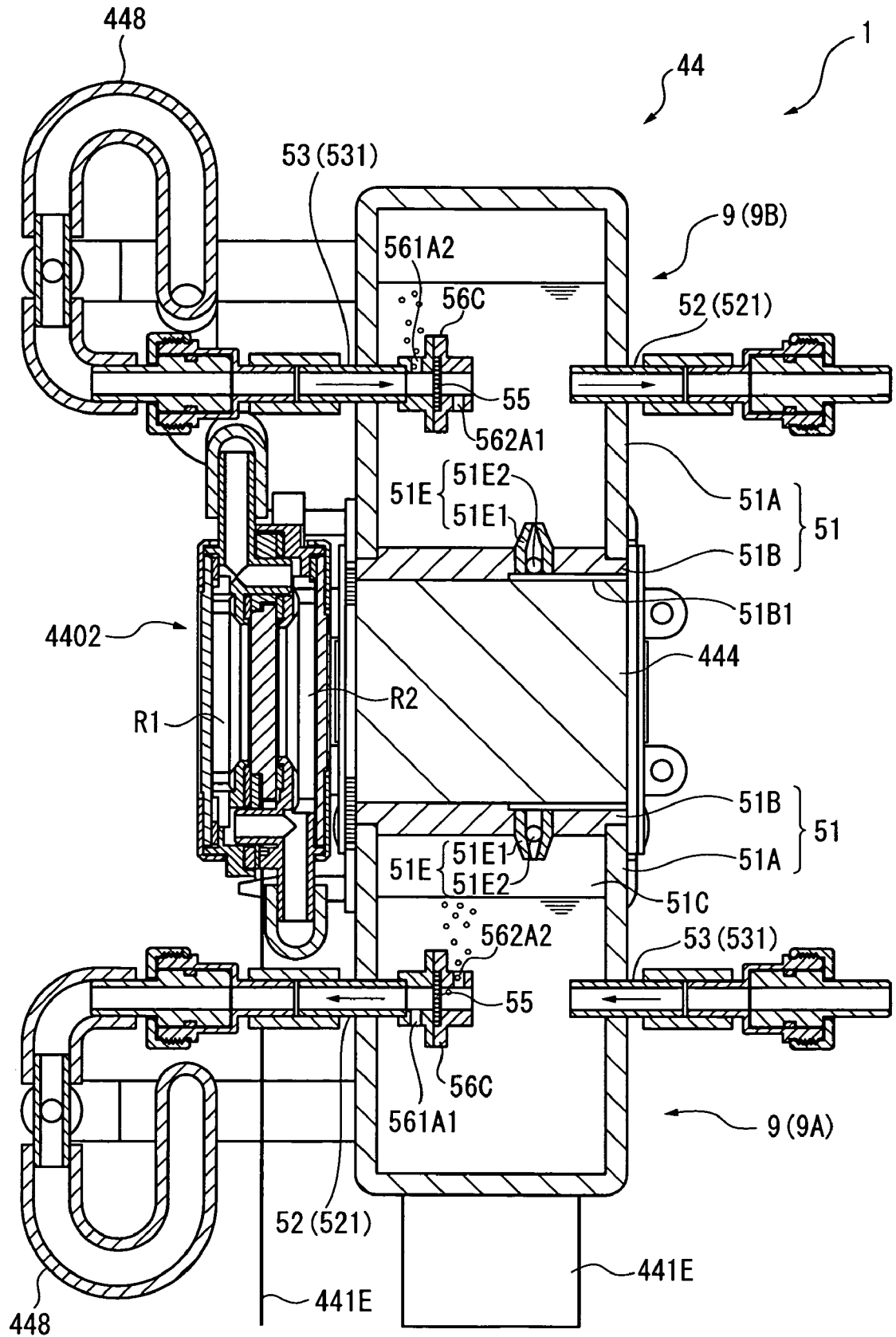
FIG. 20 is a cross section showing the inner structure of the optical device body of the aforesaid exemplary embodiment when a projector is installed in an upside-down posture.

Referring to FIGS. 18 to 20, a seventh exemplary embodiment of the invention will be described. Incidentally, in the following description, the same reference numeral will be attached to the same components as the above to omit the description thereof.

The optical device 44 in the present exemplary embodiment is different from the sixth exemplary embodiment in the location of the bubble discharging hole as well as provision of a posture detector and a press-feeder driving controller. Incidentally, a direction through which the cooling fluid flows as shown in FIG. 18 (with the indication of the arrow) is defined as a predetermined direction, whereas a direction opposite to the predetermined direction is defined as an inverse direction.

The posture detector detects whether the posture of the projector 1 is the predetermined posture or the upside-down posture. The press-feeder driving controller changes the direction through which the cooling fluid flows into the predetermined direction or the inverse direction in accordance with the posture of the projector 1 detected by the posture detector.

The bubble discharging hole formed in a fixing member 56C, the posture detector and the press-feeder driving controller will be described here.

In the present exemplary embodiment, as shown in FIG. 18, the hole 561A2 is formed in the lower side of the first fixing section 561 while the hole 562A1 is formed in the upper side of the second fixing section 562 in the fixing member 56C disposed in the end of the pipe 531 of the relay tank 9B.

In other words, in the fixing member 56C disposed in the relay tank 9B, the bubble discharging holes are respectively formed by penetrating through the upper side on the inflow side of the cooling fluid about to pass through the filter 55 fixed in the fixing member 56C and the lower side on the cooling fluid outflow side.

On the other hand, in the relay tank 9A, the hole 561A1 is formed in the upper side of the first fixing section 561 and the hole 562A2 is formed in the lower side of the second fixing section 562 of the fixing member 56C provided at the end of the pipe 521. In other words, in the fixing member 56C disposed in the relay tank 9A, the bubble discharging holes are respectively formed by penetrating through the upper side on the cooling fluid inflow side and the lower side on the cooling fluid outflow side relative to the filter 55 in the same manner as the relay tank 9B.

FIG. 19 is a block diagram showing the configuration of a control substrate 11 and a power source unit 12.

The control substrate 11 is disposed above the optical unit 4 for instance. The control substrate 11 is a circuit substrate on which an arithmetic processing unit such as a CPU (Central Processing Unit) is mounted.

As shown in FIG. 19, the control substrate 11 includes a main control system 111 that controls the driving of the whole projector 1 and the flowing direction of the cooling fluid, a display control system 112 that controls the driving of the liquid crystal panels 441 (441R, 441G, 441B), and a memory 113. The memory 113 stores an image display setting data read out when the display control system 112 controls the driving of the liquid crystal panels 441, which may be an EEPROM or a flash memory.

The main control system 111 has a position judging section 1111 and an operation controller 1112. The position judging section 1111 judges the posture of the projector 1 based on information provided from a position sensor 1113 connected thereto, and judges the result of the judgment (whether the projector 1 is in the predetermined posture or in the upside-down posture) to inform the result to the operation controller 1112. Incidentally, the position sensor 1113 corresponds to the posture detector of the invention.

On the other hand, the operation controller 1112, when the judgment result indicating the posture of the projector 1 as the upside-down posture is informed from the position judging section 1111, controls the driving to output a control signal for changing the flowing direction of the cooling fluid into the inverse direction relative to the predetermined direction to a pump driving unit 1114, so that the pump driving unit 1114 changes the flowing direction of the cooling fluid in such manner.

Here, the detection of the posture of the projector 1 according to the position sensor 1113 can be conducted by detecting the position of the adjusting sphere 51E2 located inside the open valve. For instance, a pressure-sensitive sensor (not shown) that senses the passing of the adjusting sphere 51E2 may be provided at a terminal point of the movement of the adjusting sphere 51E2 inside the open valve, or a non-contact optical sensor (not shown) may be provided on a periphery of the open valve, so that the existence of the adjusting sphere 51E2 is checked.

Note that, in FIG. 19, describing details of other controls of the main control system 111, the main control system 111 is electrically connected to a lamp driving block 121 of the power source unit 12 (described later), so as to output a control signal to the lamp driving block 121 based on an operation signal from an operation switch and a remote controller receiver (both not shown) and restrict the power supply to the light source device 411, thereby adjusting the luminance of the light source lamp.

The display control system 112 controls the driving of the liquid crystal panel 441 based on image information input from the outside via the connector terminal and the image display setting data stored in the memory 113, or based on the image display setting data output from the main control system 111 due to a user input with the operation panel (not shown). The display control system 112 reads and writes the image display setting data from to the memory 113 based on the control signal output from the main control system 111.

The power source unit 12 is a circuit substrate that supplies power to the electric components of the projector 1 such as the light source device 411 and the control substrate 11, which includes a power source block 122 converting the power supplied from an inlet connector (not shown) and the lamp driving block 121 arranged below the power source block 122.

The power source block 122 is a power converter circuit that supplies the power supplied from the outside through the power cable connected to the inlet connector (not shown) to the lamp driving block 121 and the control substrate 11 etc. As shown in FIG. 19, this power source block 122 is divided into an upstream power supply system 1221 that converts alternating-current supplied by the external power source into direct-current, and a downstream power supply system 1222 that transforms the power, which is converted into the direct-current by the upstream power supply system 1221, into power with a predetermined voltage in accordance with the electric components of the projector 1.

FIG. 20 is a cross section showing the inner structure of an optical device body 440 when the projector 1 of the present embodiment is placed in the upside-down posture. In FIG. 20, the flow direction of the cooling fluid circulating through the optical device 44 indicates the inverse direction relative to the predetermined direction shown in FIG. 18 by the operation of the position sensor 1113 and the main control system 111.

Though it is obvious when referring to FIG. 20, in the state after the posture change of the projector 1, the position relationship among the cooling fluid accumulated in the relay tank 9, the bubble accumulator 51C, the open valve 51E and the like is constantly unchanged relative to the state before the posture change. Additionally, the location of the bubble discharging hole against the flowing direction of the cooling fluid is constantly unchanged relative to the state before the posture change.

Therefore, in the present exemplary embodiment, substantially the same advantages can be attained as the before-stated exemplary embodiment, and besides, even when the installation posture of the projector 1 is in the upside-down state, not only the optical modulator such as the liquid crystal panel 441, the incident-side polarization plate 442 and the irradiation-side polarization plate 443 can sufficiently be cooled in the same manner as the state before the posture change, but also the gas within the bubble accumulator 51C can be prevented from mixing into the cooling fluid in the tank body 51.

According to the present exemplary embodiment, in the fixing member 56C arranged in the relay tank 9, the bubble discharging holes are respectively formed in the upper side on the cooling fluid inflow side and in the lower side on the cooling fluid outflow side relative to the filter 55. Owing to this, even when the projector 1 is in the upside-down state, the main control system 111 changes the flowing direction of the cooling fluid into the inverse direction, so that the location of the bubble discharging holes in relation of the flowing direction of the cooling fluid about to pass through the filter 55 becomes the same as that in the state before the posture change.

Accordingly, without regarding to the posture of the projector 1 which is either the predetermined posture or the upside-down posture, the air bubbles trapped by the filter 55 can smoothly be discharged via the bubble discharging holes to accumulate the air bubbles in the bubble accumulator 51C.

Modification of Sixth and Seventh Exemplary Embodiments

Figure 21:
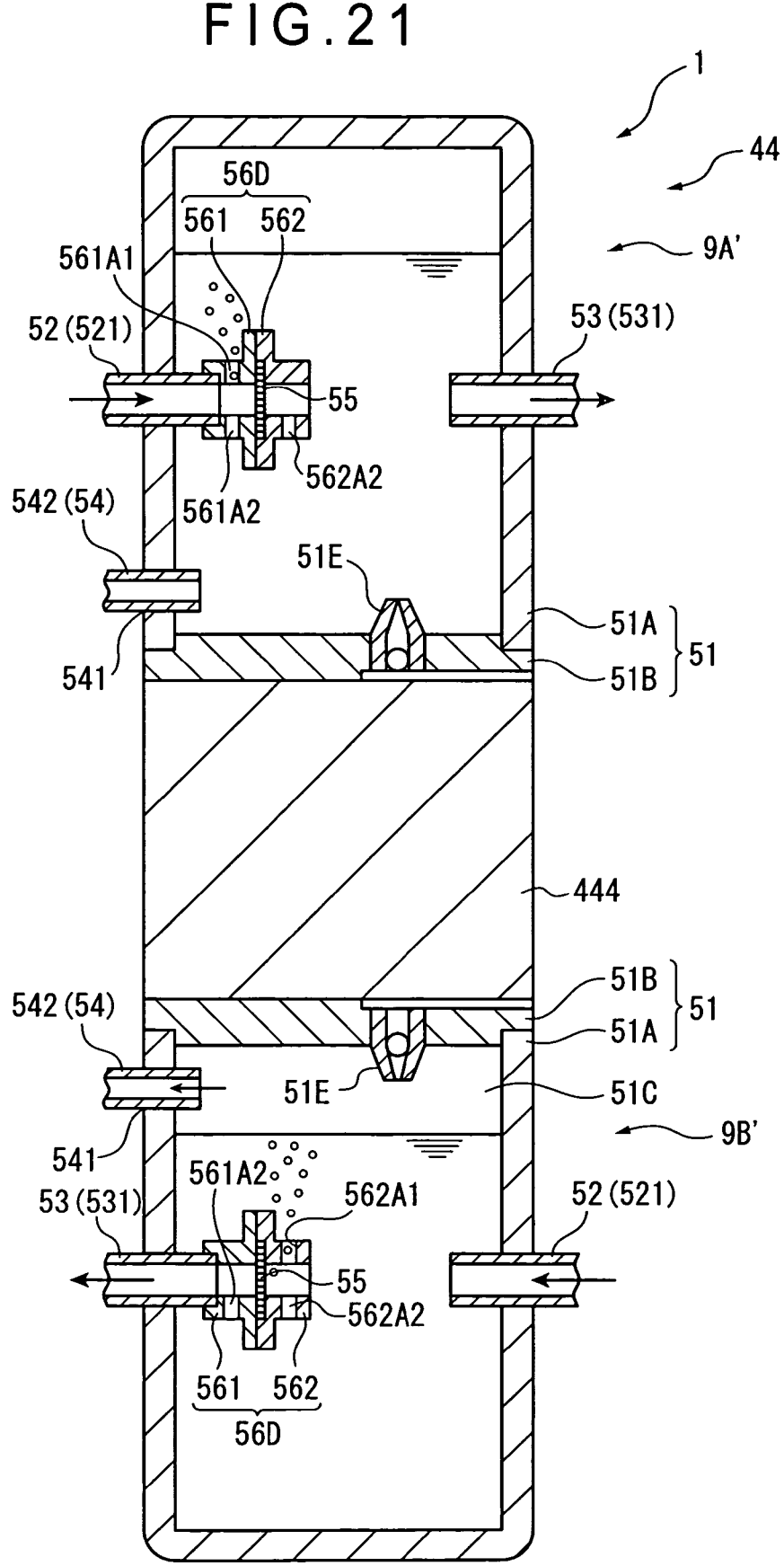
FIG. 21 is a cross section showing a relay tank according to a modification of the sixth and seventh exemplary embodiments of the invention.

FIG. 21 is a cross section showing the inner structure of an optical device body 440 as a modification of the above-described sixth and seventh exemplary embodiments.

In this modification, a fixing member 56D shown in FIG. 21 is employed instead of the fixing members 56B, 56C used in the sixth and seventh exemplary embodiments. The fixing member 56D is different in the location of the bubble discharging hole as compared to the aforementioned fixing members 56B, 56C.

As shown in FIG. 21, in the fixing member 56D arranged on the end of the pipe 531 in a relay tank 9B', the hole 561A2 is formed in the lower side of the first fixing section 561, the hole 562A1 is formed in the upper side of the second fixing section 562, and the hole 562A2 is formed in the lower side of the second fixing member 562.

In other words, in the fixing member 56D disposed in the relay tank 9B', the bubble discharging holes are respectively formed by penetrating through the upper and lower sides on the inflow side of the cooling fluid about to pass through the pipe 531, and the lower side on the cooling fluid outflow side, relative to the filter 55 fixed in the fixing member 56D.

On the other hand, in the fixing member 56D disposed in the pipe 521 in a relay tank 9A', the hole 561A1 is formed in the upper side of the first fixing section 561, the hole 561A2 is formed in the lower side of the first fixing section 561, and the hole 562A2 is formed in the lower side of the second fixing section 562.

In other words, in the fixing member 56D disposed in the relay tank 9A', the bubble discharging holes are respectively formed in the upper and lower sides on the inflow side of the cooling fluid about to pass through the pipe 521, and the lower side on the cooling fluid outflow side, relative to the filter 55 like the relay tank 9B'.

According to the projector 1 equipped with the optical device 44 having such fixing member 56D, in either cases where the projector 1 is installed in the predetermined posture or in the upside-down posture, the bubble discharging holes are constantly located on the upper side on the inflow side of the cooling fluid about to pass through the filter 55 in the fixing member 56D. Further, even when the projector 1 is installed in the upside-down posture and the flowing direction of the cooling fluid is changed into the inverse direction relative to the predetermined direction, the bubble discharging hole is still located in the upper side on the inflow side of the cooling fluid about to pass through the filter 55 in the fixing member 56D.

Accordingly, the fixing member 56D can be employed to the optical device 44 in either cases where the projector 1 is installed in the predetermined posture or in the upside-down posture (as in the sixth exemplary embodiment), and where the projector 1 is installed in the upside-down posture with the flowing direction of the cooling fluid changed into the inverse direction (as in the seventh exemplary embodiment).

As for another modification of the sixth and seventh exemplary embodiments, like the configuration described in the fifth exemplary embodiment, the communicating hole 541 that allows the bubble accumulator 51C formed inside the tank body 51 to communicate with the outside of the tank body 51 is formed in the lateral side 51A2 of the body section 51A, and then the communicating tube 542 linked to the suction pump (not shown) is attached to the communicating hole so that the end of the communicating tube 542 is located inside the bubble accumulator.

In other words, as shown in FIG. 21, the communicating hole 541 that allows the bubble accumulator 51C formed inside the tank body 51 of the relay tanks 9A', 9B' to communicate with the outside of the tank body 51 is formed in the optical device 44, and the communicating tube 542 linked to the suction pump (not shown) is attached to the communicating hole 541 so that the end of the communicating tube 542 is located inside the bubble accumulator (only in case of the relay tank 9B').

Also in the configuration of FIG. 21, like the above-described fifth exemplary embodiment (see FIG. 13), the air bubbles accumulated within the bubble accumulator 51C can effectively be discharged outside by the bubble discharging section 54 constituted of the communicating tube and the suction pump (not shown).

Eighth Exemplary Embodiment

Figure 22:
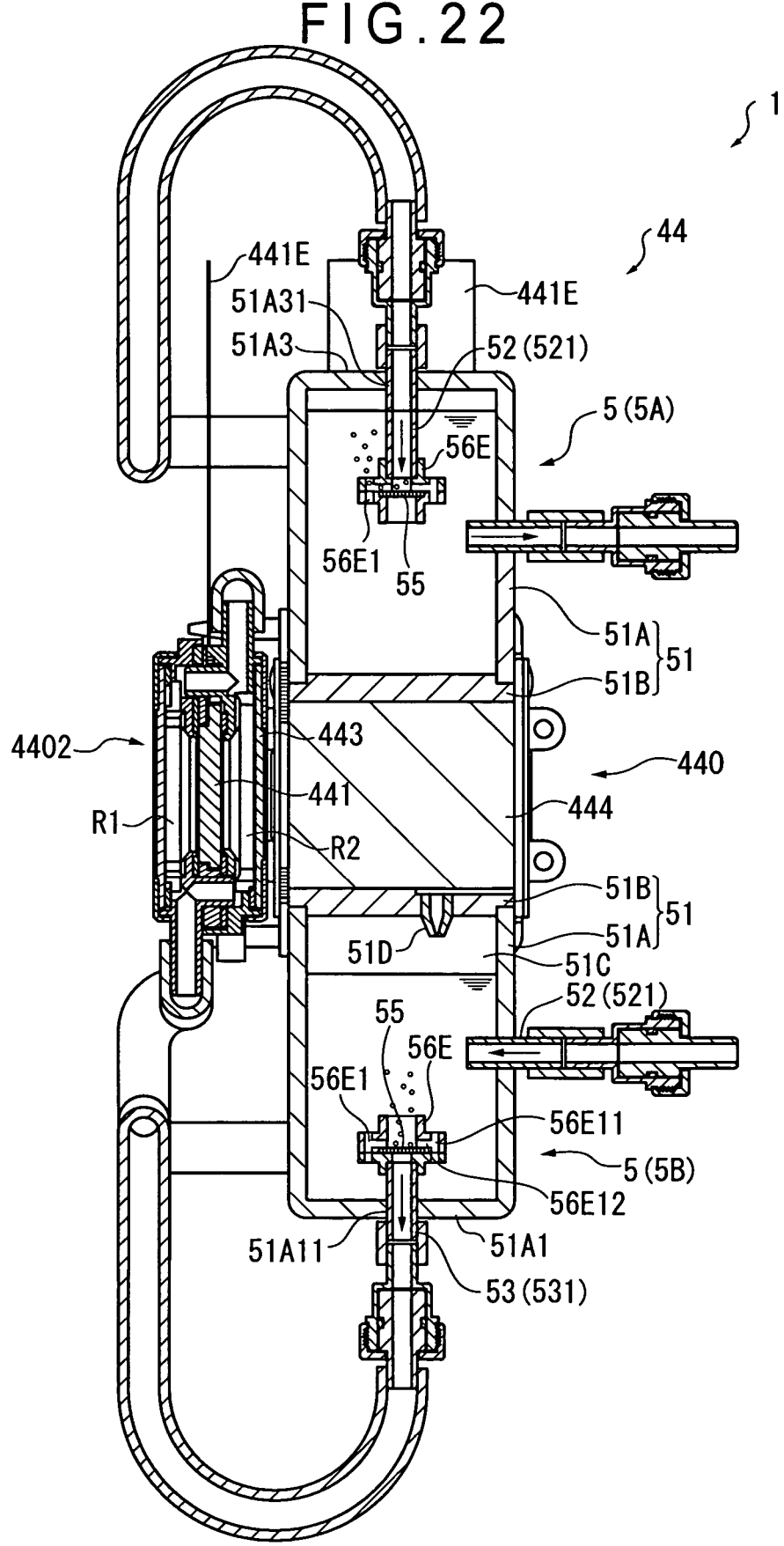
FIG. 22 is a cross section showing the inner structure of an optical device body according to an eighth exemplary embodiment of the invention.
Figure 23:
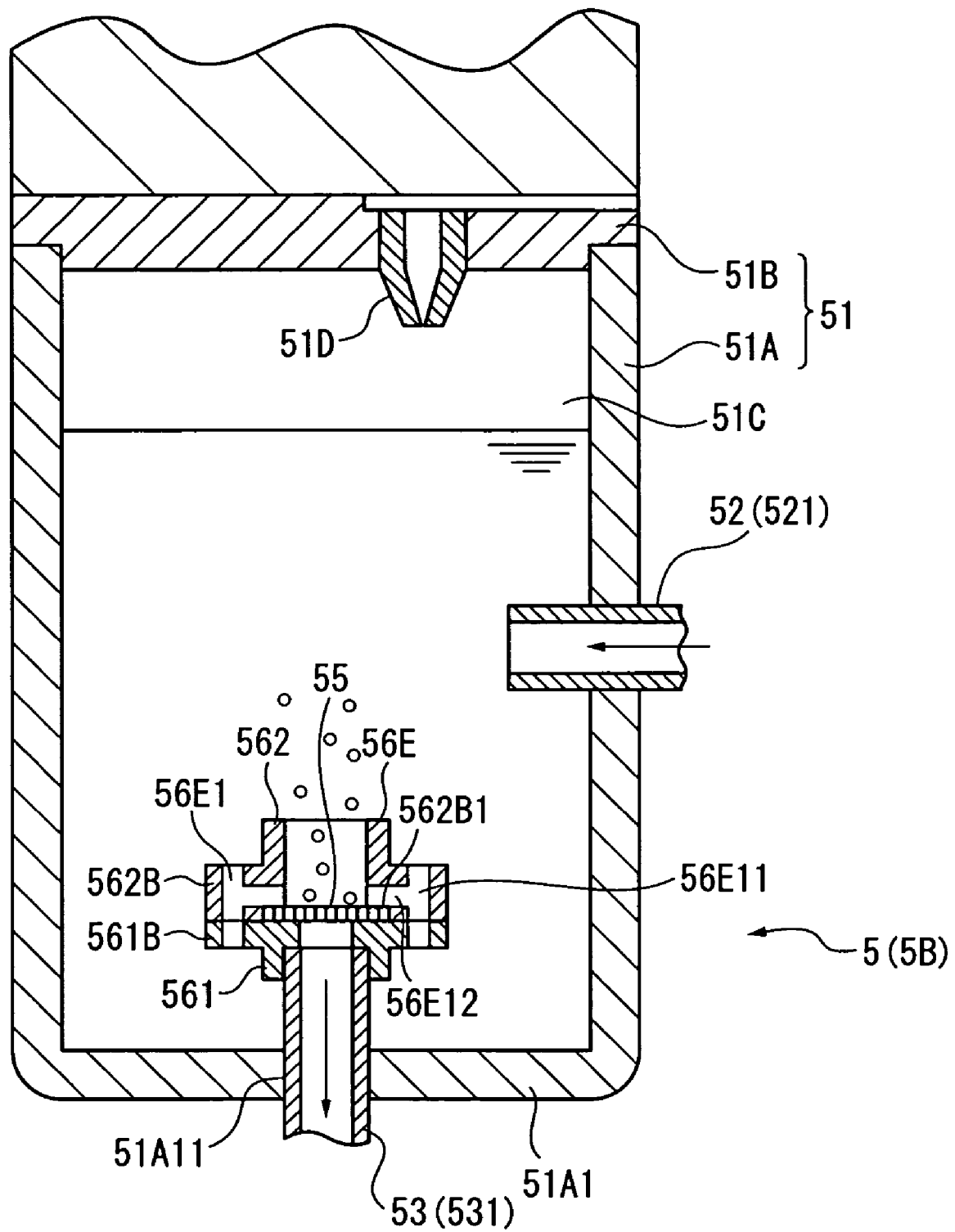
FIG. 23 is an illustration showing a relay tank of the aforesaid exemplary embodiment.
Figure 24:
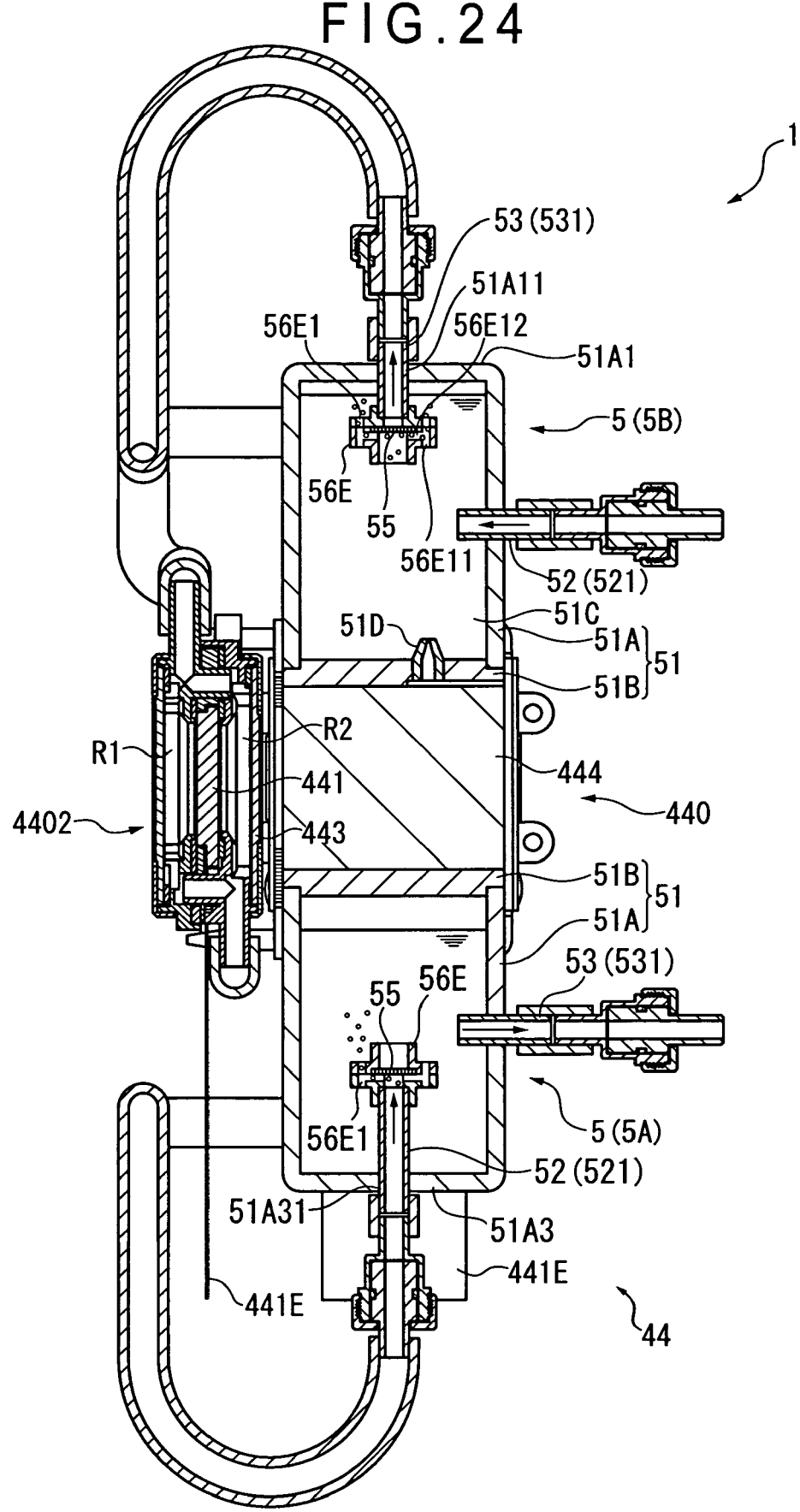
FIG. 24 is a cross section showing the inner structure of an optical device body of the aforesaid exemplary embodiment when a projector is installed in an upside-down posture.

Referring to FIGS. 22 to 24, an eighth exemplary embodiment of the invention will be described. Incidentally, in the following description, the same reference numeral will be attached to the same components as the above to omit the description thereof.

In the above-described exemplary embodiment, the cooling fluid inflow section 52 and the cooling fluid outflow section 53 are respectively arranged in the lateral sides 51A2 of the relay tanks 5, and the cooling fluid flows into/from the relay tank 5 substantially in horizontal direction.

FIG. 22 is a cross section showing the inner structure of an optical device 44 when the projector 1 according to the present exemplary embodiment is installed in the predetermined posture.

In the optical device 44 of the present exemplary embodiment, as shown in FIG. 22, the cooling fluid inflow section 52 communicating with the cooling chambers R1, R2 is disposed in an upper side 51A3 of the relay tank 5A, while the cooling fluid outflow section 53 communicating with the cooling chambers R1, R2 is disposed in the bottom side 51A1 of the relay tank 5B.

To be more specific, the pipe 531 of the cooling fluid outflow section 53 connected to the relay tank 5B is inserted to a hole 51A11 formed in the bottom side 51A1 of the relay tank 5B and then brought into the body section 51A. The end of the pipe 531 is located below the liquid level of the cooling fluid accumulated in the relay tank 5B. Further, the filter 55 is fixed in the end of the pipe 531 via a fixing member 56E. The configuration of the fixing member 56E is similar to the above-mentioned fixing member 56 except the location of the bubble discharging hole and its configuration.

A hole 56E1 as a bubble discharging hole of the present exemplary embodiment includes penetrating holes 56E11 and a communicating path 56E12 as shown in FIG. 23. The penetrating holes 56E11 are holes respectively vertically penetrating though the flange 561B of the first fixing section 561 and the flange 562B of the second fixing section 562. The communicating path 56E12 is formed like a tunnel horizontally extending to the outside from the dent 562B1 of the flange 562B to communicate with the penetrating hole 56E11.

Incidentally, the hole 56E1 should be plural to surround the outer periphery of the filter 55 at even intervals.

On the other hand, as shown in FIG. 22, the pipe 521 of the cooling fluid inflow section 52 connected to the upper relay tank 5A is inserted to the hole 5A31 formed in the upper side 51A3 of the relay tank 5A and brought into the body section 51A.

The end of the pipe 521 is located below the liquid level of the cooling fluid accumulated in the relay tank 5A. Further, the filter 55 is fixed in the end of the pipe 521 via the fixing member 56E. The bubble discharging holes 56E1 are formed in the fixing member 56E as similar to the fixing member 56E provided in the relay tank 5B. However, in the fixing member 56E, the communicating path 56E12 constituting the bubble discharging holes 56E1 is carved in the surface holding the filter 55, of the first fixing section 561 as a groove.

With this configuration, when the projector 1 is installed in the predetermined posture, according to the fixing member 56E provided in the relay tank 5B, the cooling fluid is circulated upward in the filter 55 from the upper side to the lower side. At this time, the air bubbles contained in the cooling fluid are trapped by the upper surface of the bubble trapping, the air bubbles are likely separated from the fixing member 56E when they are elevated due to buoyancy. In the present exemplary embodiment, the holes 56E1 are formed in the fixing member 56E since it is assumed that the projector 1 described below is installed in the upside-down posture, however, the holes 56E1 may not be formed in the fixing member 56E if the posture of the projector 1 will not be changed.

FIG. 24 is a cross section showing the inner structure of the optical device 44 when the projector 1 according to the present exemplary embodiment is installed in the upside-down posture.

By forming the aforementioned hole 56E1, in the fixing member 56E provided in the relay tank 5B, the air bubbles trapped by the filter 55 on its cooling fluid inflow side are moved to the penetrating holes 56E11 though the communicating path 56E12, and then elevated due to buoyancy. Namely, the air bubbles trapped by the filter 55 are smoothly discharged via the holes 56E1, so that the air bubbles are accumulated in the bubble accumulator 51C located above the liquid level of the cooling fluid.

Further, the plurality of holes 56E1 surround the periphery of the filter 55 at even intervals, thereby easily discharging the air bubbles trapped by the filter 55.

And, even in case of the relay tank 5A, by forming the holes 56E1, in the fixing member 56E, the air bubbles trapped by the filter 55 are smoothly discharged via the holes 56E1, so that the air bubbles are accumulated in the bubble accumulator 51C located above the liquid level of the cooling fluid.

Modifications of Aforesaid Exemplary Embodiment

Incidentally, the scope of the invention is not restricted to the above-described exemplary embodiments, but includes modifications and improvements as long as advantages of the invention can be achieved.

In the invention, inside the relay tank 5 to 9, the open valve 51D, 51E and the gas-liquid separating film 77 may be arranged together. Alternatively, according to the relay tanks 5 to 9, the communicating path 61B10 and the gas-liquid separating film 77 may be arranged together, or the open valve 51D, 51E, the communicating path 61B10, and the bubble discharging section 54 may be arranged together. With such combination of the plurality of configurations, the cooling fluid can further be prevented from leaking to the outside.

Although the open valve 51E is provided in the relay tank 9 of the projector 1 exemplified in the sixth and seventh exemplary embodiments, in the invention, the open valve 51D, the gas-liquid separating film 77 and the like may be arranged in the relay tank 9 even for the projector 1 with the installation posture being changeable as in the sixth and seventh exemplary embodiments as long as the cooling fluid will not be leaked.

In the above-described exemplary embodiments, although the cross dichroic prism 444 closely contacts to the tank body 51, it is not limited thereto, and the both may be separated from each other.

In the above-described exemplary embodiments, the cooling system of the optical device 44 is divided into the plurality of fluid circulators 448, so that the optical modulator holders 4402 are respectively arranged to the divided circulators. However, in the invention, the plurality of optical modulator holders 4402 may tandemly be arranged with one fluid circulator 448.

In the above-described exemplary embodiments, although the flat filter 55 is used as a way to trap the air bubbles within the cooling fluid in the relay tank 5 to 9, it is not limited thereto, and a resin porous foam sponge or the like with countless pores may alternatively be used.

Further, in the above-described exemplary embodiments, although the hole 562A1 for discharging air bubbles is formed in the cylindrical section 562A of the second fixing section 562 that fixes the filter 55 against the cooling fluid outflow section 53 or a cooling fluid inflow section 52' of the relay tank 5 to 7, the hole 562A1 may not be formed. When lacking the hole 562A1, the air bubbles will be discharged from the opening of the cylindrical section 562A of the second fixing section 562.

In the respective exemplary embodiments, only an example of a projector 1 having three liquid crystal panels 441 is exemplified. However, the invention can also be applied to a projector having only one liquid crystal panel, two liquid crystal panels or four or more liquid crystal panels.

In the respective exemplary embodiments, the transmissive-type liquid crystal panel having different light-incident side and light-irradiation side is employed. However, the reflection-type liquid crystal panel having the same light-incident side and irradiation side may also be employed.

In the above-described exemplary embodiments, the liquid crystal panel is used as the optical modulator, an optical modulator using a micro mirror or the like other than a liquid crystal panel may be used. In such case, the polarization plates on the light-incident side and the light-irradiation side can be omitted.

In the respective exemplary embodiments, only a front-type projector that projects an image in a direction for observing a screen is exemplified, but the invention may also be applied to a rear-type projector that projects an image in a direction opposite to the direction for observing the screen.

The specific structure and profile of the invention for implementation may be changed as long as the advantage of the invention can be achieved.

The invention, for instance, may be used for various purposes as an optical device and a projector applied to multimedia presentations at conferences, academic societies, exhibitions and the like.

What is claimed is:

1. An optical device, comprising:
    an optical modulator that modulates a light beam irradiated by a light source in accordance with image information to form an optical image;
    an optical modulator holder that has a cooling chamber with cooling fluid sealed therein and holds the optical modulator so that heat can be transferred to the cooling fluid in the cooling chamber;
    a plurality of fluid circulators communicating with the cooling chamber to guide the cooling fluid to the outside of the cooling chamber and again introduces the cooling fluid into the cooling chamber;
    a cooling fluid accumulator arranged in a flow path of the cooling fluid in each of the plurality of fluid circulators and having a cooling fluid inflow section that flows the cooling fluid to the inside of the cooling accumulator and a cooling fluid outflow section that flows the cooling fluid to the outside of the cooling accumulator so as to accumulate the cooling fluid in the cooling fluid accumulator; and
    a fluid press-feeder disposed in the flow path of the cooling fluid in each of the plurality of fluid circulators so that the cooling fluid is forcedly circulated via the plurality of fluid circulators,
    the cooling fluid accumulator including:
        a bubble trapping formed by a porous filter and having a plurality of holes to circulate the cooling fluid toward the cooling fluid outflow section and trap air bubbles contained in the cooling fluid; and
        a bubble accumulator that accumulates the air bubbles trapped by the bubble trapping.

2. The optical device according to claim 1, when the optical device is installed in a predetermined posture, and in a case where a direction with a self-weight of the optical device acted is defined as a downward direction side whereas an inverse direction relative to the direction with the self-weight acted is defined as an upward direction side, the bubble accumulator being disposed such that the air bubbles are collected on the upward direction side in the cooling fluid accumulator.

3. The optical device according to claim 1, further comprising:
    a plurality of the cooling fluid accumulators.

4. The optical device according to claim 1, further comprising:
    an open valve provided at the vicinity of the bubble accumulator of at least one of the cooling fluid accumulators, the open valve allowing the bubble accumulator to communicate with the outside of the cooling fluid accumulator.

5. The optical device according to claim 4,
    the open valve shifting between an open state that opens a communicating path for allowing the bubble accumulator to communicate with the outside of the cooling fluid accumulator and a close state that closes the communicating path, and
    the open valve shifting to the open state when the inside of the bubble accumulator is in a negative pressure state relative to the outside of the cooling fluid accumulator and to the close state when the inside of the bubble accumulator is not in the negative pressure relative to the outside of the cooling fluid accumulator.

6. The optical device according to claim 4,
    the open valve being arranged to be able to shift between an open state that opens a communicating path for allowing the bubble accumulator to communicate with the outside of the cooling fluid accumulator and a close state that closes the communicating path,
    the open valve being shifted to the open state when the bubble accumulator is positioned on a side contacting the open valve, and the open valve being shifted to the close state when the bubble accumulator is positioned on a side away from the open valve.

7. The optical device according to claim 6, when the optical device is installed in a predetermined posture, and in a case where a direction with a self-weight of the optical device acted is defined as a downward direction side whereas an inverse direction relative to the direction with the self-weight acted is defined as an upward direction side, the open valve having a cylindrical open valve body with a hollow section narrowing to a tip end, and a substantially spherical adjusting member sealed in the hollow section, the open valve being arranged such that the tip end confronts the inside of the fluid accumulator, when the tip end confronts the downward direction side, the adjusting member pushing a wall of the hollow section contacting to the adjusting member due to the self-weight of the adjusting member and slightly opens the tip end to be the open state, and when the tip end confronts the upward direction side, the tip end being closed to be the close state.

8. The optical device according to claim 1, further comprising:

a gas-liquid separating film arranged on a boundary defined by the bubble accumulator and the cooling fluid accumulated in the cooling fluid accumulator, the gas-liquid separating film allowing gas to pass but inhibiting liquid to pass.

9. The optical device according to claim 8, the gas-liquid separating film being arranged in a sagging manner.

10. The optical device according to claim 8, further comprising:

a moving mechanism arranged in the cooling fluid accumulator, the moving mechanism moving the gas-liquid separating film to the upward direction side and the downward direction side.

11. The optical device according to claim 1, further comprising:

a communicating path formed in the cooling fluid accumulator at the vicinity of the bubble accumulator, the communicating path allowing the bubble accumulator to communicate with the outside of the cooling fluid accumulator.

12. The optical device according to claim 11, the communicating path extending in a meandering manner.

13. The optical device according to claim 1, further comprising:

a communicating hole formed in the cooling fluid accumulator, the communicating hole allowing the bubble accumulator to communicate with the outside of the cooling fluid accumulator, and a bubble discharging section connected to the communicating hole, the bubble discharging section forcedly discharging the air bubbles accumulated in the bubble accumulator via the communicating hole to the outside of the cooling fluid accumulator.

14. The optical device according to claim 1, further comprising:

a plurality of the optical modulators; and a plurality of the optical modulator holders corresponding to the plurality of optical modulators, the plurality of optical modulators having a plurality of light incident surfaces on which the plurality of optical modulator holders are attached, the optical device having a color-combining optical device that combines color lights respectively modulated by the plurality of optical modulators to irradiate the combined color lights, and the cooling fluid accumulator being attached on each surface of the color-combining optical device respectively intersecting with the plurality of light incident surfaces.

15. The optical device according to claim 14, when the optical device is installed in a predetermined posture, and in a case where a direction with a self-weight of the optical device acted is defined as a downward direction side whereas an inverse direction relative to the direction with the self-weight acted is defined as an upward direction side, the cooling fluid accumulator further including:

an outflow cooling fluid accumulator that divides and flows the accumulated cooling fluid to the cooling chambers respectively formed in the plurality of optical modulator holders via the plurality of fluid circulators; and an inflow cooling fluid accumulator that collectively flows the cooling fluid from the cooling chambers formed in the plurality of optical modulator holders via the plurality of fluid circulators, the outflow cooling fluid accumulator being attached on the surface of the color-combining optical device on the downward direction side out of the surfaces respectively intersecting with the plurality of light incident surfaces, and the inflow cooling fluid accumulator being attached on the surface of the color-combining optical device on the upward direction side out of the surfaces respectively intersecting with the plurality of light incident surfaces.

16. The optical device according to claim 1, the cooling fluid accumulator further including:

an outflow cooling fluid accumulator that flows the accumulated cooling fluid to the plurality of cooling chambers; and an inflow cooling fluid accumulator that flows the cooling fluid from the plurality of cooling chambers via the plurality of fluid circulators, and the fluid press-feeder press-feeding the cooling fluid discharged from the inflow cooling fluid accumulator to the outflow cooling fluid accumulator.

17. The optical device according to claim 1, when the optical device is installed in a predetermined posture, and in a case where a direction with a self-weight of the optical device acted is defined as a downward direction side whereas an inverse direction relative to the direction with the self-weight acted is defined as an upward direction side, the cooling fluid being circulated from the upward direction side to the downward direction side via the bubble accumulator, and the bubble trapping being arranged such that a bubble trapping surface is substantially orthogonal to the upward direction, the bubble trapping surface trapping the air bubbles contained in the cooling fluid.

18. The optical device according to claim 1, the bubble trapping being attached on at least one of the cooling fluid inflow section and the cooling fluid outflow section via a fixing member, and a bubble discharging hole being formed in the fixing member, the bubble discharging hole discharging the air bubbles trapped by the bubble trapping to the bubble accumulator.

19. The optical device according to claim 18, when the optical device is installed in a predetermined posture, and in a case where a direction with a self-weight of the optical device acted is defined as a downward direction side whereas an inverse direction relative to the direction with the self-weight acted is defined as an upward direction side, the fixing member including:
a first cylindrical section extending on a cooling fluid inflow side of the bubble trapping to guide the cooling fluid to the bubble trapping; and
a second cylindrical section extending on a cooling fluid outflow side of the bubble trapping,
the bubble trapping being held between the first cylindrical section and the second cylindrical section at an outer edge of the bubble trapping such that a bubble trapping surface that traps the air bubbles contained in the cooling fluid is substantially parallel to the upward direction or the downward direction, and
at least one bubble discharging hole being formed on the upward direction side of the first cylindrical section.

20. The optical device according to claim 19, at least one bubble discharging hole being formed on the downward direction side of the first cylindrical section.

21. The optical device according to claim 19, at least one bubble discharging hole being formed on the downward direction side of the second cylindrical section.

22. The optical device according to claim 18, when the optical device is installed in a predetermined posture, and in a case where a direction with a self-weight of the optical device acted is defined as a downward direction side whereas an inverse direction relative to the direction with the self-weight acted is defined as an upward direction side, the fixing member including:
a first cylindrical section extending on a cooling fluid inflow side of the bubble trapping to guide the cooling fluid to the bubble trapping; and
a second cylindrical section extending on a cooling fluid outflow side of the bubble trapping,
the bubble trapping being held between the first cylindrical section and the second cylindrical section at an outer edge of the bubble trapping such that a bubble trapping surface that traps the air bubbles contained in the cooling fluid is substantially orthogonal to the upward direction or the downward direction, and
the bubble discharging hole being formed on an outer side of an outer edge of the bubble trapping surface in a direction orthogonal to the upward and downward directions.

23. The optical device according to claim 1, in a case where a direction with a self-weight of the optical device acted is defined as a downward direction side whereas an inverse direction relative to the direction with the self-weight acted is defined as an upward direction side, the cooling fluid being circulated from the downward direction side to the upward direction side in the cooling chamber.

24. A projector that forms an optical image by modulating a light beam irradiated by a light source in accordance with image information and projects the optical image in an enlarged manner, the projector comprising:
an optical device,
the optical device including:
an optical modulator that modulates the light beam irradiated by the light source in accordance with the image information to form the optical image;
an optical modulator holder that has a cooling chamber with cooling fluid sealed therein and holds the optical modulator so that heat can be transferred to the cooling fluid in the cooling chamber;
a plurality of fluid circulators communicating with the cooling chamber to guide the cooling fluid to the outside of the cooling chamber and again introduces the cooling fluid into the cooling chamber;
a cooling fluid accumulator arranged in a flow path of the cooling fluid in each of the plurality of fluid circulators and having a cooling fluid inflow section that flows the cooling fluid to the inside of the cooling accumulator and a cooling fluid outflow section that flows the cooling fluid to the outside of the cooling accumulator so as to accumulate the cooling fluid in the cooling fluid accumulator; and
a fluid press-feeder disposed in the flow path of the cooling fluid in each of the plurality of fluid circulators so that the cooling fluid is forcedly circulated via the plurality of fluid circulators, and
the cooling fluid accumulator including:
a bubble trapping formed by a porous filter and having a plurality of holes to circulate the cooling fluid toward the cooling fluid outflow section and trap air bubbles contained in the cooling fluid; and
a bubble accumulator that accumulates the air bubbles trapped by the bubble trapping.

25. The projector according to claim 24, when the projector is installed in a predetermined posture, and in a case where a direction with a self-weight of the projector acted is defined as a downward direction side whereas an inverse direction relative to the direction with the self-weight acted is defined as an upward direction side, the fluid circulator being connected so that the cooling fluid is circulated in the upward and downward directions in the cooling chamber,
the projector further including:
a posture detector that detects a posture of the projector; and
a press-feeder driving controller that controls driving of the fluid press-feeder, and
the press-feeder driving controller shifting a circulating direction of the cooling fluid by controlling the driving of the fluid press-feeder corresponding to the posture of the projector detected by the posture detector, so that the cooling fluid in the cooling chamber is circulated from the downward direction side through which the self-weight of the projector acts to the upward direction side.

26. The projector according to claim 25, further comprising:
an open valve formed in the cooling fluid accumulator, the open valve allowing the bubble accumulator to communicate with the outside of the cooling fluid accumulator,
the open valve having a cylindrical open valve body with a hollow section narrowing to a tip end, and a substantially spherical adjusting member sealed in the hollow section,
the open valve being arranged such that the tip end confronts the inside of each of the fluid accumulator, and
the posture detector detecting the posture of the projector by detecting the position of the adjusting member.

27. A projector that forms an optical image by modulating a light beam irradiated by a light source in accordance with image information and projects the optical image in an enlarged manner, the projector comprising:
an optical device,
the optical device including:
an optical modulator that modulates the light beam irradiated by the light source in accordance with the image information to form the optical image;

an optical modulator holder that has a cooling with cooling fluid sealed therein and holds the optical modulator so that heat can be transferred to the cooling fluid in the cooling chamber;

a plurality of fluid circulators communicating with the cooling chamber to guide the cooling fluid to the outside of the cooling chamber and again introduces the cooling fluid into the cooling chamber;

a cooling fluid accumulator arranged in a flow path of the cooling fluid in each of the plurality of fluid circulators and having a cooling fluid inflow section that flows the cooling fluid to the inside of the cooling accumulator and a cooling fluid outflow section that flows the cooling fluid to the outside of the cooling accumulator so as to accumulate the cooling fluid in the inside of the cooling fluid accumulator; and a fluid press-feeder disposed in the flow path of the cooling fluid in each of the plurality of fluid circulators so that the cooling fluid is forcedly circulated via the plurality of fluid circulators, the cooling fluid accumulator including:
  a bubble trapping formed by a porous filter and having a plurality of holes to circulate the cooling fluid toward the cooling fluid outflow section and trap air bubbles contained in the cooling fluid; and
  a bubble accumulator that accumulates the air bubbles trapped by the bubble trapping, a plurality of the optical modulators; and a plurality of the optical modulator holders corresponding to the plurality of optical modulators,
  the plurality of optical modulators having a plurality of light incident surfaces on which the plurality of optical modulator holders are attached,
  the optical device having a color-combining optical device that combines color lights respectively modulated by the plurality of optical modulators to irradiate the combined color lights,
  the cooling fluid accumulators being attached on surfaces of the color-combining optical device respectively intersecting with the plurality of light incident surfaces, when the optical device is installed in a predetermined posture, and in a case where a direction with a self-weight of the optical device acted is defined as a downward direction side whereas an inverse direction relative to the direction with the self-weight acted is defined as an upward direction side, the cooling fluid accumulator further including:
  an outflow cooling fluid accumulator that divides and flows the accumulated cooling fluid to the cooling chambers respectively formed in the plurality of optical modulator holders via the plurality of fluid circulators; and
  an inflow cooling fluid accumulator that collectively flows the cooling fluid from the cooling chambers formed in the plurality of optical modulator holders via the plurality of fluid circulators,
    the outflow cooling fluid accumulator being attached on the surface of the color-combining optical device on the downward direction side out of the surfaces respectively intersecting with the plurality of light incident surfaces,
    the inflow cooling fluid accumulator being attached on the surface of the color-combining optical device on the upward direction side out of the surfaces respectively intersecting with the plurality of light incident surfaces,
    the bubble trapping disposed in the outflow cooling fluid accumulator being attached on the cooling fluid outflow section of the outflow cooling fluid accumulator,
    the bubble trapping disposed in the inflow cooling fluid accumulator being attached on the cooling fluid inflow section of the inflow cooling fluid accumulator, the projector including:
  a posture detector that detects a posture of the projector; and
  a press-feeder driving controller that controls driving of the fluid press-feeder,
    the press-feeder driving controller shifting a circulating direction of the cooling fluid by controlling the fluid press-feeder corresponding to a detection result of the posture detector, and
    the cooling fluid accumulating in the cooling accumulator located on a direction through which the self-weight of the projector acts out of the outflow cooling fluid accumulator and the inflow cooling fluid accumulator is divided and flowed to the cooling chambers respectively formed in the plurality of optical modulator holders via the plurality of fluid circulators.

* * * * *